US011926454B2

(12) United States Patent
Krafft

(10) Patent No.: US 11,926,454 B2
(45) Date of Patent: Mar. 12, 2024

(54) SMART CONTAINERS

(71) Applicant: KRAFFT INDUSTRIES LLC, Wilmington, DE (US)

(72) Inventor: Fredrik Krafft, Wilmington, DE (US)

(73) Assignee: KRAFFT INDUSTRIES LLC

( * ) Notice: Subject to any disclaimer, the term of this patent is extended or adjusted under 35 U.S.C. 154(b) by 0 days.

(21) Appl. No.: 17/267,653

(22) PCT Filed: Aug. 9, 2019

(86) PCT No.: PCT/US2019/045914
§ 371 (c)(1),
(2) Date: Feb. 10, 2021

(87) PCT Pub. No.: WO2020/033834
PCT Pub. Date: Feb. 13, 2020

(65) Prior Publication Data

US 2021/0188501 A1 Jun. 24, 2021

Related U.S. Application Data

(60) Provisional application No. 62/717,269, filed on Aug. 10, 2018.

(51) Int. Cl.

| | |
|---|---|
| ***B65D 51/24*** | (2006.01) |
| ***B65D 47/04*** | (2006.01) |
| ***G07C 9/00*** | (2020.01) |

(52) U.S. Cl.
CPC ............. *B65D 51/24* (2013.01); *B65D 47/04* (2013.01); *G07C 9/00182* (2013.01)

(58) Field of Classification Search
CPC ..... B65D 51/24; B65D 47/04; G07C 9/00182
See application file for complete search history.

(56) References Cited

U.S. PATENT DOCUMENTS

| | | | | |
|---|---|---|---|---|
| 5,571,260 | A | 11/1996 | Krug | |
| 10,433,666 | B1 * | 10/2019 | Jovanov | B65D 43/0202 |
| 10,757,574 | B1 * | 8/2020 | Rule | G06Q 20/3278 |
| 2006/0071011 | A1 | 4/2006 | Varvarelis et al. | |
| 2008/0112459 | A1 | 5/2008 | Salkeld | |

(Continued)

FOREIGN PATENT DOCUMENTS

| | | | |
|---|---|---|---|
| CN | 200963087 | Y | 10/2007 |
| JP | 2018-510002 | A | 4/2018 |

(Continued)

OTHER PUBLICATIONS

Official Action for Japanese counterpart application 2021-531612, dated Jun. 19, 2023 (English translation).

*Primary Examiner* — Nabil H Syed
(74) *Attorney, Agent, or Firm* — K&L Gates LLP

(57) ABSTRACT

The smart container comprises a body and a lid attached to the body. The lid comprises a valve movable between an open position and a closed position. The smart container further comprises an actuator configured to move the valve between the open position and the closed position, a sensor configured to detect a user, and a control circuit communicatively coupled to the sensor and the actuator. The control circuit is configured to receive a signal from the sensor indicative of a sensed condition and send a signal to the actuator when the sensed condition corresponds to an opening state.

21 Claims, 40 Drawing Sheets

(56) References Cited

U.S. PATENT DOCUMENTS

| | | | | |
|---|---|---|---|---|
| 2008/0308646 | A1 | 12/2008 | Wu | |
| 2010/0059515 | A1 | 3/2010 | Wilkerson | |
| 2011/0060457 | A1 | 3/2011 | De Vrught et al. | |
| 2011/0121020 | A1* | 5/2011 | Springer | B65D 1/06 222/23 |
| 2014/0074283 | A1 | 3/2014 | Blackburn | |
| 2014/0305963 | A1 | 10/2014 | Zonana et al. | |
| 2014/0378790 | A1* | 12/2014 | Cohen | A24F 40/65 600/300 |
| 2015/0061867 | A1 | 3/2015 | Engelhard et al. | |
| 2015/0360696 | A1* | 12/2015 | Yi | B60W 40/08 340/576 |
| 2015/0369633 | A1* | 12/2015 | Karasawa | B62D 1/04 324/686 |
| 2016/0287480 | A1* | 10/2016 | Hancock | A61J 7/02 |
| 2018/0127180 | A1* | 5/2018 | Gordon | A61J 1/00 |
| 2018/0305091 | A1* | 10/2018 | Krafft | B65D 47/06 |
| 2019/0029448 | A1* | 1/2019 | LaGarde | F04F 1/06 |
| 2019/0101112 | A1* | 4/2019 | Scalf | G01F 23/2962 |

FOREIGN PATENT DOCUMENTS

| | | | |
|---|---|---|---|
| WO | 2015069916 | A1 | 5/2015 |
| WO | 2016164187 | A1 | 10/2016 |
| WO | 2017075298 | A1 | 5/2017 |

* cited by examiner

SMART CONTAINERS

CROSS-REFERENCE TO RELATED APPLICATION

The present application claims priority to U.S. Provisional Patent Application Ser. No. 62/717,269, filed Aug. 10, 2018, having the same title and inventor as indicated above, and which is incorporated herein by reference.

SUMMARY

In one general aspect, the present disclosure relates to a smart container. The smart container comprises a body and a lid attached to the body. The lid comprises a valve movable between an open position and a closed position. The smart container further comprises an actuator configured to move the valve between the open position and the closed position, a sensor configured to detect contact with the body, and a control circuit communicatively coupled to the sensor and the actuator. The control circuit is configured to receive a signal from the sensor indicative of a sensed condition and send a signal to the actuator when the sensed condition corresponds to an opening state.

In another aspect, a smart container comprises a body portion and a lid portion removably attached to the body portion. The lid portion comprises a valve assembly configurable in an open configuration and a closed configuration, wherein contents of the smart container are able to flow out of the smart container when the valve assembly is in the open configuration, and wherein the contents of the smart container are unable to flow out of the smart container when the valve assembly is in the closed configuration. The smart container further comprises an actuator configured to move the valve assembly between the open configuration and the closed configuration, a sensor configured to detect a condition, and a control system in communication with the sensor and the actuator. The control system is configured to receive a first signal from the sensor indicative of the detected condition and send a second signal to the actuator to motivate the valve assembly into the open configuration when the detected condition corresponds to an authorized user of the smart container.

In another aspect, a smart container comprises a body configured to store contents therein and a lid selectively lockable to the body. The lid comprises a valve assembly configurable in an open configuration and a closed configuration, wherein the contents of the smart container are prevented from dispensing out of the smart container when the lid is in the closed configuration. The smart container further comprises an actuator configured to move the valve assembly between the open configuration and the closed configuration, a sensor configured to detect a characteristic of a user, and a controller in communication with the actuator and the sensor. The controller is configured to receive a signal representative of the detected characteristic and send a signal to the actuator to motivate the valve assembly into the open configuration when the detected characteristic corresponds to an opening state.

BRIEF DESCRIPTION OF THE DRAWINGS

Various features of the embodiments described herein are set forth with particularity in the appended claims. The various embodiments, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various embodiments of the invention, in one form, and such exemplifications are not to be construed as limiting the scope of the invention in any manner.

DESCRIPTION

This specification is generally directed to containers, such as, for example, beverage containers, lids, and straws comprising sensors, motors, solenoids, and/or communication equipment to permit desired user functionality. In various instances, such containers comprise user programmable and/or selectable features. However, the contents of this specification are not limited to such environments. A container is described in U.S. patent application Ser. No. 15/771,446, filed Apr. 27, 2018, titled SMART DRINK CONTAINER, which is incorporated by reference herein in its entirety.

In various embodiments, the present disclosure embraces the notion of security features enabling a user to protect the contents of the container and the container itself. In various instances, the container comprises a touch-sensitive interface configured to receive a specific user input and/or code prior to unlocking and allowing the user to access the contents of the container. In various instances, unlocking the smart container comprises opening a valve assembly to permit the contents of the container to flow out into the user's mouth and/or the environment. In various instances, unlocking the smart container comprises the authentication of a user to allow for the valve assembly to be opened through additional means. In various instances, the container comprises sensors configured to determine if the user is appropriate and/or authorized based on one or more parameters, such as, for example, facial and/or voice recognition. In various instances, the container is configured to learn specific habits of a user, such as, for example the average amount of liquid taken in one sip, over a period of time and to adapt a control program accordingly.

Figure 1:
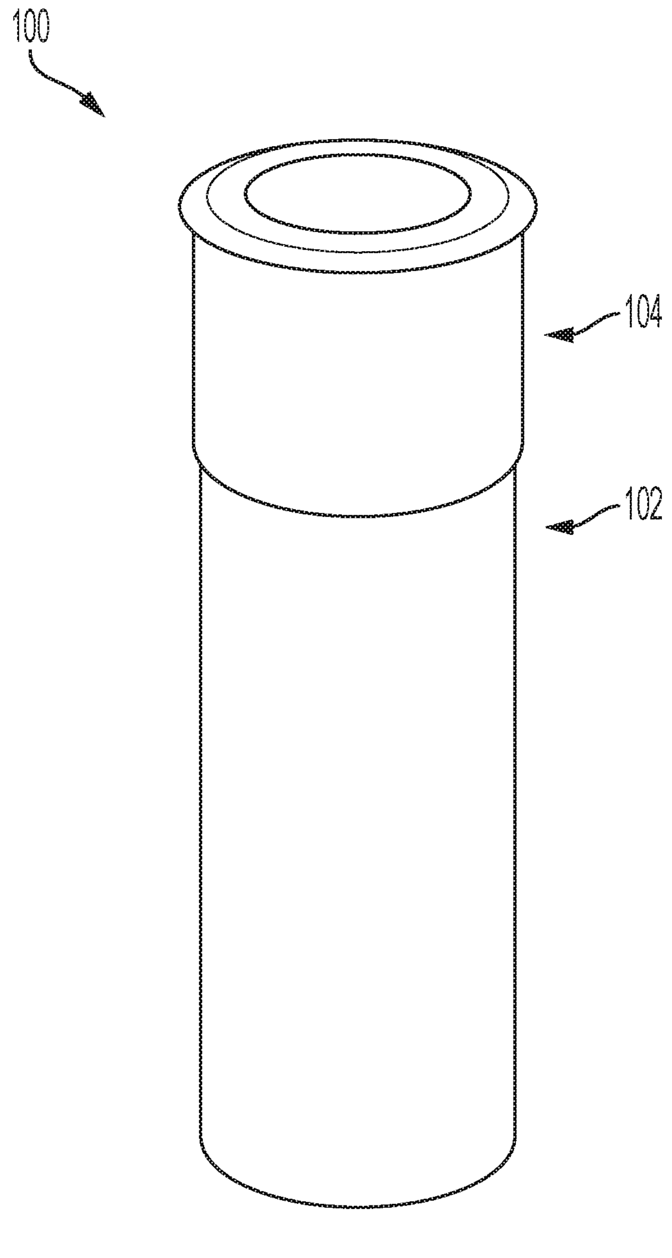
FIG. 1 is perspective view of a smart container according to at least one aspect of the disclosure.

FIG. 1 illustrates a container 100 for storing liquids. The container 100 comprises a body portion 102 comprising an internal cavity, wherein the internal cavity is configured to store and retain liquids therein. The container 100 further comprises a lid portion 104. According to various embodiments, the lid portion 104 may be an automatic lid. In various instances, the lid portion 104 may be automated through the use of magnetic elements. For example, the lid portion 104 can comprise a magnetic element configured to be attracted to a magnetic element positioned on the body portion 102. The attractive magnetic field draws the lid portion 104 into alignment and into engagement with the body portion 102. In various instances, the lid portion 104 can be automated under the control of a processor such that the lid portion 104 opens and closes automatically when a predetermined set of conditions is met. In such instances, various aspects of the lid portion 104 are programmable.

The lid portion 104 comprises one or more sensors. The type and functionality of the one or more sensors is described in greater detail herein. The various parameters and conditions monitored by the one or more sensors may be controlled through wireless and/or hard-wired connections to the container 100 and may be controlled by a control system. The control system is configured to communicate with the container 100 to receive information, such as, for example, the status of the one or more sensors, or send information, such as, for example, commands for opening or closing the lid portion 104. The interaction between the sensors, the control system, and the corresponding mechanics of the container are described in greater detail herein.

Figure 2:
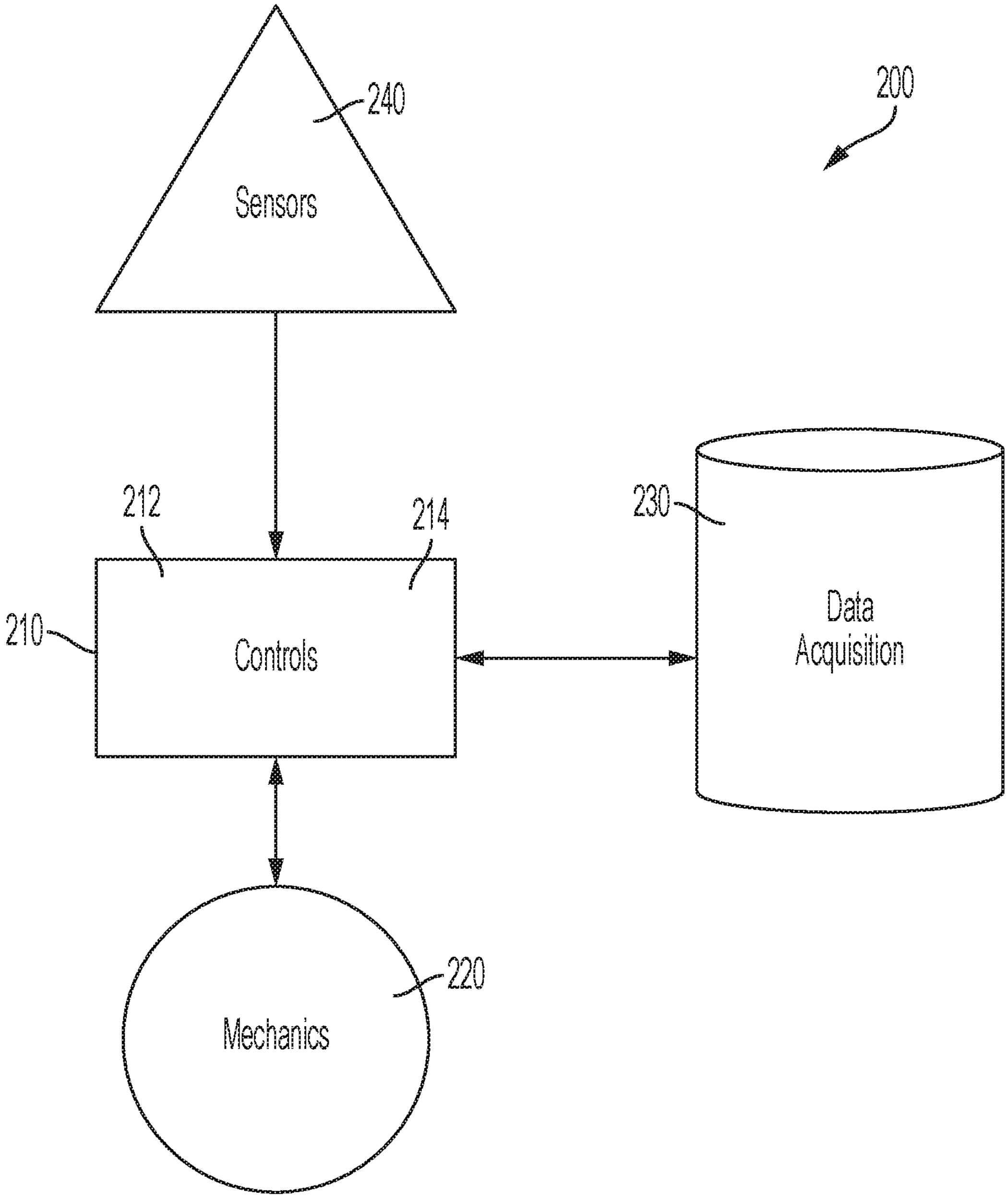
FIG. 2 is a schematic of various communication pathways of a smart container according to at least one aspect of the disclosure.

FIG. 2 represents an exemplary embodiment of the communication pathways 200 of a smart container, such as the container 100. The control system 210 is configured to be a central hub for communication between the various components of the container. In various instances, in one aspect, the control system 210 comprises a control circuit as defined herein, such as, for example, a processor, controller, logic, FPGA, etc. In some instances, the control system 210 comprises a processor 212 and a memory 214. In such instances, the memory 214 comprises instructions which, when executed, cause the processor 212 to motivate the mechanics 220 of the container in a desired manner. In various instances, the one or more sensors 240 of the container are configured to supply data to the control system 210. In various instances, when a user drinks from the container, data is collected 230. Such data can include, for example, the duration of the drink and/or the amount of liquid that is left the container. In various instances, the control system 210 is configured to display the collected data 230 on a display on the container. In such instances, the container can comprise a visual indicator, such as a display screen or a light emitting diode (LED), among other visual indicators. The control system may communicate the collected data 230 and/or a conclusion based on the collected data 230 to the user of the container. For example, the container can display the detected number of ounces of liquid remaining in the container, the detected temperature of the liquid within the container, and/or any other detected data. In various instances, the control system 210 utilizes the information collected from the one or more sensors 240 in combination with previously-gathered data 230 to operate the mechanics 220 of the container. For example, in at least one instance, the control system 210 can take the information gathered from the one or more sensors 240 in combination with stored data 230 acquired from a previous use to issue a command that results in the mechanical components opening the lid portion of the container for a customized period of time.

Figure 3:
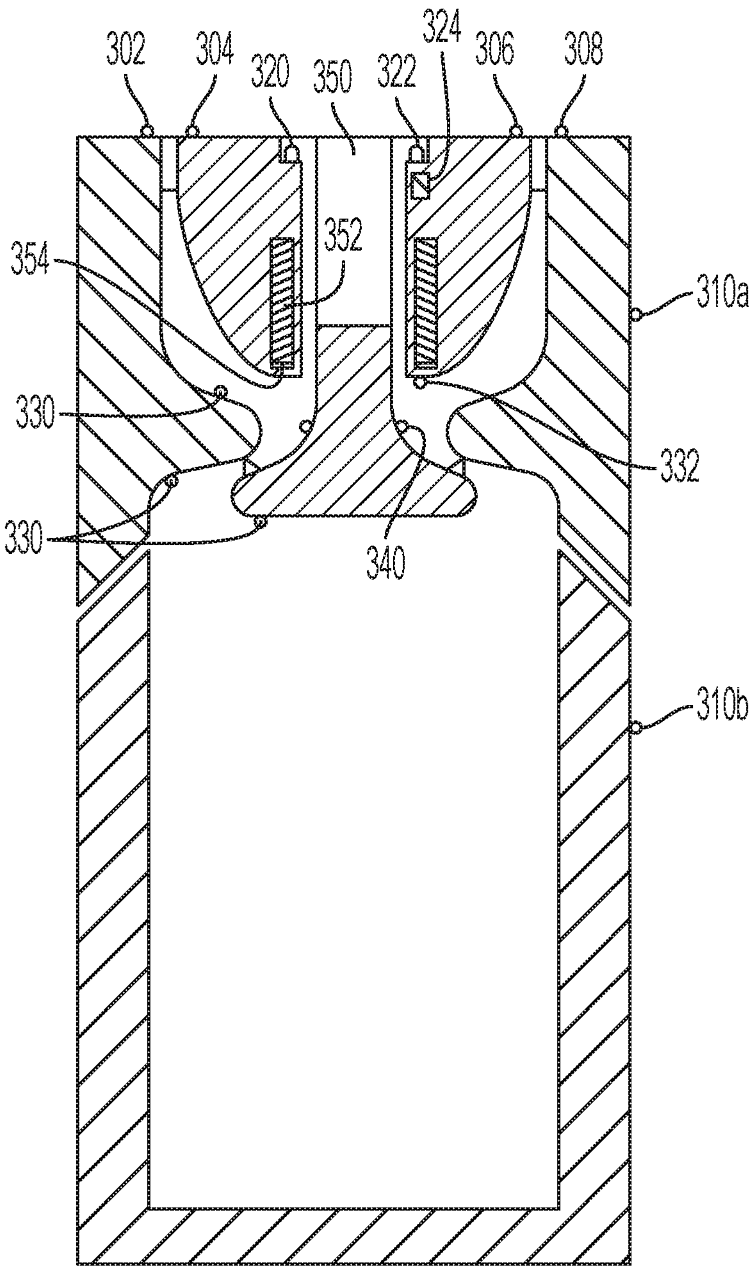
FIG. 3 is a cross-sectional view of a smart container comprising a plurality of sensors according to at least one aspect of the disclosure.

As discussed above, one or more sensors are configured to supply data to the control system. As shown in FIG. 3, the one or more sensors are positioned on the lid portion of the container, however the one or more sensors can be positioned in any suitable location on the smart container 300. In various instances, one or more sensors 302, 308 are positioned on a top exterior surface of the lid portion, such as, for example, the exterior surface 362 of the lid portion 360. One or more sensors 304, 306 can be positioned on a top exterior surface of a valve mechanism of the lid portion, such as, for example the top surface 368 of the valve assembly 365. In various instances, one or more sensors 330, 332, 340 are positioned on an interior surface of the lid portion, such as, for example a surface facing the internal cavity of the body portion 370. One or more sensors 330, 340 can be positioned on a surface of the valve assembly 365 that faces the internal cavity of the body portion 370. In various instances, one or more sensors are positioned on both the top surface and the bottom surface of the lid portion. In various instances, the one or more sensors are positioned within the lid portion. In other words, one or more sensors can be embedded within the lid portion 360 of the container 300. In various instances, one or more sensors are positioned to form an annular ring on the exterior surface 362 of the lid portion 360 and/or the exterior surface 368 of the valve assembly 365. Sensors positioned in an annular ring allows for a parameter and/or condition of the user to be detected within a 360 degree range of positions around the lid portion 360. In various instances, the lid portion 360 comprises a touch-sensitive interface configured to receive a user input. Such user inputs are discussed in greater detail herein.

As shown in FIG. 3, various sensors are incorporated into the lid portion 360 of the container 300. The exterior surface 362 of the lid portion 360 comprises a lip print sensor 302. The lip print sensor 302 is configured to detect the unique lip print of a user as the user brings the lid portion 360 in contact with the user's lips. The exterior surface 362 further comprises a temperature sensor 308 configured to detect the temperature of the surroundings outside of the container 300. In various instances, the detected external temperature can be used to heat and/or cool the temperature of the contents of the container based on user preference. The exterior surface 368 of the valve assembly 365 comprises a touch sensor 304 configured to receive a user input. In various instances, the touch sensor 304 is a touch sensitive interface configured to detect a user input and communicate the user input to a control system of the container 300. The exterior surface 368 of the valve assembly 365 further comprises an imaging sensor and/or a camera 306. In various instances, the camera 306 can be used to detect a feature of the user, such as the user's face, before allowing the contents of the container 300 to flow out of the body portion 370.

The container 300 can further comprise finger print sensors 310*a*, 310*b*. A first finger print sensor 310*a* is positioned on the lid portion 360 of the container 300 and a second finger print sensor 310*b* is positioned on the body portion 370 of the container 300. As described in greater detail herein, the finger print sensors 310*a*, 310*b* can detect a finger print of a user of the container. The control system is then configured to assess whether the user is the owner of the container 300 and/or an authorized user. If the control system is able to authenticate the user based on the data detected by the finger print sensors 310*a*, 310*b*, the contents of the container 300 are able to be dispensed.

Various sensors can also be positioned on internal surfaces of the valve assembly 368. Such sensors are in contact with the contents of the container when the valve assembly 368 is in a closed configuration and/or when the contents are dispensing from the container. For example, the internal sensors can include a liquid sensor 330 and/or a pressure sensor 332. Sensors can be positioned and/or embedded within the lid portion 360 and/or the valve assembly 365. For example, the embedded sensors can include a LI DAR sensor 324, a light emitting diode (LED) 320, and/or a receiving light diode 322. The functionality of such sensors are described in greater detail herein.

As previously mentioned, the one or more sensors comprise a camera, an optical sensor, and/or an imaging device 306. A camera 306 may be mounted on the container 300, such as, for example, on the lid portion 360, to allow for the environment of the container to be captured. In such instances, the camera 306 can capture an image of a potential user. If the captured image matches a stored image corresponding to the owner and/or an approved user of the container such as via facial recognition techniques, the control system can command the lid portion to be unlocked, allowing the user to drink the contents of the container and/or fill the container. If the captured image does not match a stored image corresponding to the owner and/or an approved user of the container, the control system can command the lid portion to remain locked.

In various instances, the one or more sensors comprise a finger print sensor 310*a*, 310*b*. The finger print sensor 310*a*, 310*b* can detect the finger print of a potential user in any appropriate manner, such as, for example, by using optics/imaging, detecting an electromagnetic field (e.g., capacitive, RF, inductive, etc.), using ultrasonic detection, using electrical, mechanical, or electro-mechanical detection (e.g., CMOS, TFT, MEMS, NEMS, Piezo-electric nanowires, carbon nano-tube nanowires, etc.), and/or using thermal detection. In various instances, the finger print sensor 310*a* is positioned on a side of the lid portion 360 of the container 300. In various instances, the finger print sensor 310*b* is positioned on a side of the body portion 370 of the container 300. In various instances, the container 300 comprises a handle and the finger print sensor is positioned thereon. However, the finger print sensor 310*a*, 310*b* may be positioned at any suitable position on the container. If the detected finger print matches a stored finger print corresponding to the owner and/or an approved user of the container, the control system can command the valve assembly 365 to open, allowing the user to drink the contents of the container and/or fill the container. If the detected finger print does match the owner and/or an approved user of the container, the control system can command the lid portion 360 to be unlocked, allowing the user to detach the lid portion 360 from the body portion 370 of the container 300. If the detected finger print does not match a stored finger print corresponding to the owner and/or an approved user of the container, the control system can command the valve assembly 365 remain in a locked configuration, preventing the dispensing of the contents of the container 300. If the detected finger print does not match a stored finger print corresponding to the owner and/or an approved user of the container, the control system can command the lid portion to remain locked, thereby preventing the unauthorized user from removing the lid portion 360 from the body portion 370.

In various instances, the one or more sensors comprise a lip print sensor 302. The lip print sensor 302 is similar in many respects to the finger print sensor 310*a*, 310*b* described above. In various instances, the lip print sensor 302 is positioned in an annular ring around the exterior surface 362 of the lid portion 360, although it will be understood that the lip print sensor 302 can be positioned in any suitable position on the container 300. The lip print sensor 302 is configured to map out a user's lips with the same and/or similar sensor(s) used in detecting a finger print. If the detected lip print matches a stored lip print corresponding to the owner and/or an approved user of the container, the control system can command the valve assembly 365 to be unlocked, allowing the user to drink the contents of the container. If the detected lip print matches a stored lip print corresponding to the owner and/or an approved user of the container, the control system can command the lid portion 360 to be unlocked, allowing the user to fill the container. If the detected lip print does not match a stored lip print corresponding to the owner and/or an approved user of the container, the control system can command the valve assembly 365 and/or the lid portion 360 to remain locked.

In various instances, the one or more sensors comprise a touch sensor 304, such as, for example, a capacitive and/or conductive sensor. In instances where a capacitive sensor is used, the capacitive sensor can also be used as a proximity sensor to detect how close a portion of the user is to the container. In various instances, the control system can command the lid portion 360 and/or the valve assembly 365 to unlock when a user comes within a predetermined distance from the container 300. In various instances, the control system can command the lid portion 360 and/or the valve assembly 365 to automatically lock when a user moves a predetermined distance away from the container 300.

In various instances, the one or more sensors comprise an internal temperature sensor 340. In various instances, the container can comprise a plurality of internal temperature sensors. In various instances, the internal temperature sensor is positioned inside the internal cavity of the body portion 370 and/or on a bottom surface of the lid portion and/or the valve assembly 365 facing the internal cavity of the body portion 370. The internal temperature sensor is configured to measure the temperature of the contents of the container. The internal temperature sensor 340 can comprise a resistance thermometer and/or an inductive sensor. In various instances, the internal temperature sensor(s) are configured to measure the temperature of the liquid within the container. In various instances, the internal temperature sensor(s) are configured to measure the temperature of the atmosphere within the container. Such an internal temperature sensor can be any suitable type of sensor for temperature measurement, such as, for example indirect sensors (e.g., IR thermometer, thermal images, etc.) and/or direct sensors (e.g., thermistor, thermocouple, etc.). In instances wherein a plurality of direct sensors is used in combination with a plurality of indirect sensors, both the temperature of the atmosphere and the temperature of the liquid within the container can be monitored and communicated to the control system. In such instances, the monitored data on the atmosphere and the liquid temperature can be used to calculate: (1) the time the liquid within the container will stay hot or cold and/or (2) potential pressure. Such sensors can also determine if there is steam in the atmosphere within the body portion 370 of the container 300. In various instances, the internal temperature sensor 340 comprises a plurality of capacitive sensors positioned along the internal wall of the body portion 370 of the container 300. Such an array of capacitive sensors allows the control system to be able to know a level of liquid within the container 300 (i.e., if the capacitive sensor is covered by the liquid). The control system is then configured to maintain the liquid within specific predetermined temperature limits. Additional capabilities of the control system with respect to temperature monitoring are discussed herein.

In various instances, the one or more sensors comprise an external temperature sensor 308. One or more external temperature sensors 308 can be placed on an external surface of the container, such as, for example, on an exterior surface 362 of the lid portion 360. Exemplary locations include, but are not limited to, the outside of the valve assembly 365, the outside of the lid portion 360, the top of the lid, within the lid portion, and/or within an electronic compartment. In various instances, the one or more external temperature sensors 308 are positioned along the path of the liquid flowing from the internal cavity towards the user interface, such as, for example, when the user pours or drinks from the container 300. In various instances, the one or more external temperature sensors 308 are positioned in the funnel coming from the valve, or stopper/plunger. The one or more external temperature sensors can be of the same type of sensor as the internal temperature sensor(s) discussed above. The external temperature sensors are configured to measure the temperature of the environment surrounding the container 300. Such measured external temperature can be used by the control system to determine, for example, when it is necessary for a heating or cooling mechanism to heat the lid portion 360, valve assembly 365, and/or fluid flow path. By heating one or more of these components, the contents of the container 300 may reach the user at a predetermined temperature. Use of the one or more external temperature sensors 308 allows for the control system (e.g., the control system 210 shown in FIG. 2) to estimate the temperature of the liquid when it reaches the user.

In various instances, the one or more sensors include a position sensor 354 configured to detect the location and/or state of the stopper and/or valve assembly 365. The location and/or state of the stopper and/or valve assembly 365 can be detected in many ways, including, for example, (1) pressure; (2) inductance of a core 350; (3) light; (4) LIDAR; (5) image sensing; (6) switch; and/or (7) magnetometer. In various instances, the location and/or state of the valve assembly 365 can be determined based on a detected pressure on a surface, such as, for example, a sealing surface where the valve assembly 365 closes.

In various instances, the valve assembly 365 comprises a core 350, such as an iron core, for example. The location and/or state of the valve assembly 365 can be determined based on inductance of the core 350. Using existing inductance technology, it is possible to measure the location of the core 350 in relationship to a coil 352. The control system (e.g., the control system 210 shown in FIG. 2) can determine the location and/or state of the plunger and/or valve assembly 365 based on a stored position of the coil 352.

In various instances, the location and/or state of the stopper and/or valve assembly 365 can be determined based on light. Using, for example, one or more Light Emitting Diodes (LEDs) 320 and a receiving diode 322, the control system can determine the position of the stopper and/or valve assembly 365, as the stopper/core is blocking the light path in a first position and the stopper/core is not blocking the light path in a second position. Such a method can also be used with multiple LEDs and receiving diodes.

In various instances, the location and/or state of the stopper can be determined based on laser scanners 324, such as, for example, LI DAR.

In various instances, the location and/or state of the stopper can be determined based on an image sensor 306, such as, for example, a camera. The camera 306 can capture images and communicate the captured images to the control system. The control system can compare the captured image(s) with stored image(s) to determine the state and/or location of the stopper and/or valve assembly 365.

In various instances, the location and/or state of the stopper and/or valve assembly 365 can be determined by a switch. In such instances, the switch gets pushed and switched into a position when the stopper and/or valve assembly 365 is in a corresponding position.

In various instances, the location and/or state of the stopper and/or valve assembly 365 can be determined by a magnetic sensor 354, such as, for example, a magnetometer. The magnetic sensor 354 can measure the location and/or state of the stopper and/or valve assembly 365 if it is comprised of a magnetic material, such as, for example, a magnetic core. Such a measurement can be taken using various different sensors, including, for example, a Hall Effect sensor. In various instances, the stopper and/or valve assembly 365 can be comprised of a permanent magnet. In various instances, the stopper, through the core 350, can hold a temporary magnetism, specifically after being activated.

In various instances, the one or more sensors include a capacitive sensor 330 positioned by the stopper and/or valve assembly 365 to determine, among other things, that fluid is passing by and/or is present at the location of the capacitive sensor 330. In various instances, the opening/valve comprises a capacitive sensor 330 in its vicinity. In various instances, the lid portion 360 comprises a capacitive sensor 330 on the opening defined between the lid portion 360 and the valve assembly 365 when the valve assembly 365 is in the open configuration. In various instances, the capacitive sensor 330 is not positioned directly at the opening of the lid portion 360. In such instances, the capacitive sensor 330 is positioned near a location where a user's lips contact the lid portion 360. In various instances, the container 300 comprises a plurality of liquid detection and/or capacitive sensors 330. In such instances, at least one capacitive sensor 330 can be placed by where the user's lips contact the lid portion 360, at least one capacitive sensor 330 can be positioned by the opening of the lid portion, and at least one capacitive sensor 330 within the lid portion 360 along the fluid flow path. Such placement allows for the control system to calculate the liquid's current position along the fluid flow path. Such placement further allows for the control system to determine the speed and/or direction that the fluid is being dispensed and/or flowing. In various instances, the capacitive sensors 330 allow the control system to determine the amount of liquid and/or fluid that is flowing along the flow path. Suitable examples of a capacitive sensor include any sensor configured to detect liquid. In various instances, the liquid sensor can detect the presence of a liquid by another type of sensor, such as, for example, a pressure sensor.

Figure 4:
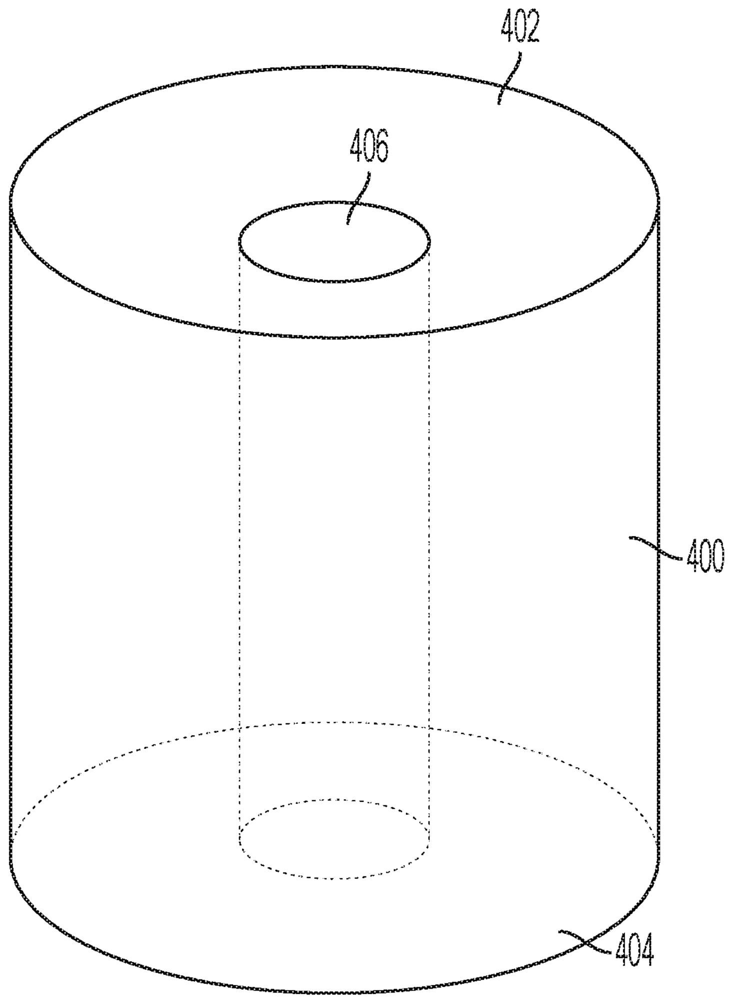
FIG. 4 is a perspective view of a power source for use with a smart container according to at least one aspect of the disclosure.

FIG. 4 illustrates a power source 400 for use with a smart container. In various instances, the power source 400 comprises a battery to power various mechanisms discussed herein. In various instances, the battery 400 comprises a cylindrical shape. In other instances, the battery 400 may comprise several shapes such a rectangular shape, square shape, button shape, coin shape, among other shapes. The battery 400 comprises a first end 402 and a second end 404. A middle portion of the battery 400 further defines a hole 406 or aperture therethrough, forming a shape that mimics the appearance of a donut. In various instances, a plurality of batteries 400 comprising a donut shape are connected in parallel, although any suitable battery shape can be used. In various instances, the battery comprises a pouch cell with a hole in the middle.

Figure 5:
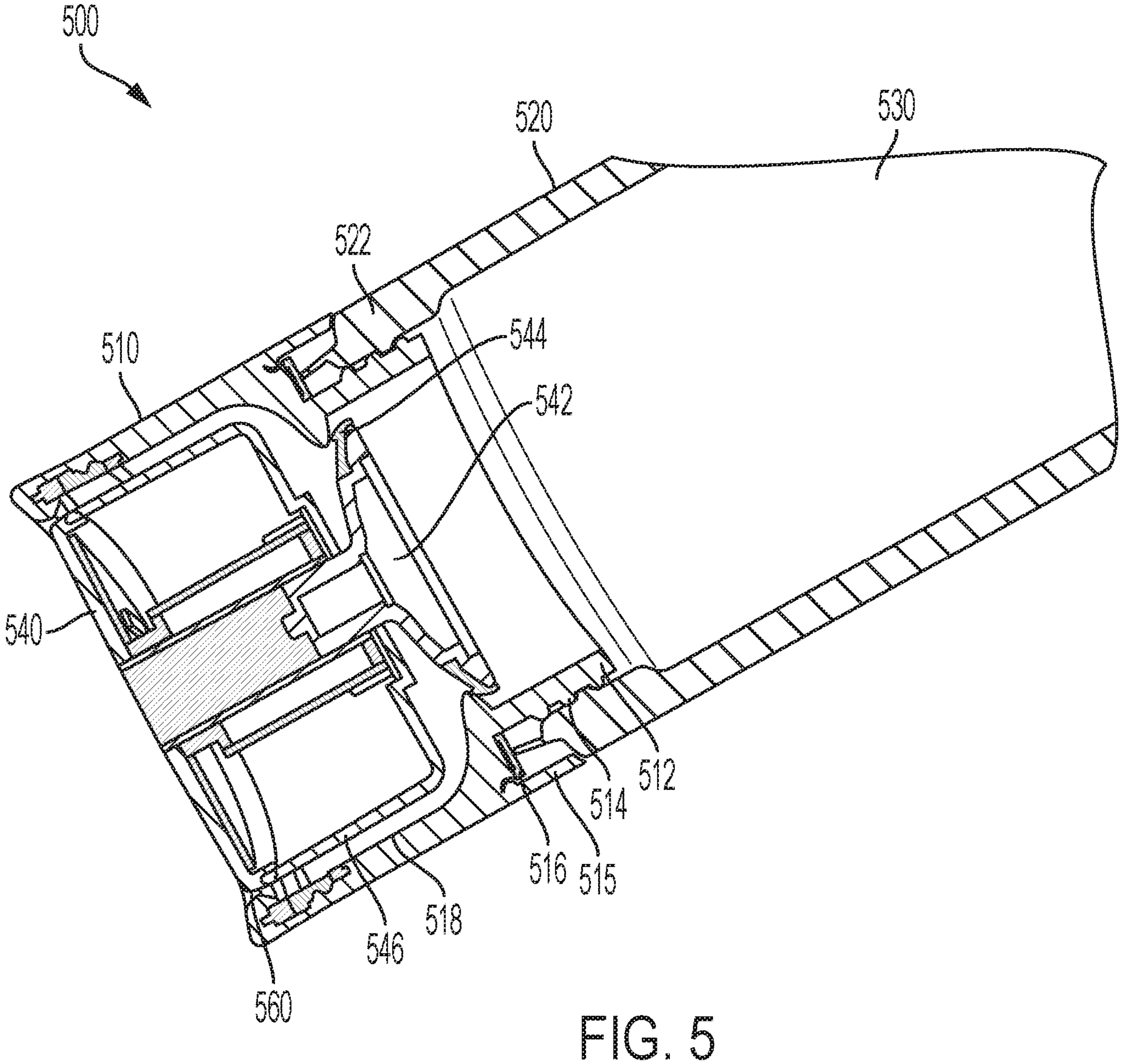
FIG. 5 is a partial cross-sectional view of a valve assembly of a smart container in a closed configuration according to at least one aspect of the disclosure.

As shown in FIG. 5, a container 500 comprises a lid portion 510 configured to be selectively locked to a body portion 520. In various instances, the lid portion 510 is locked to the body portion 520 through a latching mechanism. In various instances, the lid portion 510 can be screwed onto the body portion 520 of the container 500 via corresponding threads. Once aligned, a grooved portion 522 on the body portion 520 is sized to fit within a first portion 514 and a second portion 515 of the lid portion 510. However, other suitable attachment mechanisms can be used. Once the lid portion is sufficiently attached, a latching mechanism is engaged to lock the lid portion 510 into place. As described in greater detail herein, once the lid portion 510 is locked into place by the latching mechanism, the lid portion 510 is unable to be removed from the body portion 520 by, for example, simply unscrewing the lid portion 510. In such instances, the latching mechanism must first be unlocked. In various instances, the latching mechanism may be unlocked by entering a unique code on the touch-sensitive interface as described above. In various instances, the unique code is a series of numbers and/or letters chosen from the touch-sensitive interface. In various instances, the unique code is a pattern of touches on the touch-sensitive interface. In addition, other suitable methods for unlocking a system based on a unique code entered on a touch-sensitive interface are envisioned. Additionally, other suitable methods for unlocking a system discussed herein are envisioned, such as, for example, finger print detection, lip print detection, etc.

Figure 6:
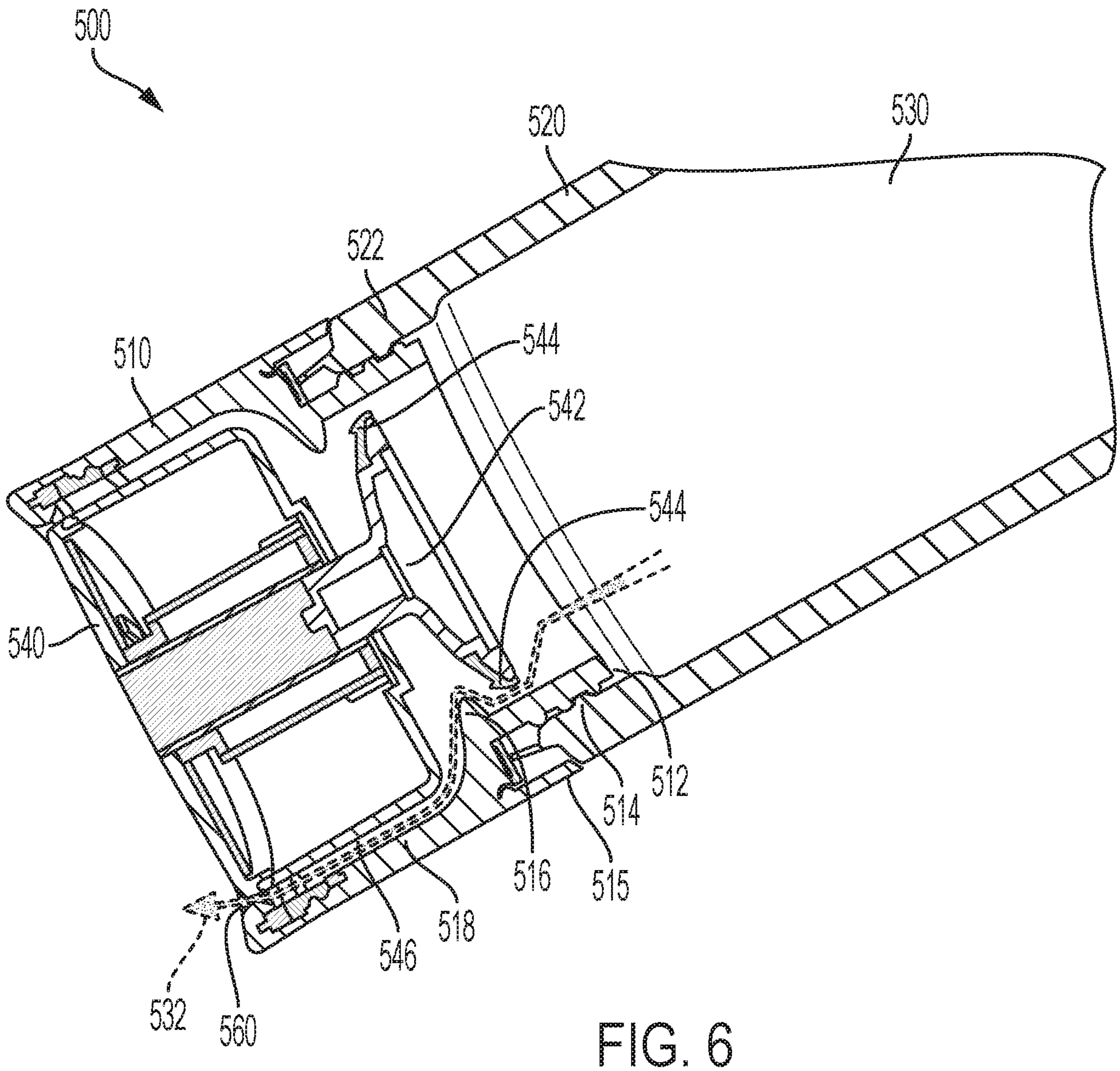
FIG. 6 is a partial cross-sectional view of the valve assembly of FIG. 5 in an open configuration according to at least one aspect of the disclosure.

As discussed above, the container 500 comprises a valve assembly 540 and/or plunger configured to control the ability for fluid and/or contents to flow from the internal cavity 530 of the body portion 520 through the opening 560 defined between a lid portion and the valve assembly. As shown in FIGS. 5 and 6, the valve assembly 540 is configured to move between a first position and a second position. The valve assembly 540 is shown in the first, or closed, position in FIG. 5. When the valve assembly 540 is in the first position, fluid is prevented from flowing from the internal cavity 530 of the body portion 520 and out of the opening 560. The valve assembly 540 is shown in the second, or open, position in FIG. 6. When the valve 540 is in the second position, contents of the container, represented by the arrow, are capable of freely flowing along a flow path from the internal cavity 530 and out through the opening 560. In various instances, the valve 540 can be locked in a desired position and/or state. In such instances, the position and/or state of the valve 540 cannot be changed manually through physical input from an external force. In other words, for example, a user is unable to push the valve 540 from a closed state into an open state or vice versa. In other instances, a user is able to manually alter the position and/or state of the valve 540 through applying a physical input. In various instances, the valve 540 is locked into a specific position/state by a pin or any other suitable latching feature. In various instances, in addition to the automatic control of the valve 540 of the container 500, the container 500 also may comprise a device and/or mechanism for manually overriding the automatic control. Such a manual override may comprise, for example, a user entering a unique code on the touch-sensitive interface and/or activation of a reset feature. In various instances, the container 500 may be locked or unlocked by a robot or other machine, for example. This may be particularly useful during product testing.

Figure 7:
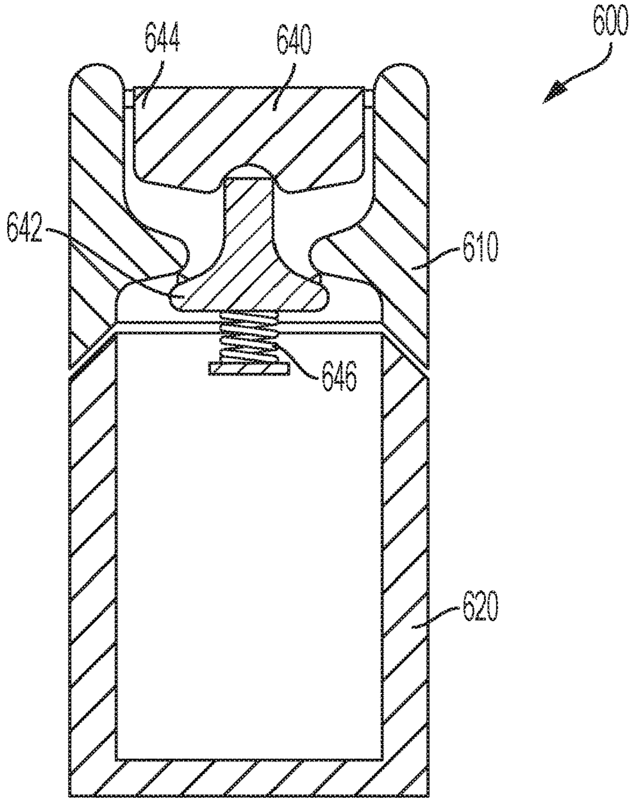
FIG. 7 is a cross-sectional view of a valve assembly of a smart container, wherein the valve assembly comprises a deformable member, and wherein the valve assembly is in a closed configuration according to at least one aspect of the disclosure.

When the valve is in the closed configuration, the valve prevents and/or prohibits liquid to flow out or through the opening. In at least one instance, and as shown in FIG. 7 in order to keep the valve 640 in the closed state, the container 600 comprises a biasing member 646, such as, for example, a spring force, biasing and/or maintaining the valve 640 in the closed position. In various instances, in an effort to prevent and/or hinder the valve from moving into an open state when an external force is applied from, for example, a user who is manually trying to open the valve, a latching pin can move into position. In such instances, the latching pin effectively holds the valve in position even in the event of an external force being applied from outside of the container and/or lid portion. One or more opening mechanisms and/or actuators can be used to control the state of the valve. Such opening mechanisms include, for example: (1) deformable material; (2) piezoelectric material; (3) electric motor; (4) solenoid; (5) other electromechanical solutions; (6) hydraulics; (7) pump system; and/or (8) pneumatics.

Figure 8:
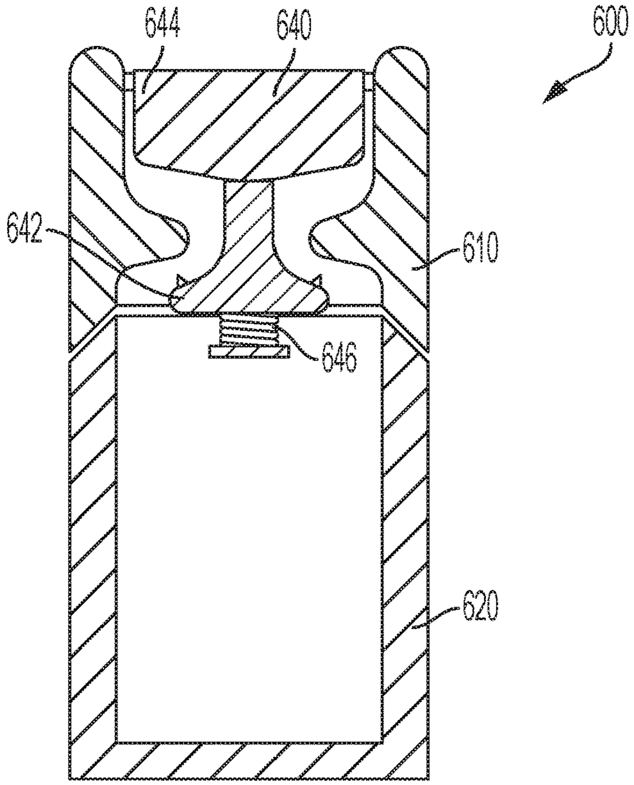
FIG. 8 is a cross-sectional view of the valve assembly of FIG. 7 in an open configuration according to at least one aspect of the disclosure.

Referring now to FIGS. 7 and 8, the container 600 comprises at least a portion of the valve assembly 640 comprises a deformable material. In various instances, the valve assembly 640 comprises a top portion 644 comprised of deformable material. In various instances, the valve assembly 640 comprises a plunger portion 642 comprised of deformable material. In various instances, the deformable material comprises a shape-memory alloy such as, for example, SMA, smart metal, memory metal, muscle wire, and/or smart alloy. In various instances, the deformable material changes shape when exposed to heat, such as heat from an electrical current. Examples of suitable alloys include, but are not limited to, copper-aluminum-nickel and nickel-titanium (NiTi). The valve assembly 640 is shown in a closed state in FIG. 7. In its resting state, the deformable material maintains a size of the valve assembly 640 that allows for a biasing member 646 to push upwardly on the plunger portion 642 and block the ability for the contents of the container 600 to be dispensed. As the deformable material in the valve assembly 640 changes shape, the valve assembly 640 is opened. As shown in FIG. 8, the deformable material expands, thereby pushing the plunger portion 642 against the biasing member 646 and toward the body portion 620 of the container 600. The expansion of the deformable material and the subsequent displacement of the plunger portion 642 creates a path to allow the contents of the container 600 to be dispensed. In various instances, the deformable material is configured to return to its original, resting state after it returns to a cooler temperature.

In various instances, the containers described herein further comprise an electric motor configured to open and close the valve assembly in response to commands from the control system. In various instances, alternative mechanics, such as, for example, a solenoid can be used in opening and closing the valve assembly.

Figure 9:
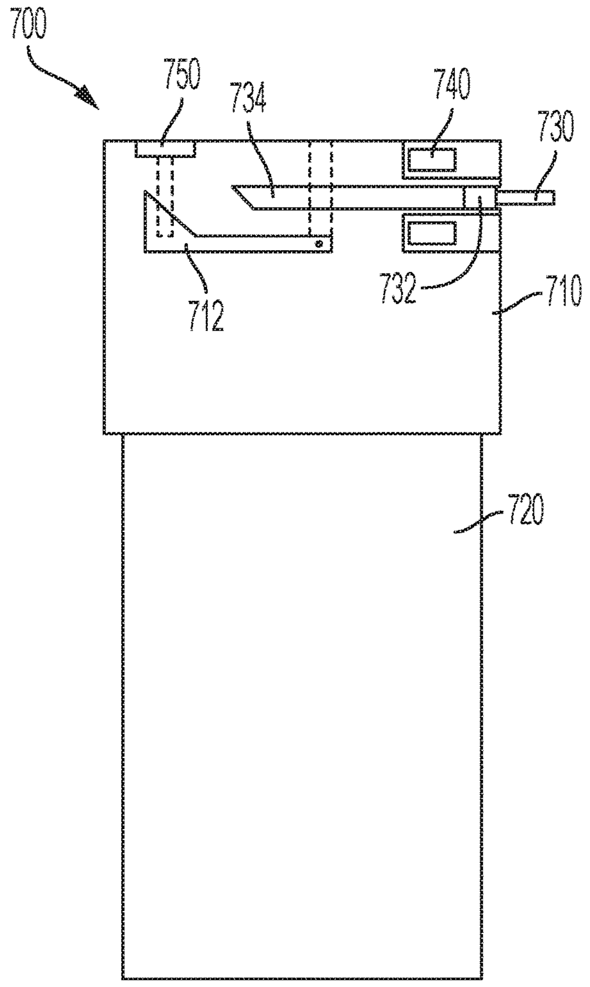
FIG. 9 is a cross-sectional view of a valve assembly of a smart container in a closed configuration, wherein the valve assembly comprises a solenoid and a manual override according to at least one aspect of the disclosure.
Figure 10:
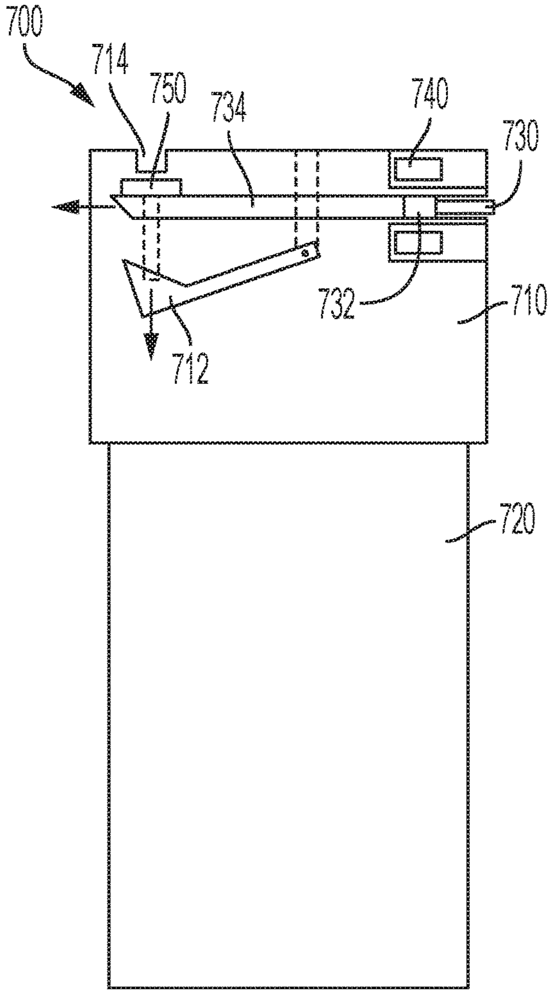
FIG. 10 is a cross-sectional view of the valve assembly of FIG. 9 in an open configuration according to at least one aspect of the disclosure.

Referring now to FIGS. 9 and 10, a container 700 comprises a lid portion 710 and a body portion 720. The lid portion 710 comprises an opening 714 through which the contents of the body portion 720 can be dispensed when the opening 714 is not blocked by a latching mechanism. As shown in FIG. 9, the latching mechanism is in a closed configuration, thereby preventing the flow of fluid out of the body portion 720 and through the opening 714. The latching mechanism comprises a plunger member 750 and an arm 712 comprised of a non-magnetic material, such as plastic, for example. The lid portion 710 further comprises a coil 740 and a core 732, such as an iron core. In the illustrated embodiment, the core 732 is positioned on a pin 730 that allows for a manual override of the latching mechanism, although the core 732 can be positioned in any suitable location. Activation of the solenoid 732, 740 causes the pin 730 to translate inwardly toward the latching mechanism. The inward movement of the pin 730 pushes a first end 734 of the pin 730 into a portion of the arm 712, thereby biasing the arm 712 downward into an open configuration. As the arm 712 is pulled down, the plunger member 750 is pulled with the arm 712, and the plunger member 750 is no longer blocking the opening 712 on the lid portion 710. When the plunger member 750 is moved out of the way of the opening 712, fluid is able to be dispensed out of the container 700 from the body portion 720. Alternatively, a user can push the pin 730 inwardly from the outside of the container 700 to perform a manual unlocking of the latching mechanism. The movements of the plunger member 750 and the pin 730 as the latching mechanism is being unlocked are represented by arrows in FIG. 10.

In various instances, a container comprises a pump system allowing liquid to be pumped up from the internal cavity. In various instances, the pump system allows liquid to be pumped into and/or out of the internal cavity. In various instances, the pump system is driven as an electromechanical solution and/or any other suitable force-generating solution, such as, for example, hydraulic and pneumatic.

In various instances, the containers described herein are configured to continuously adjust the position of the opening on the lid portion. For example, regardless of the orientation that a user picks up the container, the opening is automatically positioned at the location of the user's lips. Such continuous adjustment can be accomplished through visual recognition and/or cap sensors as described herein.

In various instances, the opening hole can be rotated as the control system receives the detected degree of tilt of the container. The control system is then configured to position the location of the opening at the lowest point of the circumference around the lid portion. In various instances, the container is configured to only open the lid portion where the lips of the user are detected. The lid portion can open in response to, among other things, pressure applied by the lips of a user, detection of a lip print, and/or other suitable detection means as described herein.

In various instances, the control system of the container is configured to vary the rate at which the fluid is dispensed from the container. For example, the control system can control the degree to which the valve assembly, and thus the opening, is open. At t=1, the opening can be open to a small degree. If the user keeps drinking, if the container is continuously tilted, if the user's lips are in constant contact with the container, and/or if the user's lips provide a pre-determined input, the control system is configured to open and/or restrict the opening to a certain degree. For example, users can begin drinking a hot liquid, such as coffee, slowly and avoid burning themselves upon encountering a heavy stream of hot liquid. After the user encounters the hot liquid, the user can determine if the liquid should be dispensed faster or slower.

In various instances, the containers described herein comprise more than one opening. The plurality of openings are arranged symmetrically along a circumference of the lid portion. For example, the container comprises three openings spread out 120 degrees apart. The presence of multiple openings allows a user to conveniently drink out of the container regardless of the orientation the user holds the container. As described above, the container comprises a continuous adjustment mechanism that allows a user to selectively orient the container while drinking and the container will adjust the fluid flow and/or the location of the opening. Such a continuous adjustment allows for the user to freely hold the container and/or select the closest opening without the contents of the container flowing and/or leaking from other openings. The presence of multiple openings also allows for multiple users to drink out of the same container without, for example, spreading germs. Each opening can be indicated using, for example, different colored LEDs for each specific user. Furthermore, the control system can permit the contents of the container to be dispensed only from the opening that corresponds to the detected user.

The location of the latching mechanisms described herein is not intended to be limited to the illustrated embodiments. In other words, the latching mechanisms can be located at any suitable position within the container, such as, for example, above where the plunger of the latching mechanism sits.

In various embodiments, one or more springs can be used in combination to move the valve between an open and closed position. In various embodiments, the container comprises a latching feature, such that power is only needed while moving the valve into a new position (i.e., from a closed position to an open position or from an open position to a closed position).

Referring now to FIGS. 11-24, the container 900 comprises a lid portion 910 and a body portion 920. The lid portion 910 further comprises a valve assembly 932 comprising a locking member 934 configured to lock the valve assembly 932 in place within the lid portion 910. The latching feature permits the valve assembly 932 to remain in a fixed orientation regardless of the position and/or state that the container 900 is in. Such a fixed position is achieved by, for example, moving the valve assembly 932 along a translational and rotational vertical path. The valve assembly 932 may be moved by an electrical mechanical solution, such as those described in greater detail herein. Without such movement, the valve assembly 932 would not be in a fixed state. Using a retractable pen as an example, when a user presses downward on the top of the pen, the tip of the pen is extended and locks into place at the bottom of the housing for use. As an example of an unfixed state, the top of the pen is loosely kept in a downward position. In other words, the top of the pen is able to wiggle between positions when the pen is moved in different orientations. When the top of the pen is pushed downward to retract the tip back into the housing of the pen, the top of the pen rigidly stays in its extended position. For clarity, FIG. 11 does not show the biasing member, such as, for example, a spring, positioned below the valve assembly 932.

Figure 11:
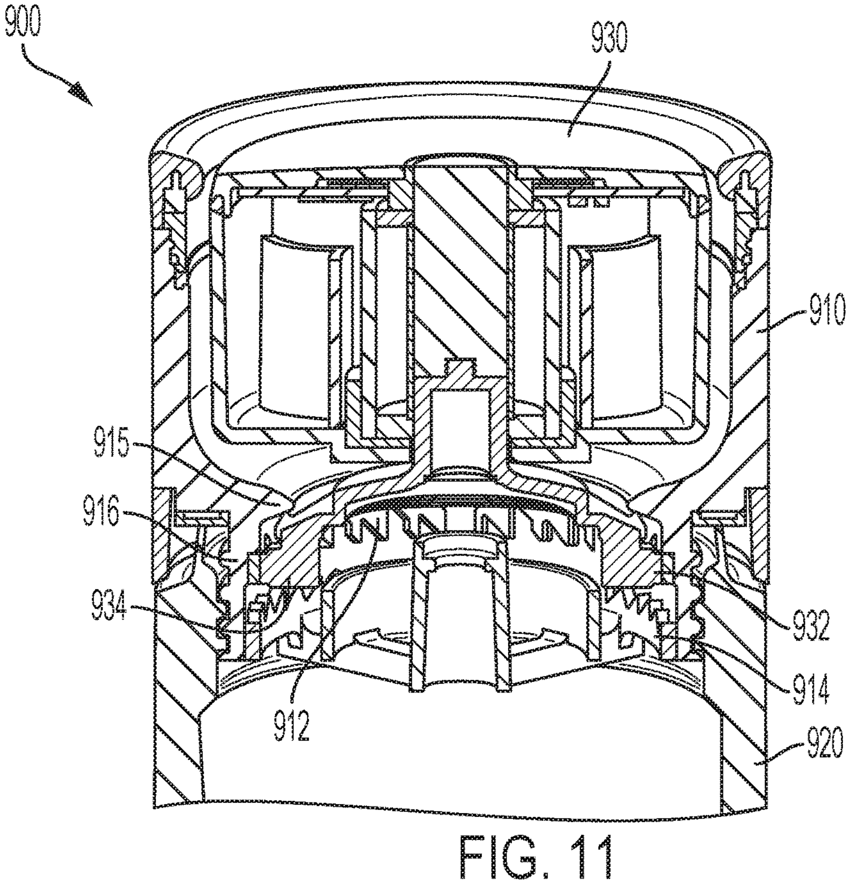
FIG. 11 is a partial cross-sectional view of a latching mechanism for a valve assembly according to at least one aspect of the disclosure.

The lid portion 910 comprises a projection 916 that facilitates attachment of the lid portion 910 to the body portion 920 of the container 900. As depicted in FIG. 11, the lid portion 910 comprises two tracks defined on an internal surface of the projection 916. The two tracks extend around the entire internal circumference of the lid portion 910. The two tracks comprise an upper track 912 and a lower track 914. The locking member 934 of the valve assembly 932 is sized to be received and translate in a path defined by the upper track 912 and the lower track 914 as the valve assembly 932 is opened and closed.

Figure 12:
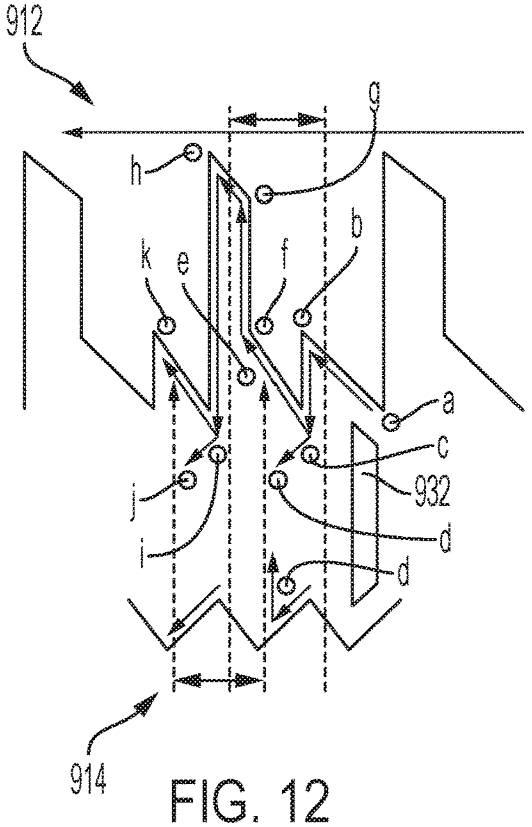
FIG. 12 is a schematic representation of a path followed by the valve assembly of FIG. 11 during an opening and a closing process according to at least one aspect of the disclosure.
Figure 13:
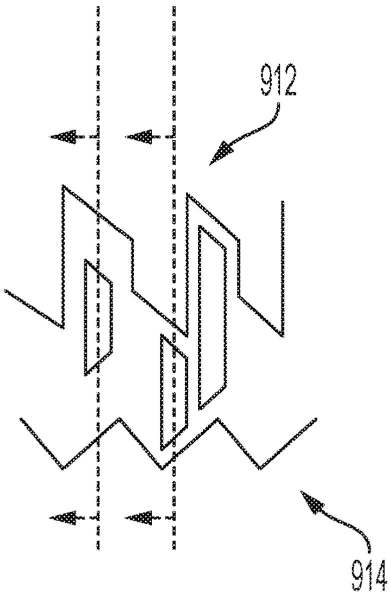
FIG. 13 is a schematic representation of a path followed by the valve assembly of FIG. 11 during an opening and a closing process according to at least one aspect of the disclosure.

The ability for the valve assembly 932 to move between a closed, or locked, orientation to an open, or unlocked, orientation can be achieved through the process depicted in FIGS. 11-24. FIGS. 12 and 13 depict the general path of the locking member 934 of the valve assembly 934. The path for the locking member 934 is represented by arrows and alphanumeric numerals from a-k corresponding to various positions of the locking member 934 during the unlocking and locking processes. In various instances, the path and/or state of the valve assembly 932 progresses as follows: (a) Closed; (b) Moving downward to open; (c) Rotating to open; (d) Moving up to open; (e) Rotating to open latched position; (f) Moving down to close; (g) Rotating to close; (h) Moving up to close; (i) Rotating to close; (j) Moving up to close; and (k) Rotating to closed position then repeating.

Figure 14:
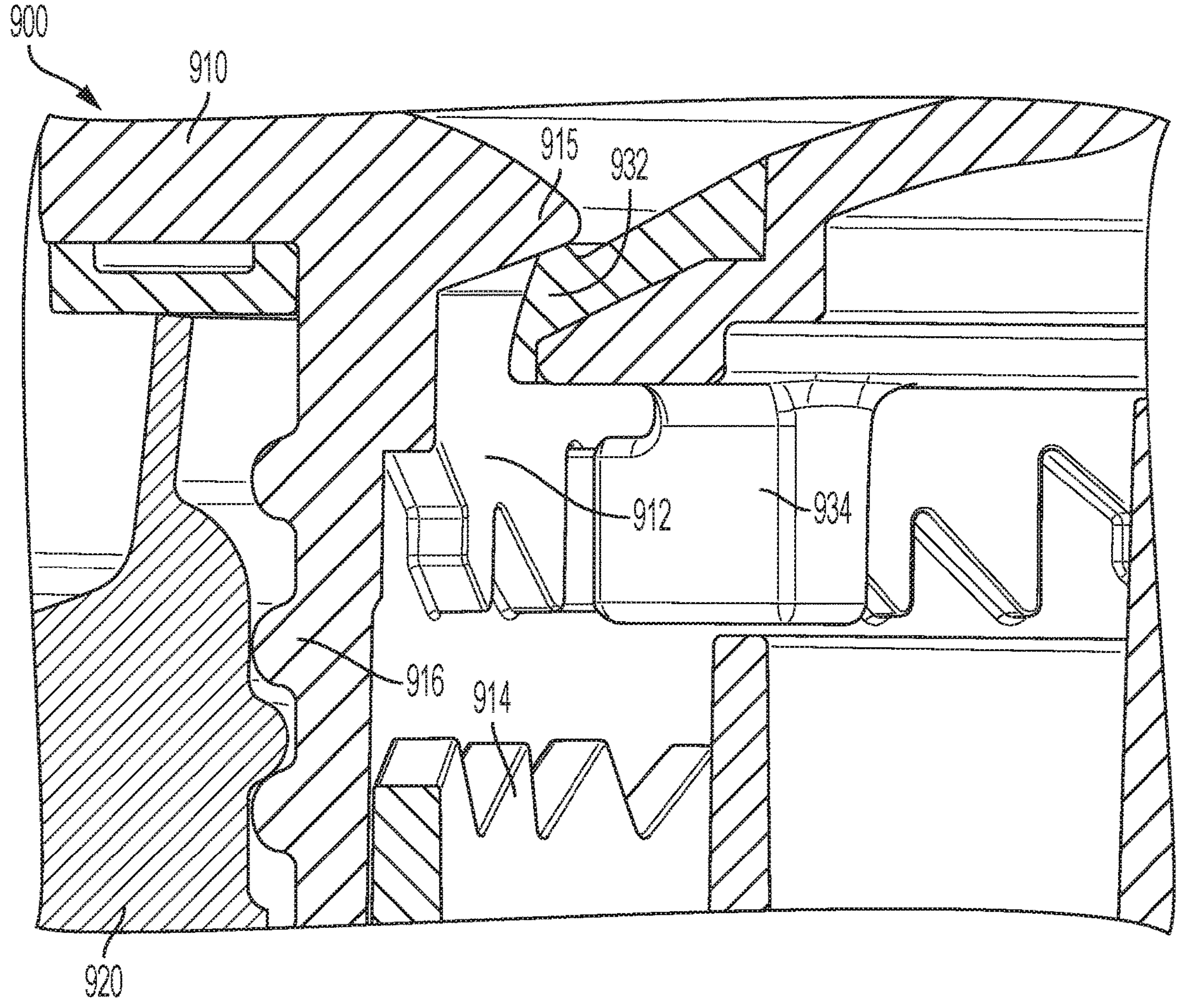
FIG. 14 is a partial cross-sectional view of the latching mechanism of FIG. 11 when the valve assembly is in a closed configuration according to at least one aspect of the disclosure.
Figure 15:
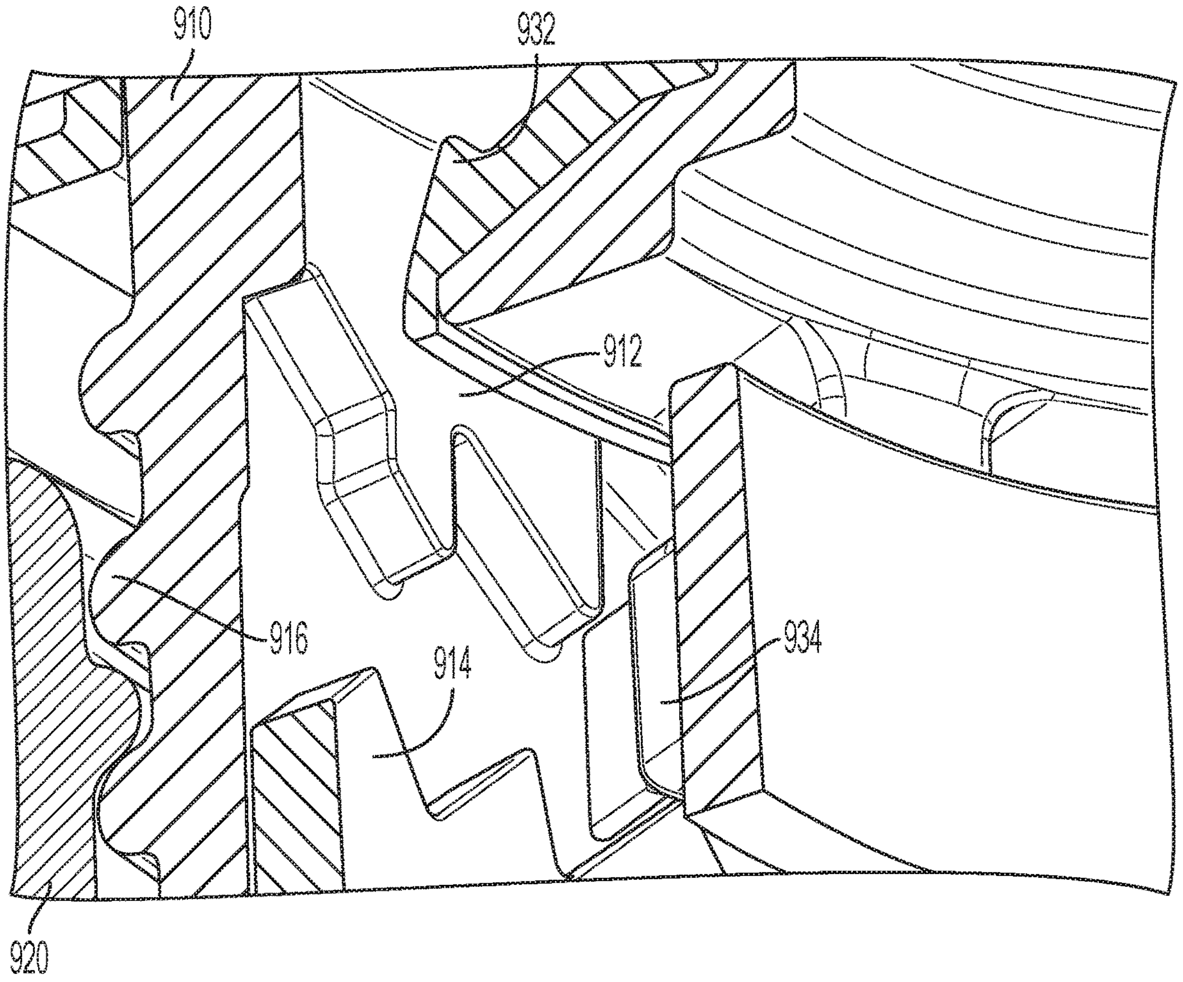
FIG. 15 is a partial cross-sectional view of the latching mechanism of FIG. 14 when the valve assembly is translated downward out of the closed configuration according to at least one aspect of the disclosure.
Figure 16:
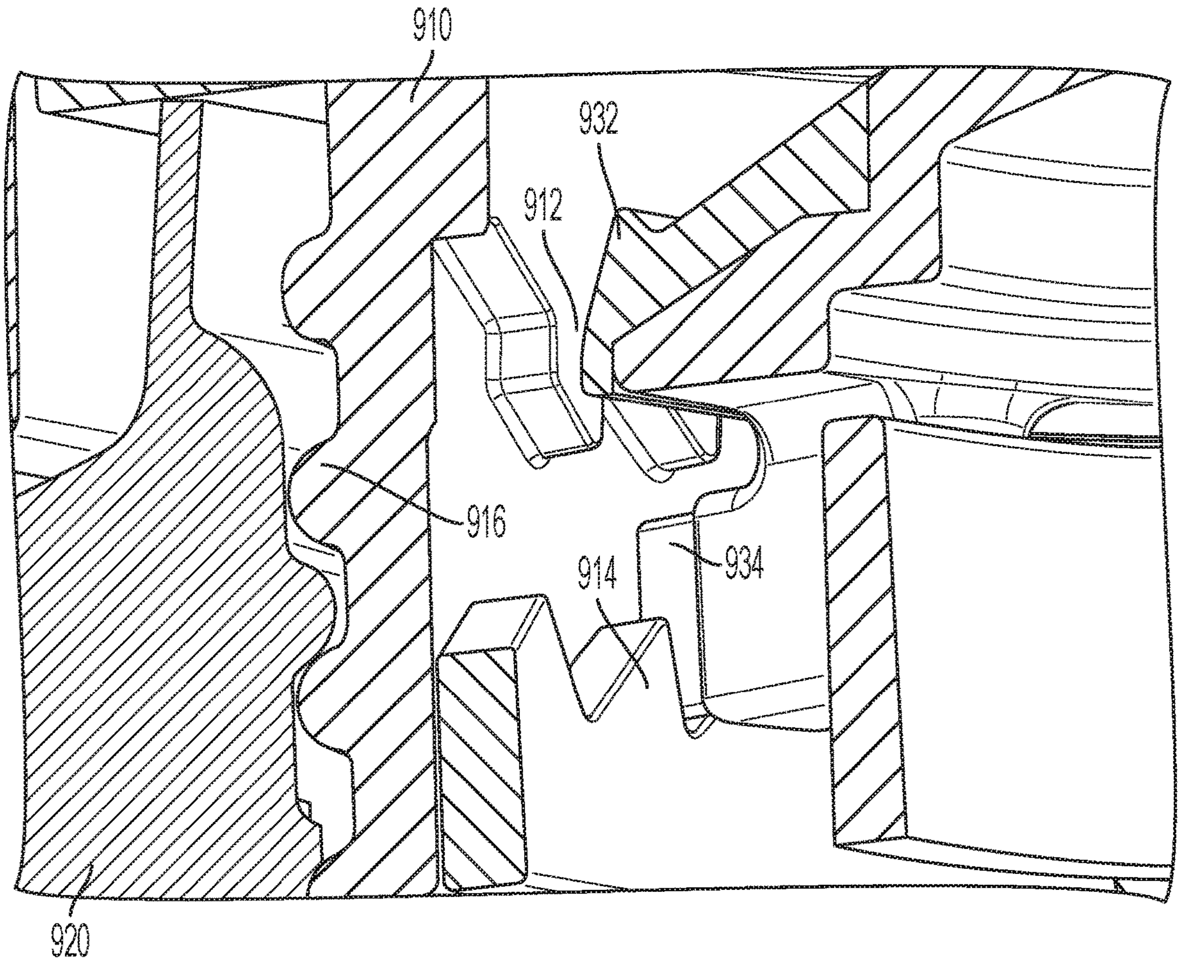
FIG. 16 is a partial cross-sectional view of the latching mechanism of FIG. 15 when the valve assembly is rotated toward an open configuration according to at least one aspect of the disclosure.
Figure 17:
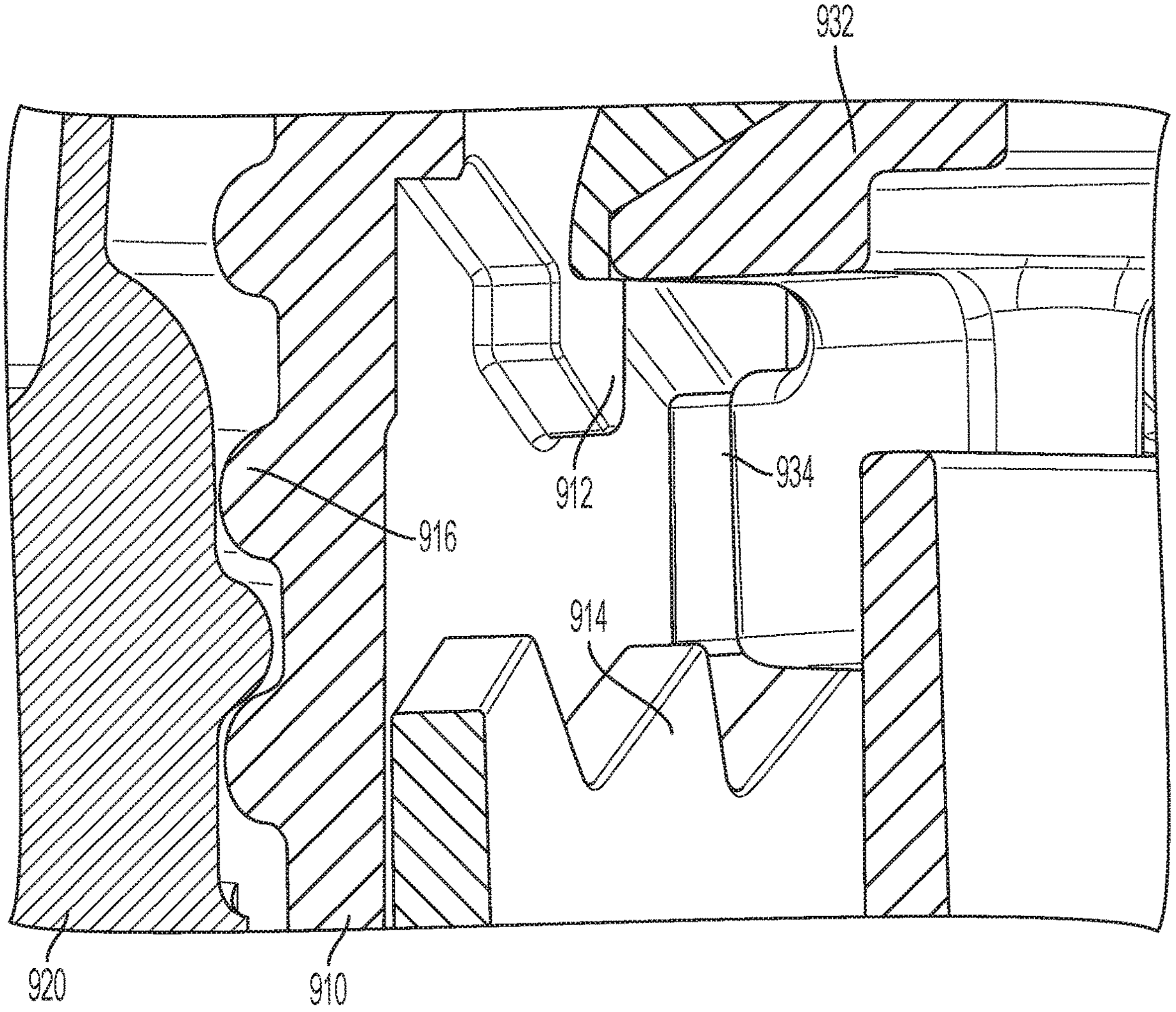
FIG. 17 is a partial cross-sectional view of the latching mechanism of FIG. 16 when the valve assembly is translated upward toward an open configuration according to at least one aspect of the disclosure.
Figure 18:
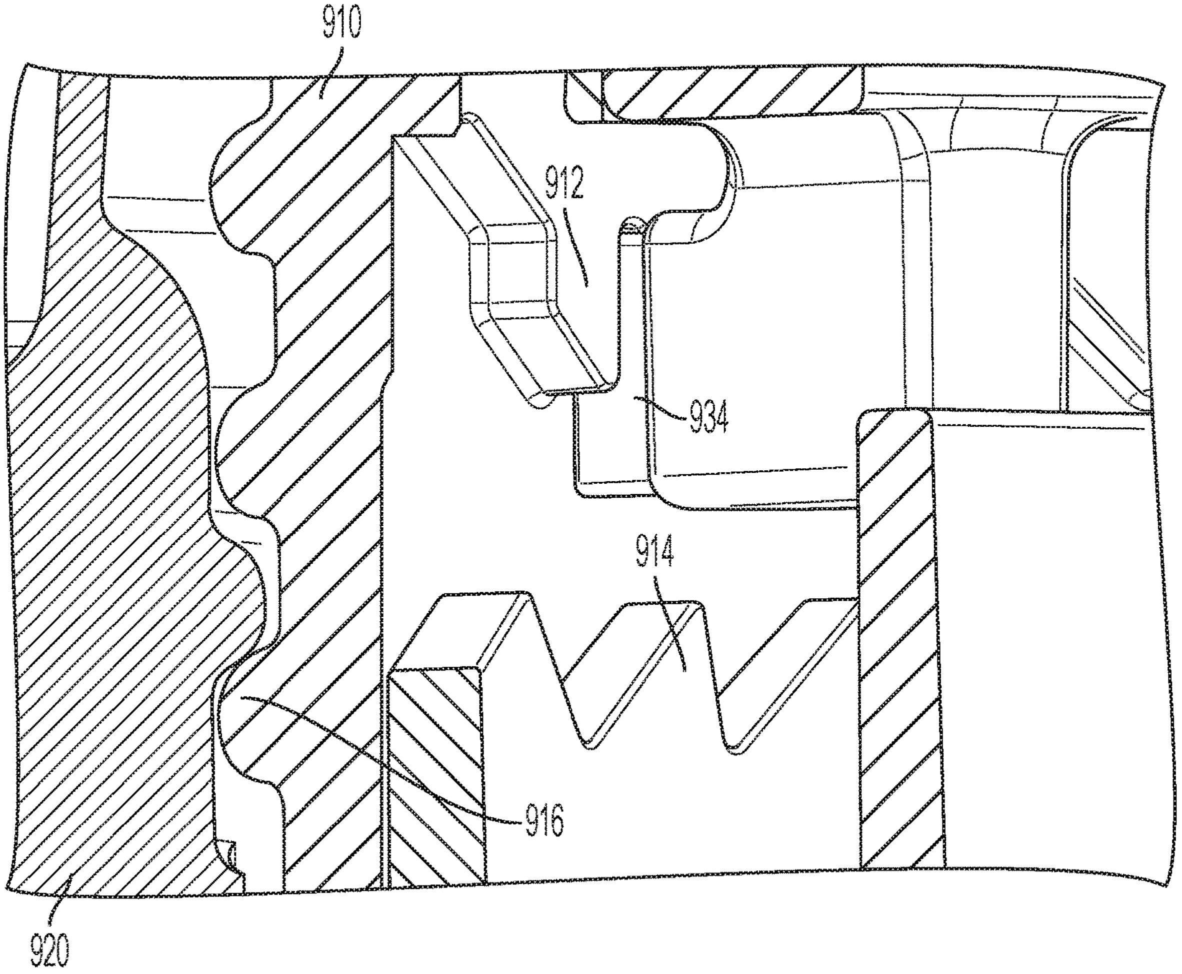
FIG. 18 is a partial cross-sectional view of the latching mechanism of FIG. 17 when the valve assembly is rotated into an open configuration according to at least one aspect of the disclosure.

FIG. 14 is a partial cross-sectional view of the valve assembly 932 in a closed, or locked, configuration. The locking member 934 is in engagement with the teeth defined by the upper track 912. Notably, the locking member 934 does not interface with the lower track 914. In order for the valve assembly 932 to move into an open, or unlocked, configuration, the locking member 934, and thus the valve assembly 932, is initially moved downward as shown in FIG. 15. The locking member 934 is moved out of contact with the teeth defined by the upper track 912 and is moved into engagement with the teeth defined by the lower track 914. Similar to the retractable pen example described herein, the locking member 934 is capable of wiggling between the position depicted in FIG. 14 and the position depicted in FIG. 15. Depicted in FIG. 16, the locking member 934 continues toward an open, or unlocked, configuration by rotating along the path defined by the teeth of the lower track 914. Notably, the locking member 934 is still in contact with the lower track 914. To reach the open, or unlocked, configuration as shown in FIGS. 17 and 18, the locking member 934 is then biased upwardly into engagement with the teeth of the upper track 912 and then rotated along the path defined by the teeth of the upper track 912.

Figure 19:
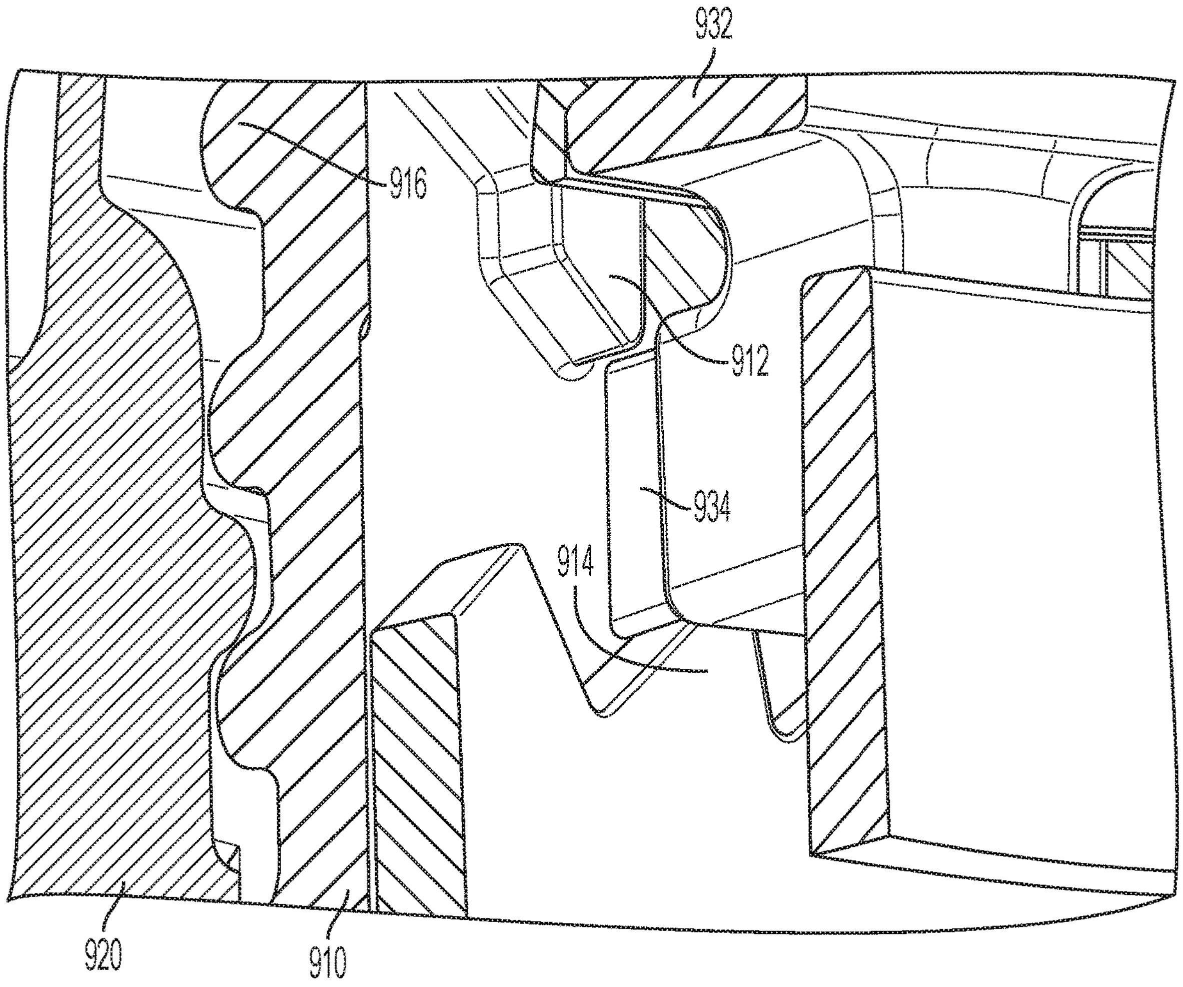
FIG. 19 is a partial cross-sectional view of the latching mechanism of FIG. 18 when the valve assembly is translated downward out of the open configuration according to at least one aspect of the disclosure.
Figure 20:
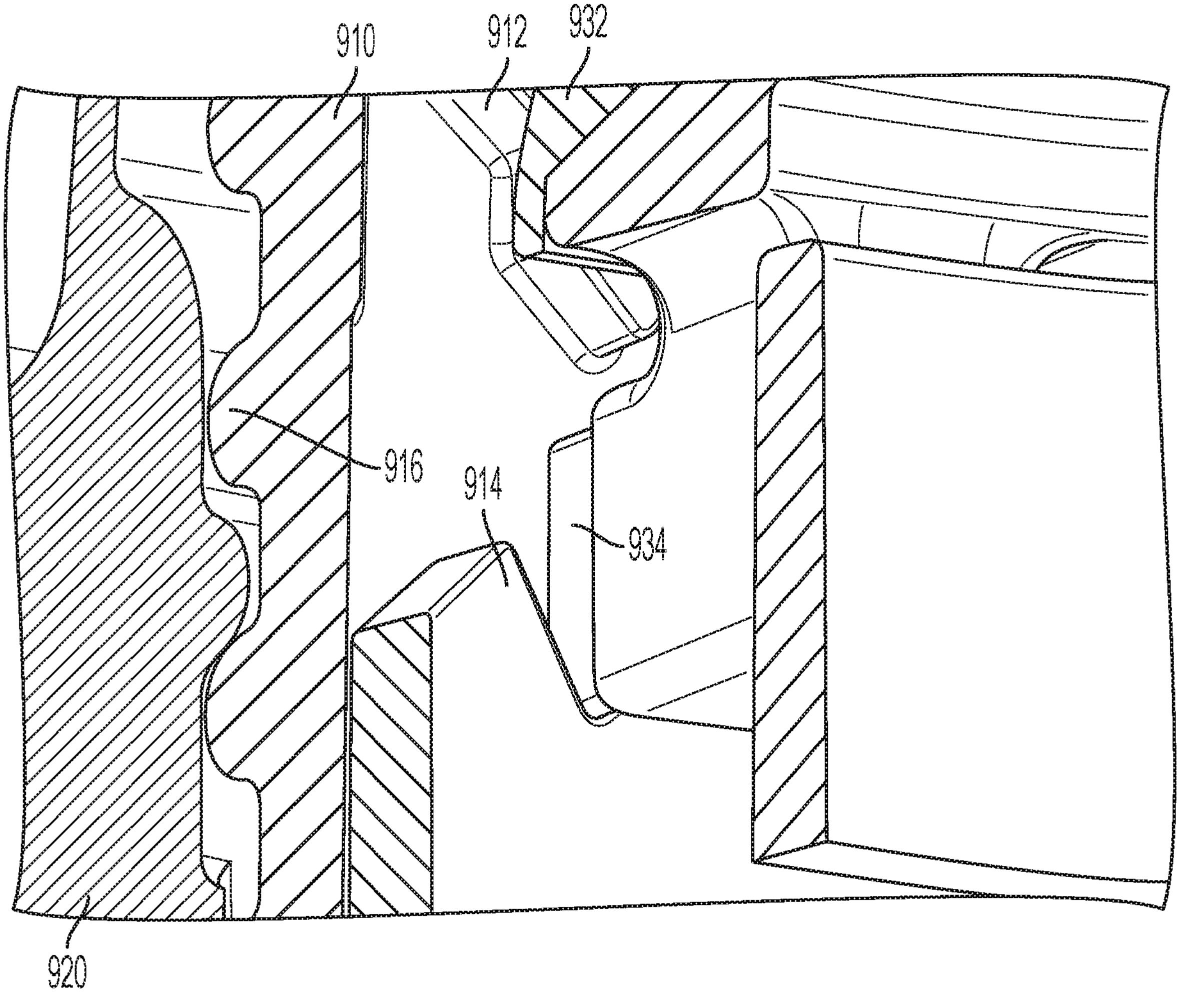
FIG. 20 is a partial cross-sectional view of the latching mechanism of FIG. 19 when the valve assembly is rotated toward a closed configuration in accordance with at least one aspect of the disclosure.
Figure 21:
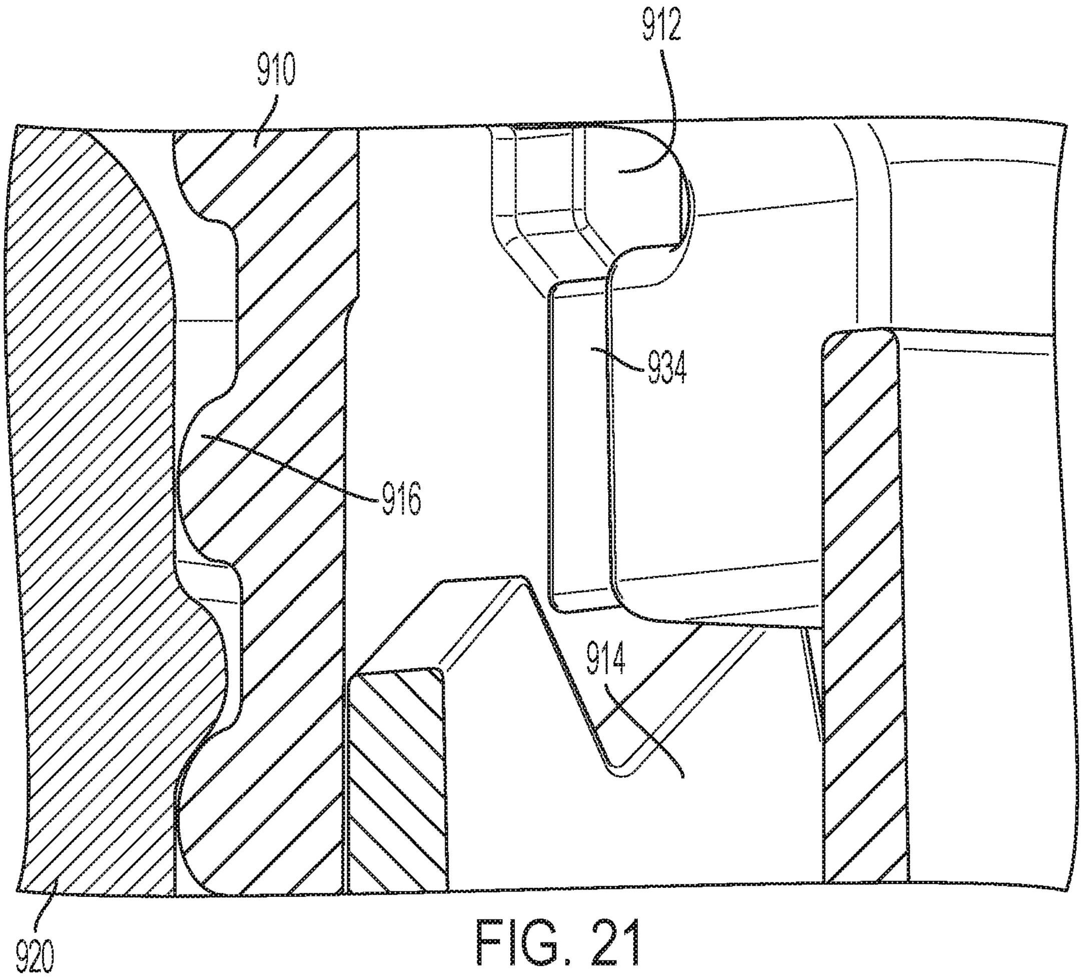
FIG. 21 is a partial cross-sectional view of the latching mechanism of FIG. 20 when the valve assembly is translated upward toward a closed configuration in accordance with at least one aspect of the disclosure.
Figure 22:
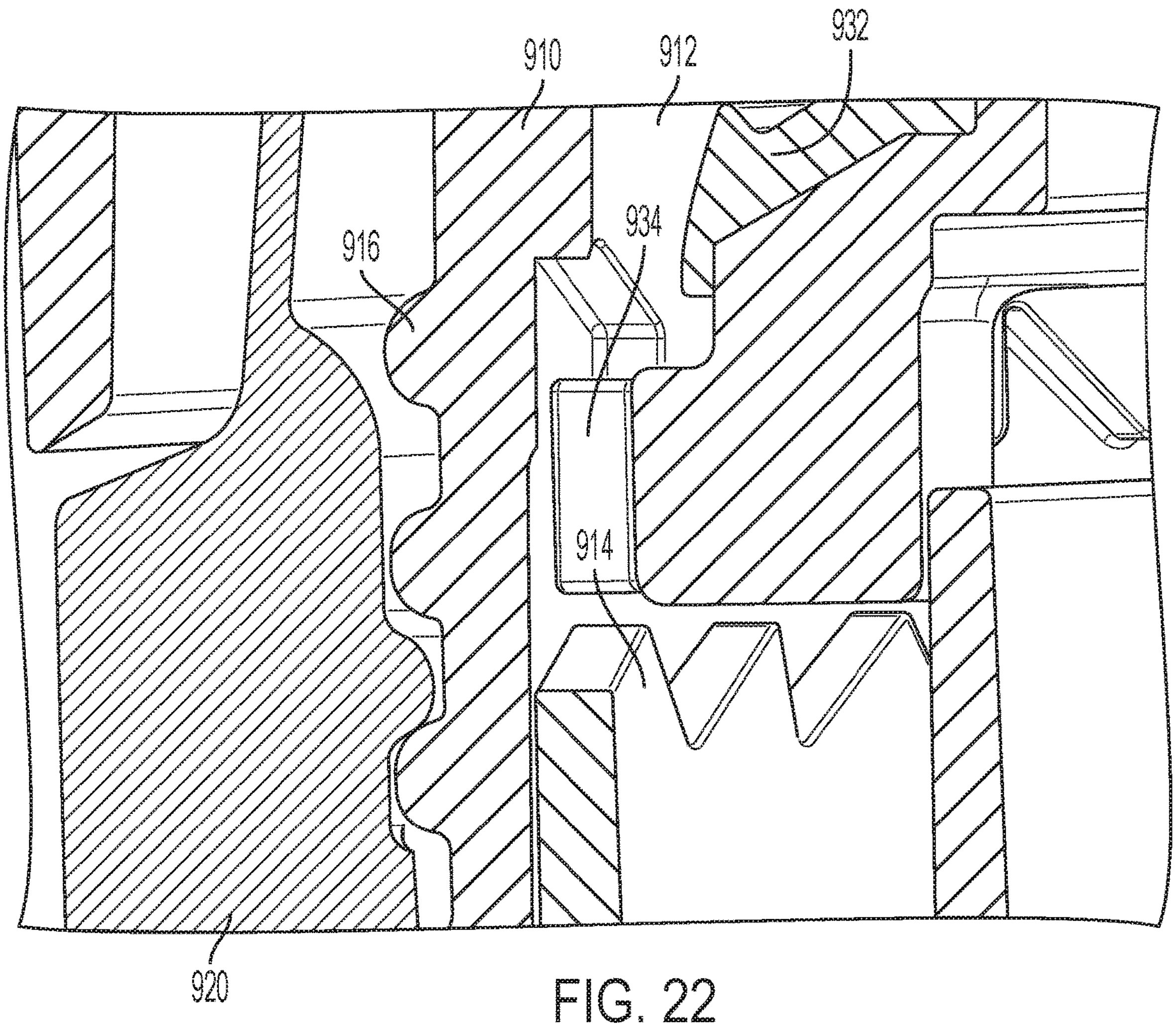
FIG. 22 is a partial cross-sectional view of the latching mechanism of FIG. 21 when the valve assembly is rotated toward a closed configuration in accordance with at least one aspect of the disclosure.
Figure 23:
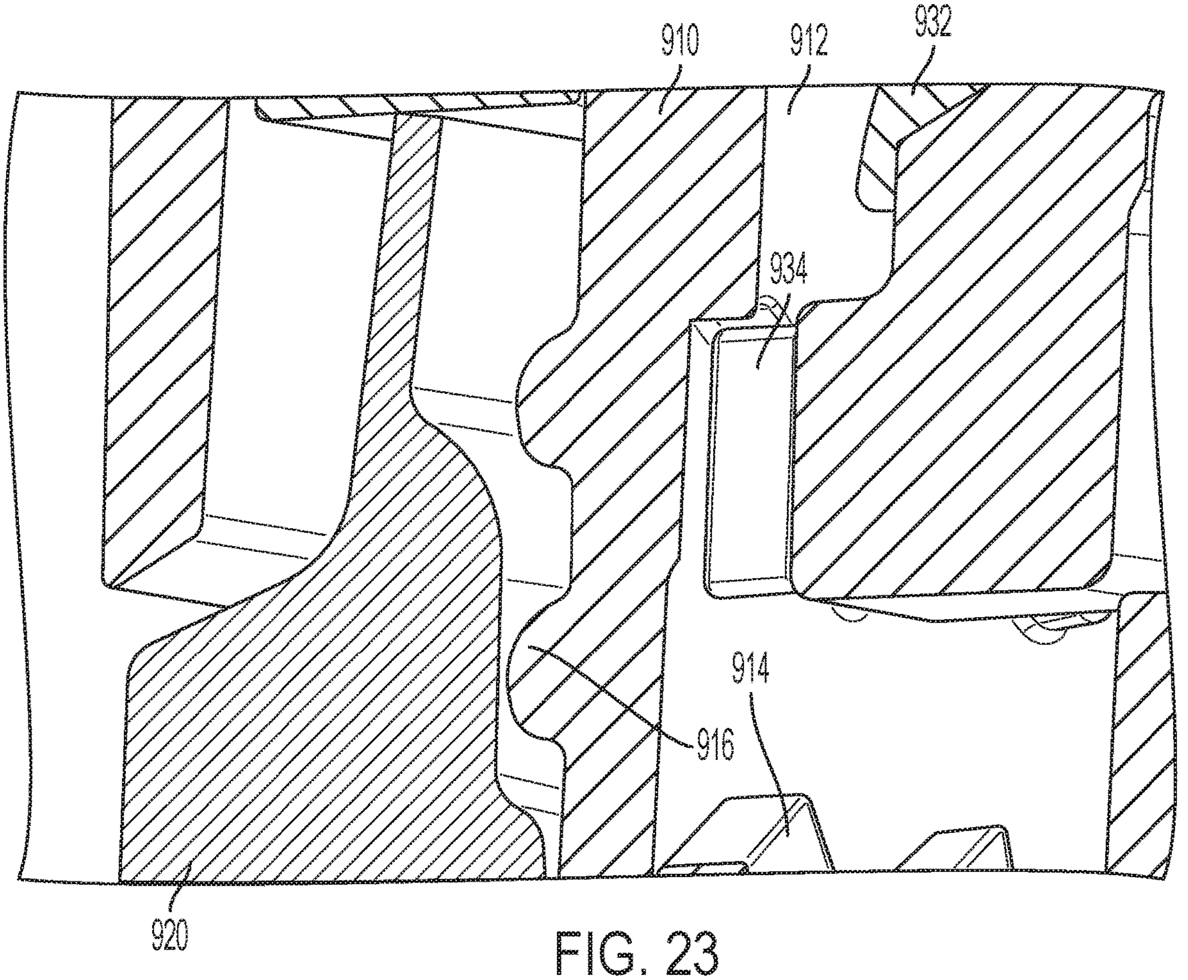
FIG. 23 is a partial cross-sectional view of the latching mechanism of FIG. 22 when the valve assembly is translated upward toward a closed configuration in accordance with at least one aspect of the disclosure.
Figure 24:
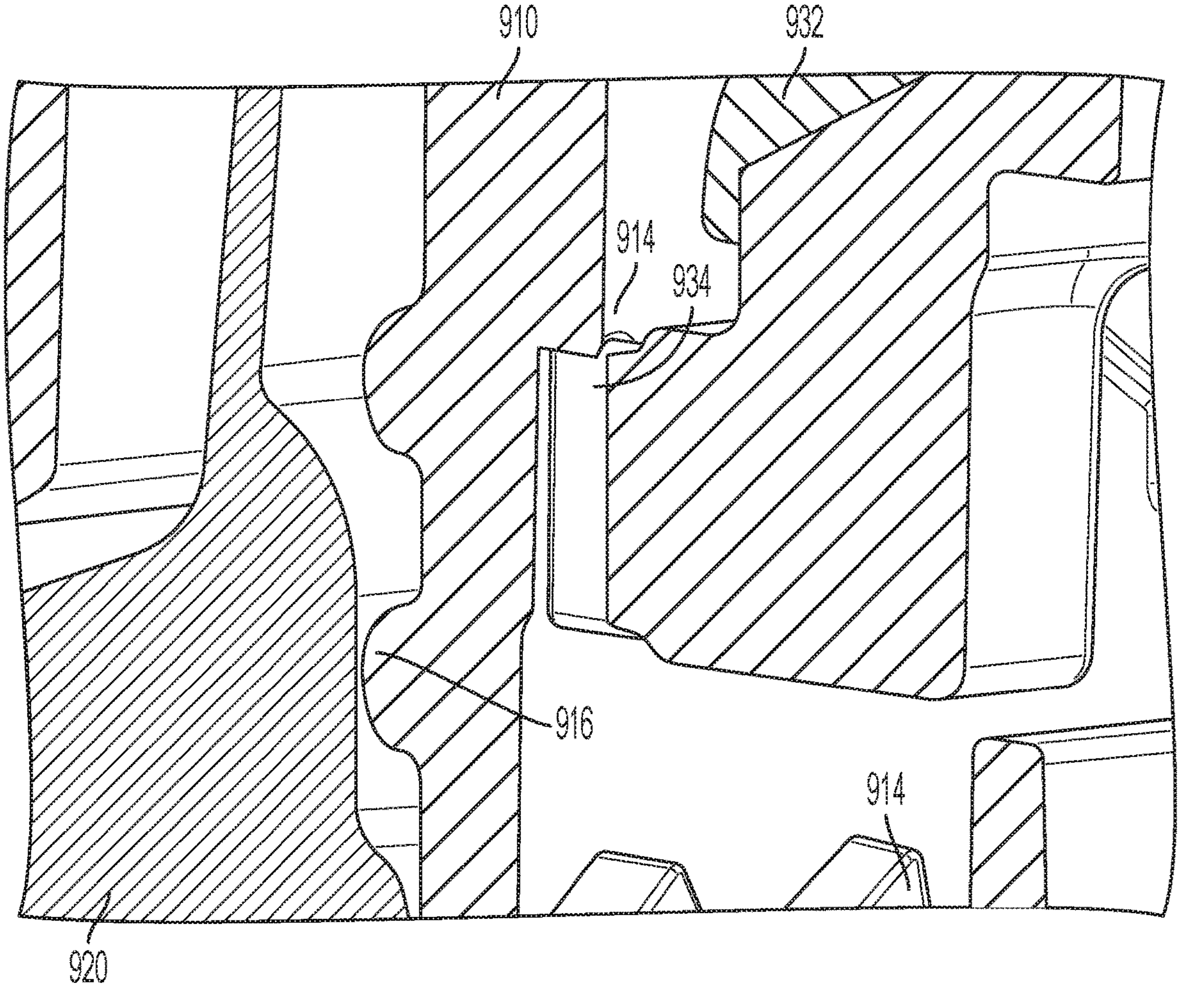
FIG. 24 is a partial cross-sectional view of the latching mechanism of FIG. 23 when the valve assembly is rotated into the closed configuration in accordance with at least one aspect of the disclosure.

As discussed above, FIG. 18 depicts the valve assembly 932 in the open, or unlocked, configuration. In order for the valve assembly 932 to return to its closed, or locked, configuration, the locking member 934, and thus the valve assembly 932 is initially moved downward as shown in FIG. 19. The locking member 934 is moved out of contact with the teeth of the upper track 912 and into engagement with the teeth of the lower track 914. Depicted in FIG. 20, the locking member 934 continues toward a closed, or locked, configuration by rotating along the path defined by the teeth of the lower track 914. To reach the closed, or locked, configuration as shown in FIGS. 21-24, the locking member 934 is then biased upwardly into engagement with the teeth of the upper track 912, rotated along the path defined by the teeth of the upper track 912, biased upwardly once more along the path defined by the teeth of the upper track 912, and then rotated into locking engagement with the teeth of the upper track 912.

In various instances, multiple steps are taken to control location and/or state of the valve assembly through multiple coils inside of at least one solenoid. In such instances, a more precise and/or exact location of the valve can be determined. In various instances, one or more motors are used in place of the one or more solenoids.

Figure 25:
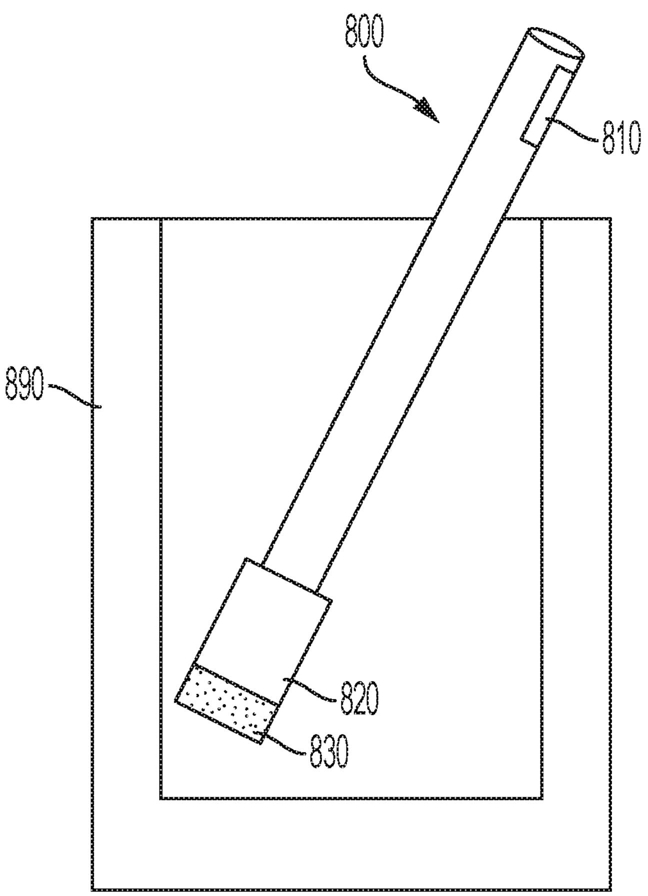
FIG. 25 is a partial cross-sectional view of a container comprising a straw, wherein the straw comprises an automatic pump according to at least one aspect of the disclosure.
Figure 26:
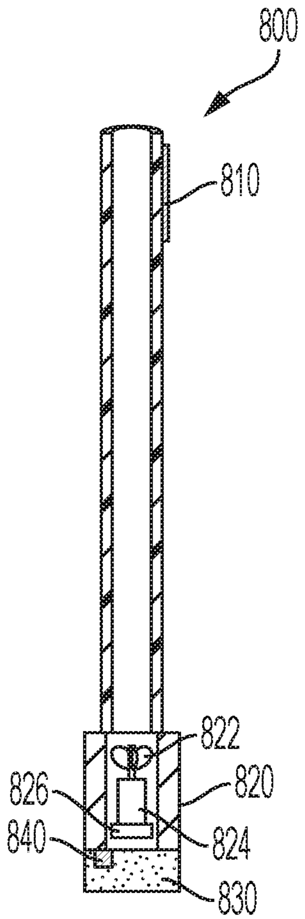
FIG. 26 is a cross-sectional view of the straw of FIG. 25 according to at least one aspect of the disclosure.

Referring now to FIGS. 25 and 26, in various instances, the container 890 comprises a straw 800 comprising an automatic pump system. The straw 800 comprises a sensor 810 positioned on an outer surface of an end of the straw 800 furthest away from the bottom of the container 890. The straw 800 further comprises a housing 820 that encapsulates a pump 822, a power source 824, and other various electronics 826. The pump 822 comprises an electrical motor and/or electromagnets build with an impeller. The impeller can also be the motor when the impeller has magnetic elements on its tips. The control of force can be accomplished by a control system 826 controlling the coils surrounding the impeller. The power source 824 can comprise, for example, a battery. The additional electronics 826 can include, for example, the control system. The straw 800 further comprises a pressure sensor 840 positioned on an end of the straw 800 opposite of the sensor 810. In various instances, the straw 800 comprises a filter 830 positioned over the pressure sensor 840. The pump system is configured to pump contents of the container 890 up through the straw 800 when a user is detected by the straw 800. In various instances, the pump system is configured to pump liquid through the straw when a user is within a predetermined distance from the straw. In various instances, the pump system is configured to pump liquid through the straw when a lip print corresponding to an approved user is in contact with the straw. The activation of the pump system can be controlled by many factors such as, for example, when the sensor 810 detects a user's lips, a user begins sucking on the straw 800 changing the pressure detected by the pressure sensor 840, and/or when the impeller begins moving. Other acceptable user-detection methods are envisioned and described herein.

As previously mentioned, in various instances, a pump can be connected to a straw and/or opening of the lid portion of the container such that liquid can be pumped out of or into the container. In various instances, the container comprises a straw. In various instances, the straw comprises an internal and/or external power source configured to pump fluid up through the straw when predetermined conditions are met. Exemplary external power sources can be powered over inductive, conductive, and/or mechanical power transfer. An exemplary mechanical power transfer is a spring load being charged.

In various instances, the straw comprises a sensor, such as one of the sensors described herein. In various instances, a plurality of sensors can be associated with the straw. In various instances, the sensor is a proximity and/or touch sensor. Such a touch sensor can be of the type described in greater detail herein, such as, for example, a capacitive sensor registering when a user places his or her lips on the straw. In such instances, when the capacitive sensor detects the presence of an approved user's lips on the straw, the control system commands the pump to begin pumping the fluid up the straw to the user's mouth. In such instances, the user is not required to suck on the straw in order to bring the fluid up to his or her mouth.

In various instances, the straw comprises a pressure sensor configured to detect a drop in pressure when a user begins to suck on the straw. In such instances, when the pressure sensor detects the drop in pressure, the control system commands the pump to begin pumping the fluid up the straw to the user's mouth. In such instances, the user is no longer required to suck on the straw in order to bring the fluid up to his or her mouth. In various instances, the pump is configured to stop pumping when the user's lips are not longer detected by the sensor. In various instances, the liquid remaining in the straw when the pump ceases to run is drained back into the container to prevent spillage. In various instances, the straw can comprise a pressure sensor and/or a pressure transducer configured to being pumping fluid up the straw in response to a user biting on the straw.

In various instances, the straw is integrated into a smart container, such as the smart containers described herein. In such instances, the container comprises a valve such that, when opened, allows fluid to flow through the straw. In various instances, the valve is within the hollow opening of the straw. In various instances, the valve is a separate component from the straw.

Figure 27:
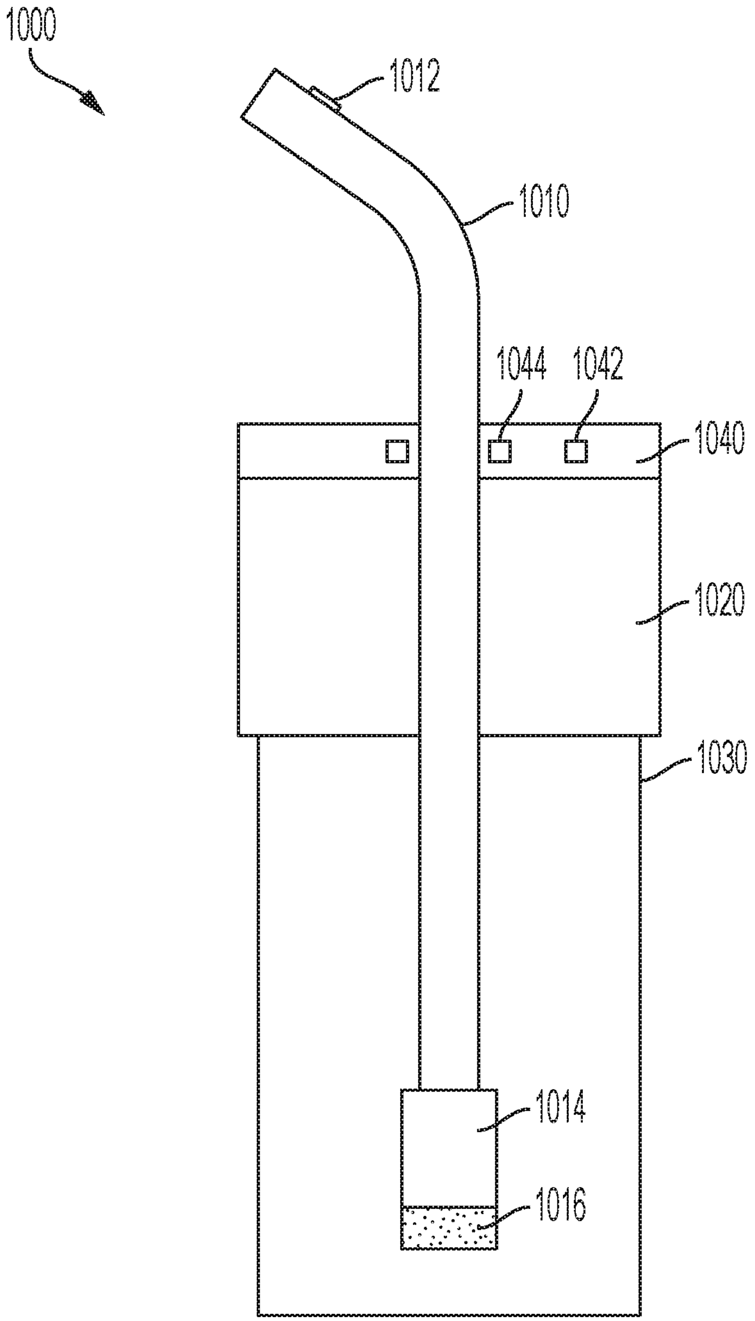
FIG. 27 is a partial perspective view of a smart container comprising an integrated straw according to at least one aspect of the disclosure.

Referring to FIG. 27, the container 1000 comprises a lid portion 1020, a body portion 1030, and a spout 1010 connected to the lid portion 1020. The lid portion 1020 comprises one or more sensors 1042, 1044, such as any of the sensors described herein. The spout 1010 comprises a pump such that liquid and/or contents can be pumped out of or into the container 1000. In various instances, the spout 1010 comprises an internal and/or external power source 1040 configured to pump fluid up through the spout when predetermined conditions are met. Exemplary external power sources can be powered over inductive, conductive, and/or mechanical power transfer. An exemplary mechanical power transfer is a spring load being charged. The spout 1010 further comprises a housing 1014 for the pump and other electronics, a sensor 1012, and an optional filter 1016.

In various instances, the spout 1010 comprises a sensor 1012, such as one of the sensors described herein. In various instances, a plurality of sensors is associated with the spout 1010. In various instances the sensor 1012 is a proximity and/or touch sensor. Such a touch sensor can be of the type described in greater detail herein, such as, for example, a capacitive sensor registering when a user places his or her lips on the spout 1010. In such instances, when the capacitive sensor detects the presence of an approved user's lips on the spout, the control system commands the pump to begin pumping the fluid up the spout to the user's mouth. In such instances, the user is not required to suck on the spout in order to bring the fluid up to his or her mouth.

In various instances, the spout comprises a pressure sensor configured to detect a drop in pressure when a user begins to suck on the spout. In such instances, when the pressure sensor detects the drop in pressure, the control system commands the pump to begin pumping the fluid up the spout to the user's mouth. In such instances, the user is no longer required to suck on the spout in order to bring the fluid up to his or her mouth.

In various instances, the container comprises a valve such that, when opened, allows fluid to flow through the spout. In various instances, the valve is within a hollow opening of the spout. In various instances, the valve is a separate component from the spout.

In various instances, the spout automatically extends toward the user's mouth. Such automated movement of the spout can be controlled using computer vision and/or any other suitable location assisting systems.

As discussed in greater detail herein, the lid portion is configured to be removably coupled to the body portion of the container. However, an adapter can be coupled to the lid portion to allow the lid portion to be coupled to another body portion from a different container. Such an adapter can be a deformable seal to attach to a foreign body portion. The seal can be expandable and/or collapsible.

In various instances, any of the containers described herein further comprise one or more security features configured to, for example, prevent a user from losing his or her container, theft, and/or from someone mistakenly taking the wrong container. In various instances, the container comprises tracking functionality, such that the container can be found easily if the container is, for example, lost or stolen. The tracking functionality can be activated in various manners and interfaces. For example, a user can issue a voice command if the user's container is within a predetermined vicinity. In various instances, the user can track his or her container through an external device, such as, for example a wireless device, over a network connection. Exemplary wireless devices include, but are not limited to, cell phones, smart watch, tablets, etc. Cell phones, smart watches, tablets, etc. may comprise an app allowing connection to the owner's container. For an external device to connect to a container, the container also needs to comprise a connection to the network. Such a connection can be, for example, Bluetooth, Wi-Fi, 4G, and/or any other suitable wireless or wired connection methods.

In various instances, the container comprises a "find my container" functionality. In various instances, the container comprises a tracker configured to alert a user when the user exceeded predetermined bounds surrounding the container. The alert can be sent in any suitable manner, such as, for example, through the user's connected external device. In various instances, the container may generate a noise to indicate the user has left a predetermined vicinity of the container. The container can be linked to the distance of the user in various manners. For example, a Bluetooth connection to the user's smartphone can be used by measuring the strength of the signal. In various instances, a positioning system, such as GPS, can be used to determine relative positions between the user and the container. In various instances, GPS can be used in combination with WiFi locations to determine relative positions between the user and the container.

In various instances, the container comprises the ability to identify itself to a user. For example, the container can comprise a LED configured to blink in a color that is unique to the container's owner and/or approved user. In various instances, the LED is activated when the user activates a search feature as discussed above. In various instances, the LED is activated in response to a voice command. In various instances, the container is configured to make a unique sound in response to a voice command. Such identification capabilities can, for example, prevent a user from mistakenly taking the wrong container. In various instances, the user is able to program the unique identifying light color, unique identifying light pattern, and/or unique identifying sound.

In various instances, the lid portion of the container comprises a heating and/or cooling mechanism. In such instances, when it is cold outside, the lid portion can be heated up so as to not shock the user's lips with a freezing and/or cold lid portion. Conversely, when it is hot outside, the lid portion can be cooled so as to provide a refreshingly cool experience to the user. The temperature of the lid portion can be controlled through any suitable means, such as, for example, by a heating element and/or by thermoelectric cooling using a Peltier element. In various instances, the temperature of any other portion of the container, such as the body portion and/or a handle, can be controlled in a similar manner.

In various instances, a protective cover can be positioned on top of the lid to, among other things, protect the area where users place their lips and/or prevent germs and/or dirt from coming into contact with such an area. When a user comes close to and/or is recognized by the container through any of the manners described herein, the protective cover is moved out of the way and/or opens in a manner that permits the user to drive from a particular location. Such a protective cover, or lid, allows the drinking surface to remain sanitary.

In various instances, the container is configured to record various parameters detected by the one or more sensors described herein. For example, each time a user takes a sip from the container, the control system is configured to record data such as, for example, the average amount of liquid taken in each sip, the temperature of the liquid within the container, etc. In various instances, the container is configured to create user profiles based on this recorded information. In various instances, the container is configured to analyze the recorded parameters and perform behavioral analysis. The results of such behavioral analysis can be used, for example, to optimize default settings of the container.

In such instances, when a first user is identified as using the bottle, the control system can command the valve to remain open for a duration of time to allow the average amount of liquid the first user typically drinks to be dispensed. After this amount of liquid is dispensed, the control system commands the valve to automatically close. When a second user is identified as using the container, the control system can command the valve to remain open for a duration of time to allow the average amount of liquid the second user typically drinks to be dispensed. After this amount of liquid is dispensed, the valve is commanded to automatically close.

In various instances, when a first user is identified as using the container, the control system can command a heating and/or cooling mechanism to maintain the temperature of the fluid within a predetermined range preferred by the first user. Such a temperature can be maintained both inside the container and when the fluid makes contact with the lid and/or the user. When a second user is identified as using the container, the control system can command a heating and/or cooling mechanism to maintain the temperature of the fluid within a predetermined ranged preferred by the second user.

As discussed above, in various instances, the container comprises a control system. The control system is configured to issue commands that, when executed, cause various mechanical components to perform a desired function. The control system can issue commands based on information communicated from the one or more sensors and/or the analysis performed on stored data. In various instances, the mechanical components comprise, for example, a valve, a straw, a spout, a motor, a lid portion configured to be locked to the container, a lock, a heater, and/or a pump. The mechanical components are described in greater detail herein. In various instances, the container comprises a valve configured to control parameters relating to whether fluid can flow out to the user. In various instances, the valve controls whether fluid is capable of flowing out to the user. In various instances, the valve controls the amount of fluid capable of flowing out to the user. The valve, or plunger, is configured to automatically open when the control system determines that fluid may flow out of the lid portion to the user. The value, or plunger, is configured to automatically close when the control system determines that the fluid may no longer flow out of the lid portion to the user.

In various instances, the control system is configured to control the mechanical components of the container based on basic conditions. Such basic conditions include, for example, the data communicated from the one or more sensors described herein to activate the functionality of the mechanical components. Such functionality includes, for example, opening the valve, closing the valve, activating the pump system to deliver liquid, etc. While the control system is configured to control the mechanical components of the container based on basic conditions, there are multiple variables to consider when opening the valve assembly. Exemplary variables include, for example, the force due to the biasing member, internal pressure relative to external pressure, and/or friction between components. To open the valve assembly, a force is needed to overcome the sum of the forces due to these variables. In various embodiments, different preset power settings for the solenoid and/or motor can be used to control how much force is used to open the valve assembly. To control the amount of force needed a calibrated amount of power to the opening mechanism such as power engagement time to the solenoid can be applied. Other control mechanism includes but are not limited to:

a. Testing of opening the valve assembly at a low power and gradually increasing the power output to the opening mechanism until the valve assembly is opened;
b. Using the previous power requirement when the valve assembly is successfully opened;
c. Using pre-programmed power levels; and
d. Implementing a more complex system solution such as systems and control program based on a proportional/integral/derivative (PID) controller, with or without a set of external sensors such as pressure measurement in and outside the container.

The pressure difference between inside and outside the valve assembly can be driven by many factors such as:

a. Steam inside the container due to high temperature of liquid inside the container;
b. Carbonated liquid;
c. Low air pressure outside the container, (often due to weather conditions or high elevation); and
d. High air pressure outside the container.

In various instances, the control system is configured to continuously measure the power applied while the valve assembly is opening, detect the location, and control the power based on the efficiency of opening. For example, if a lot of power is needed due to, for example, high pressure inside attributable to steam, the control system is configured to use a lot of power for longer time and continuously measure the location of the valve assembly. When the valve assembly moves past a specific location, the control system is configured to lower the power supply. Such a control system could additionally implement a location sensor to monitor the induction location in the solenoid. Furthermore, force feedback can be given from the motor to control the amount of power required.

In various instances, the control system is configured to operated in a silent mode and a noisy mode for power management. During silent mode, power supply is lower and the valve assembly is only able to be operated and/or the lid portion is only able to be removed manually.

If the valve assembly gets stuck while opening and/or closing, multiple remedies are available. One such remedy is to supply quick pulses to the valve opening mechanism by energizing the solenoid in short pulses, for example.

In various instances, the control system is configured to activate the unlocking mechanism of the valve assembly and/or the lid portion upon a user input to a touch sensor. In various instances, one or more sensors can be used in conjunction, such as to create a detailed selection of where the user touches the container. With a high resolution of sensors, the control system is capable of accurately measuring the direction of the touch. In such instances, the user can use a unique swipe pattern on a touch-sensitive interface to trigger the control system to activate the unlocking mechanism of the valve assembly and/or the lid portion. In various instances, the user can toggle the lid open and/or closed by touching a specific location of the touch sensor with a lip or tongue and/or perform an activation pattern with the lip or tongue. In various instances, the pattern to lock or unlock and open can be done with a swipe in the air above or around the container. The sensors can be any sensors for movement with high enough resolution to measure the movement. As an example, one can use distance sensing capacitive sensors around on the surface of the lid.

In various instances, an inner ring of touch sensors and an outer ring of touch sensors can be positioned on the top surface of the lid portion. As discussed above, the container can comprise a handle. The handle can comprise touch sensors, and/or a fingerprint or hand print sensor. The sensor can be a trigger to open the valve assembly on its own or the handle sensor can be combined with other triggers for opening the lid. When the container comprises a finger/hand print sensor can be linked to a specific person and/or multiple authorized users to assist in authenticating a prospective user of the container.

Figure 28:
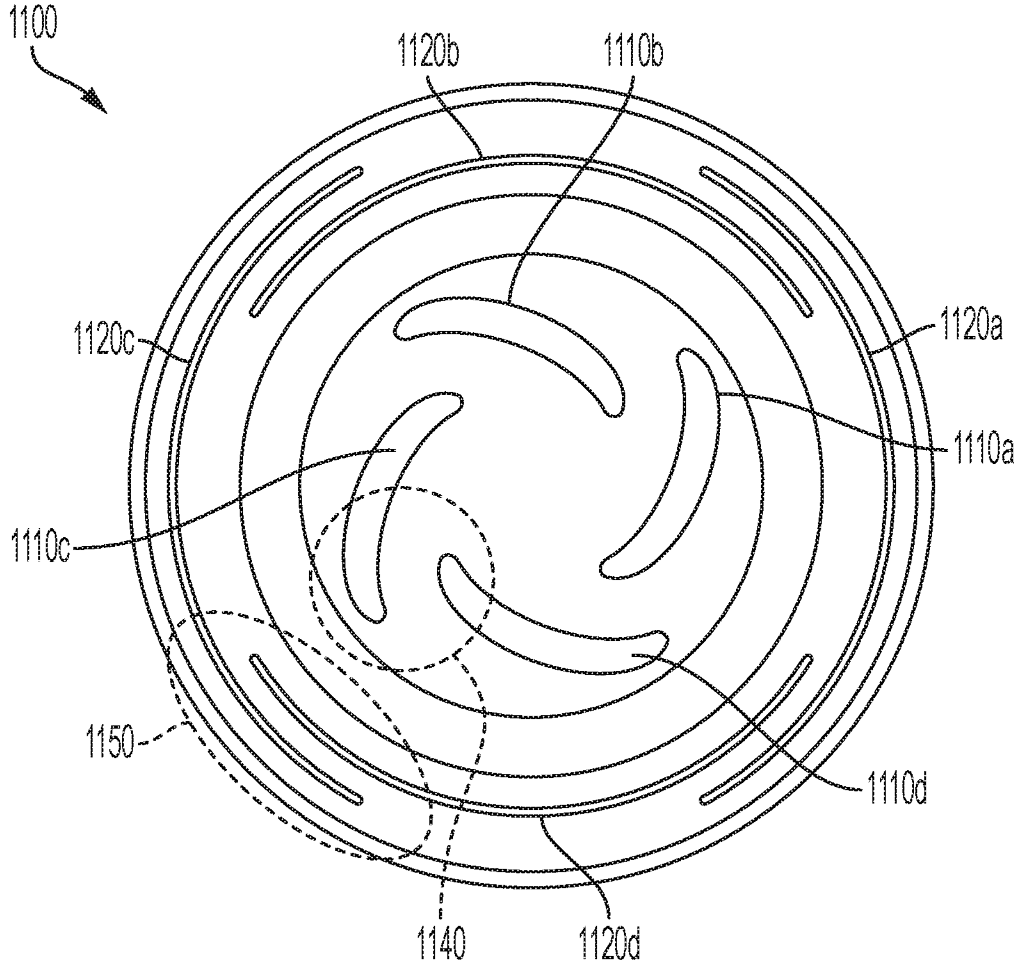
FIG. 28 is a plan view of a lid portion of a smart container, wherein the lid portion comprises a plurality of sensors according to at least one aspect of the disclosure.

In an exemplary embodiment, as shown in the FIG. 28, the top surface of the lid portion 1100 comprises two annular rings of sensors. In various instances, a plurality of sensors are used to form an annular shape along the top surface of the lid portion. In various instances, one sensor forms an annular ring around the top surface of the lid portion. The two annular rings are comprised of an inner ring and an outer ring. The two annular rings comprise multiple sections made up of a plurality of sensors. In various instances, the one or more sensors comprise a half-moon shape. In various instances, the one or more sensors are arranged in an overlapping manner to allow the control system to make a more accurate and/or specific determination of where a user is coming into contact with the container. In other instances, the one or more sensors do not overlap. When a user places their lips fully on the lid portion 1100, his or her lips will contact the inner ring and the outer ring of sensors. For example, the user's lower lip 1150 contacts a portion of the outer ring of sensors 1120*a*, 1120*b*, 1120*c*, 1120*d* while the user's upper lip 1140 contacts a portion of the inner ring of sensors 1110*a*, 1110*b*, 1110*c*, 1110*d*. Detecting the specific section(s) of the sensors that the user's lips are in contact with, the sensors can communicate this information to the control system. The control system can then determine the direction that liquid should come out of the opening. In various instances, the inner ring and the outer ring sense a touch at about 30 degrees from a specific direction. Since the outer ring and the inner ring have the same angle on the touched area, it can be assumed that the touch is intentional with, for example, the upper and lower lips of a user trying to drive or a user's fingers emulating the lips such that they can pour fluid from the container. In such instances, the mechanical function is activated allowing the valve to open and fluid to flow through the opening. In instances where, for example, the inner sensor is activated at 30 degrees but the outer sensor is activated at 120 degrees, the control system can assume that a user is not intentionally trying to open the valve for pouring or drinking. In such circumstances, the control system prevents the valve from opening, and the algorithm for opening the valve is exited.

The outer and inner rings of sensors are rotationally fixed in rotation to each other. The lower and the upper lip of the user may up a line toward the center, both within a range of angles. As long as these angles line up with one another, the control system can determine that the lower lip touches the outer ring and the upper lip touches the inner ring at a position in a straight line toward the center. This combination can be used as a condition to unlock the feature of automatically opening the valve assembly. A finger can also be put in the same direction imitating the lip(s) and unlocking the automatic valve assembly. If more than one alignment of touches are detected and/or recognized, the condition is not satisfied and the valve assembly is prevented from opening by the control system.

In various instances, the control program may command that the valve opens when only the inner sensor is activated. In various instances, the control program may command the valve open when only the outer sensor is activated.

In various instances, the control program may only command that the valve open when the temperature of the liquid is within a predetermined range of temperatures and/or is at a specific predetermined temperature. An acceptable temperature may be programmed, such that the valve will only open at the acceptable temperature. If the liquid within the container is too hot, the control program commands the valve to remain in its closed position such that no liquid can leave the container. An override is possible to program, such as, for example, a specific touch pattern can be entered on a touch-sensitive interface and the control system will command the valve transition into the open position even if the temperature of the fluid exceeds the programmed level.

In various instances, a user can program the acceptable temperature for the valve to open. A manual override can be programmed to allow the valve to be manually pushed into an open position. The temperature can be programmed through any suitable interface, such as, for example, through an external device (cell phone, smart watch, tablet, etc.) or directly on the bottle through a touch interface or voice command.

In various instances, the temperature of the fluid within the container can be communicated to the user through different colored LED lights, a graphical user interface, through an external device, and/or any other suitable communication method.

In various instances, the control system can implement enhanced security conditions. With the enhanced security conditions, access to features can be better controlled. These features include, for example, activation of the mechanics with additional conditions and/or access to features, such as, for example computational interface(s). Exemplary computational interface(s) include, but are not limited to, voice control, artificial intelligence, and/or other data sources.

In various instances, the portion of the container comprising one or more touch sensors can be used as an interface to control various functionality of the container. For example, by touching the touch-sensitive interface in a specific pattern, a user can unlock the features of the container. The unlocking pattern can be programmed by the user, although, in various instances, there are also standardized patterns pre-programmed within the control system. For example, a user can swipe counter-clockwise a number of times (e.g. twice) to activate a drinking program, directing the control system to open the valve when a user's lips touch the one or more sensors. A user can swipe clockwise a number of times (e.g. twice) to deactivate the drinking program, effectively preventing the valve from opening when a user's lips touch the one or more sensors. In various instances, when a user enters a specific code, the valve is configured to automatically open and/or close. In various instances, when a user enters a specific code, the latching mechanism of the valve is configured to be engaged and/or disengaged. Other functionality of the container such as unlocking the valve from the latching mechanism can be controlled through user input as described above.

In various instances, the user can program a new touch sequence such as, for example, a new specific tap and/or swipe pattern. In instances where the container comprises a touch-sensitive display, the touch-sensitive display can work in the same and/or similar fashion to a lock screen on a cellphone touchscreen. In various instances, different users can program different passcodes into the same container. Such programming enables a specific settings feature access for different users. In various instances, the features of the container can be unlocked through the detection of a particular hand print and/or a finger print.

In various instances, by identifying the user through, for example, the specific touch sequence, additional features can be unlocked for the user. Such features can include, for example, opening the valve when the correct and/or approved user is going to drink out of the container. In various instances, as discussed above, lip sensors can be used to analyze the lip print of the user similar to finger prints. Lip prints are unique to each user. In various instances, a sensor can analyze the imprints in the same or similar way a phone analyzes a finger print. In various instances, a sensor can analyze the width of the user's lips to determine if the user is approved. In various instances, the lip print sensor can be combined with other sensors described herein as well as the unique touch pattern described herein.

In various instances, the control system can direct the container's functionality to be unlocked when a programmed face is present and identified through facial recognition by an imaging solution. In various instances, the control system can direct the container's functionality to be unlocked when the specific facial features of a detected user are close enough.

In various instances, the features of the container can be unlocked remotely. An external connection through, for example, a smart phone application can unlock the valve functionality. An NFC key can also be used in combination with a reader at the lid. The container can automatically unlock and activate the open feature when a virtual key is within close proximity. Such a virtual key can be a smart phone that unlocks the lid with a wireless communication such as Bluetooth, for example. In various instances, the virtual key can be a mechanical, such as a switch or a physical key.

In various instances, artificial intelligence can be used to direct the container when to open and/or close the valve, in addition to other container functionality. Artificial intelligence can direct container functionality based on a set of rules and/or through training by data gained from previous uses.

In various instances, the valve of the container can remain open and unlocked when less than all of the predetermined conditions are met. When predetermined conditions have been met to initially open the valve, the valve is able to remain open even if one or more of the conditions are no longer met. For example, a user can place his or her upper lip on the inner ring of sensors and his or her lower lip on the outer ring of sensors as described herein in order to open the valve. If, however, the user removes his or her upper lip from the inner ring of sensors, but keeps his or her lower lip on the outer ring of sensors, the valve can still remain open and unlocked. In various instances, it is possible to program the container to keep the valve in the open and unlocked position when one of the conditions is met. Such conditions are programmable according to various customer needs/preferences.

In various instances, the smart container can include a timer and the valve of the container can be programmed to remain in an open/unlocked position for a specific duration of time. In various instances, the valve of the container can be programmed to remain in an open/unlocked position until a specific amount of liquid is dispensed. The specific amount of liquid dispensed can be monitored through the various sensors described herein. Such an auxiliary feature allows the user to get a specific amount of liquid through the opening while the valve is unlocked.

In various instances, the valve of the container can be programmed to stay open for a period of time after the user is finished drinking. The control system can determine that a user is finished drinking in any suitable manner, such as, for example, when the touch sensors are no longer active, etc. Such a delayed valve closing allows for liquid to return back along the fluid flow path and into the internal cavity after the user is finished drinking.

In various instances, the valve assembly is configured to close in response to a sensor detecting that the angle the container is being held at is inappropriate with respect to the user. In other words, the valve assembly can close quickly if the angle of the container is going in the "wrong direction." Instead of tilting the container up after the user has been drinking, the user might lay the container down (i.e., horizontally). The valve assembly is configured to be closed to avoid spillage of the contents of the container.

In various instances, the container comprises a breaker that is switched when the lid portion and/or the container is placed down on surface. The breaker can be anything capable of sensing that the container has been set down on a surface, such as a pressure sensor and/or capacitive sensor, for example.

In various instances, pressure can be released from the internal cavity of the container before and/or during drinking. The release of pressure can be made through a small opening defined in the lid portion or a separate pressure release valve. If the pressure is too high within the container, the control system can block the valve system from being opened and/or unlocked. This can be good to avoid the contents of the container from splashing out of the container. In instances where the pressure is too high, a controlled slow release mode can be activated by the control system automatically and/or through a manual user input. In various instances, the container is configured to release steam when it is oriented vertically. If the container is tilted and/or positioned horizontally, the steam vent is configured to be closed.

A pre-determined angle can be specified for when the contents of the container should start dispensing and/or flowing out of the container through the opening of the container. The controlled angle at which liquid is allowed to come out can also be dynamic such as a variable of amount of liquid present, or weight of liquid/container. In various instances, the container is configured to allow liquid to dispense at the same angle every time regardless of the amount of liquid that remains within the container. In such instances, the body portion comprises a moveable member configured to move upwardly as liquid is dispensed from the container to maintain the dispensing angle.

In various instances, the valve comprises a sensor configured to detect liquid on top of and/or flowing through the opening. If the sensor detects that liquid is still flowing, or just about to flow back into the container, the control system can be programmed to allow the valve to stay opened while liquid is still flowing in some capacity. Such a sensor can be used to control the fluid flow in various ways. The sensor allows fluid to flow back into the container and the sensor allows the control system to estimate how much liquid is flowing through the valve. Such an estimate can correspond to how much liquid the user is drinking.

In various instances, the container can combine the extended duration after a user is finished drinking with a sensor configured to detect liquid on top of and/or flowing through the opening. In such instances, the valve can be opened while there is liquid on top of the opening, possible flowing back into the container. At a programmed, or mechanically configured, maximum allowed open time, the control program commands the valve to close and/or lock. This allows the valve to be open while the liquid is still flowing back into the container after the user is finished drinking while also setting a time limit for when the valve must close even if liquid is still present. The maximum time limit is beneficial in instances in which a user may be holding the container in such an angle that the liquid is not flowing back even if there is a long wait. In various instances, the container comprises a sensor configured to measure the angle, such as, for example, a gyroscope. In such instances, the valve can be closed based on the measured angle if the container is in such an angle that the liquid would stay and not flow back into the container. If the angle increases, such that liquid could flow out of the opening again, the valve can close. In various instances, if a user wishes to access the liquid within the container again, the user is required to unlock the functionality of the container. In various instances, the container is configured to close the valve after a specific amount of time passes after the sensor for sensing liquid at the opening of the lid portion stops sensing liquid.

In various instances, the control program can issue commands based on the position of the valve. With the help of a position sensor for the core when using solenoid solutions, it is possible to open and/or close the valve again if a previous attempt to change the state and/or position failed. In various instances, if the valve accidentally gets pushed open, it can be configured to close automatically. All activated functionalities of the container discussed herein can have a manual override.

Figure 29:
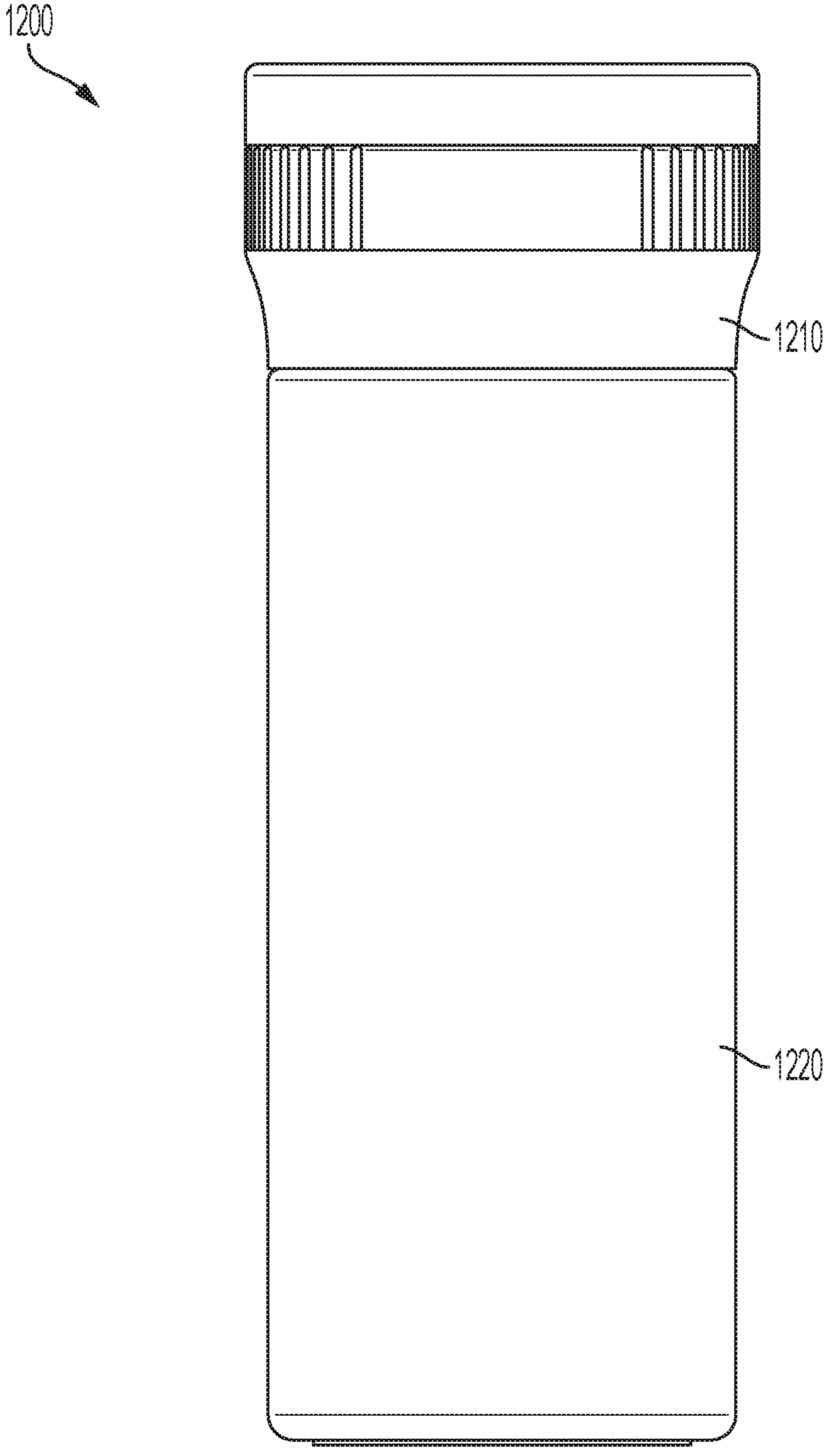
FIG. 29 is an elevation view of a smart container according to at least one aspect of the disclosure.
Figure 30:
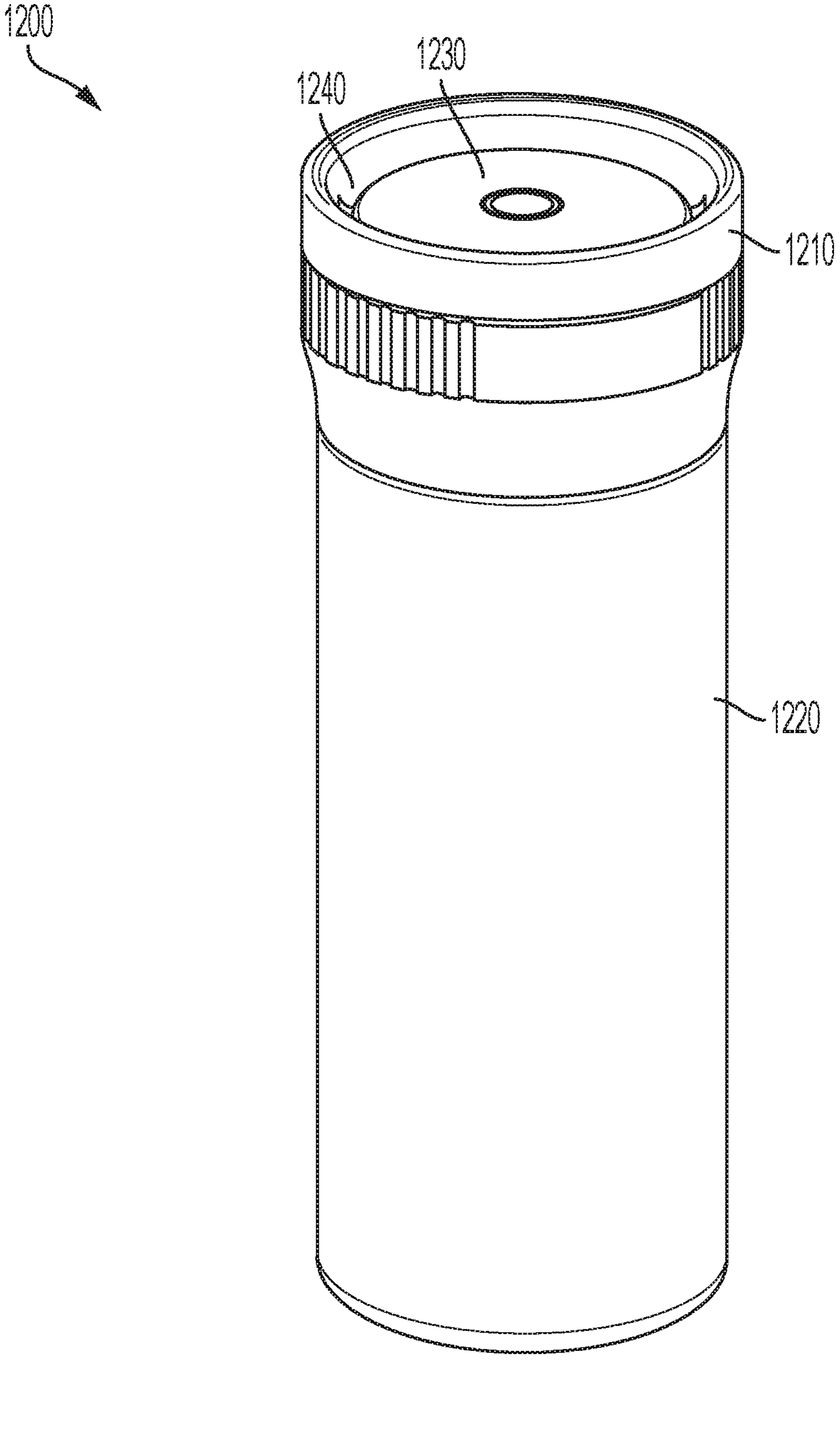
FIG. 30 is a perspective view of the smart container of FIG. 29 according to at least one aspect of the disclosure.

FIGS. 29 and 30 depict a smart container 1200. The smart container 1200 comprises a lid portion 1210 connected to a body portion 1220. The lid portion 1210 further comprises a valve assembly 1230 configurable in an open configuration and a closed configuration. When the valve assembly 1230 is in an open configuration, an opening 1240 is defined between the lid portion 1210 and the valve assembly 1230, allowing the contents of the container to be dispensed. The smart container 1200 is configured to comprise the functionality of the other smart containers disclosed herein.

Figure 31:
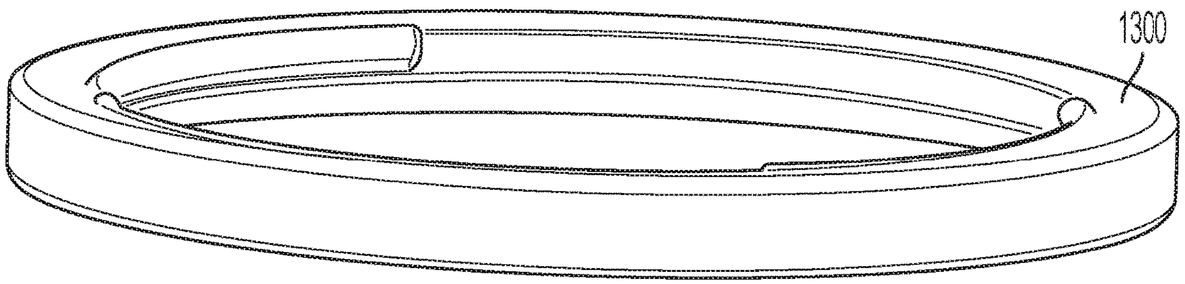
FIG. 31 is a perspective view of an annular ring for attachment to a lid portion of a smart container according to at least one aspect of the disclosure.
Figure 32:
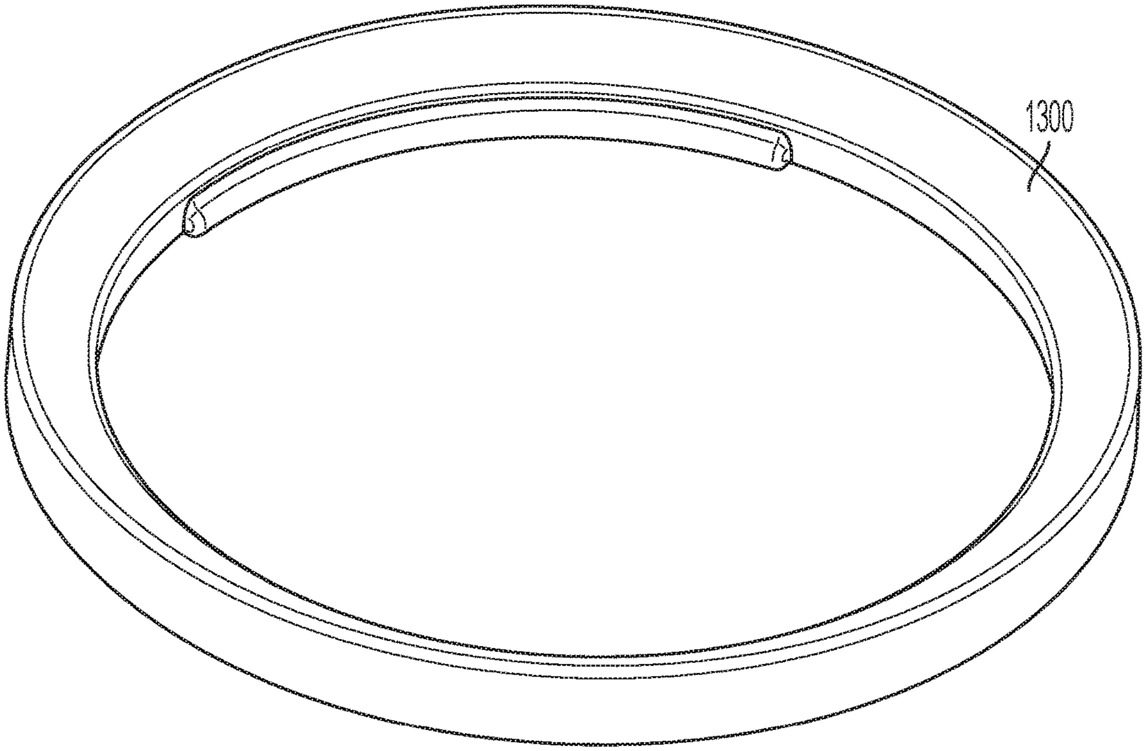
FIG. 32 is a perspective view of the annular ring of FIG. 31 according to at least one aspect of the disclosure.
Figure 33:
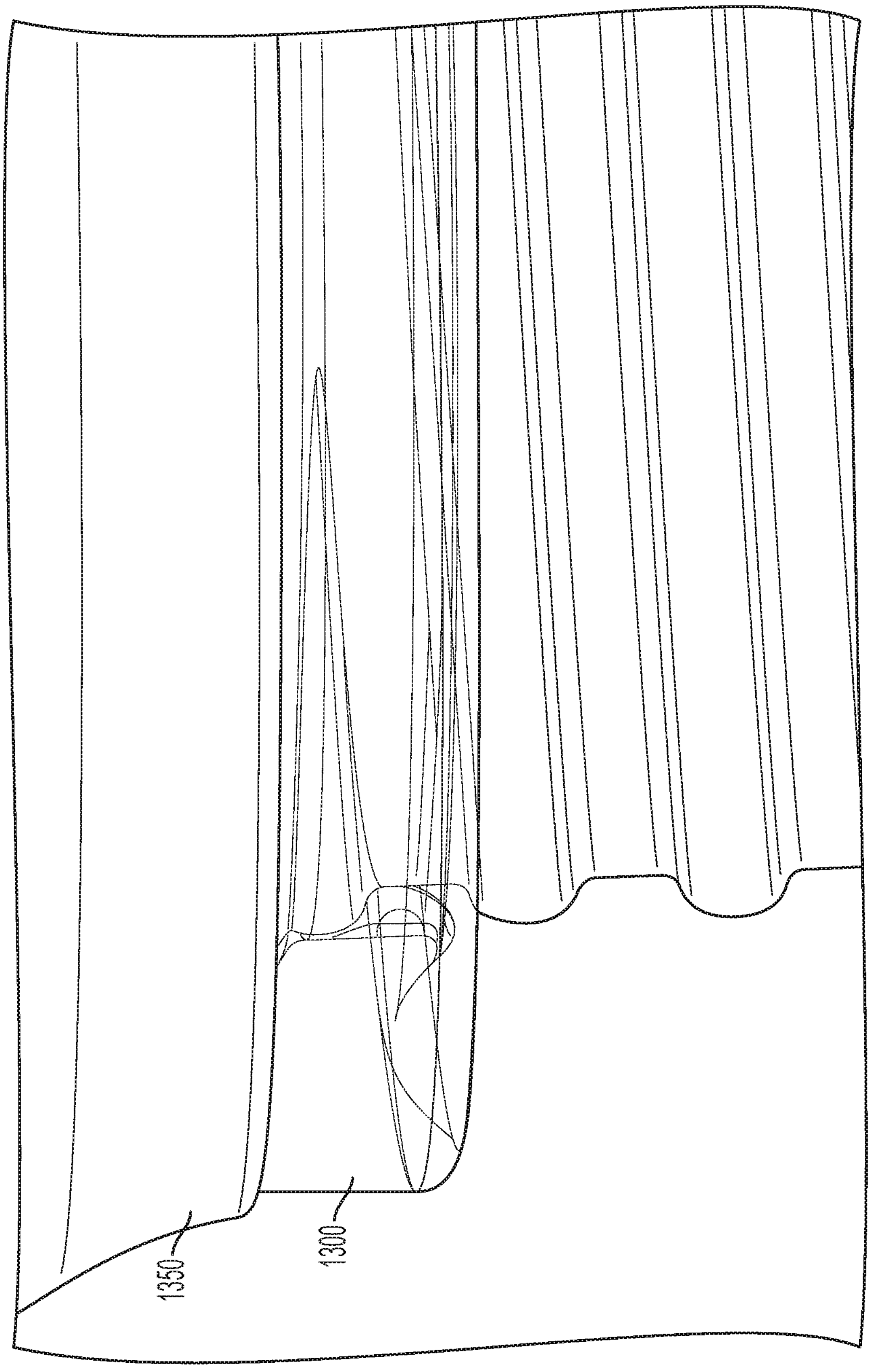
FIG. 33 is a partial perspective view of the annular ring of FIG. 31 attached to a lid portion of a smart container according to at least one aspect of the disclosure.

Referring to FIGS. 31-33, a silicone ring 1300 is configured to be received within the threads of a portion of a lid portion 1350. The silicone ring 1300 is configured to be snapped in between the threads of the lid portion 1350 to prevent the silicone ring 1300 from becoming displaced. In various instances, the silicone ring 1300 provides an additional seal between the lid portion 1350 and a body portion of the container to prevent the contents of the container from leaking.

Figure 34:
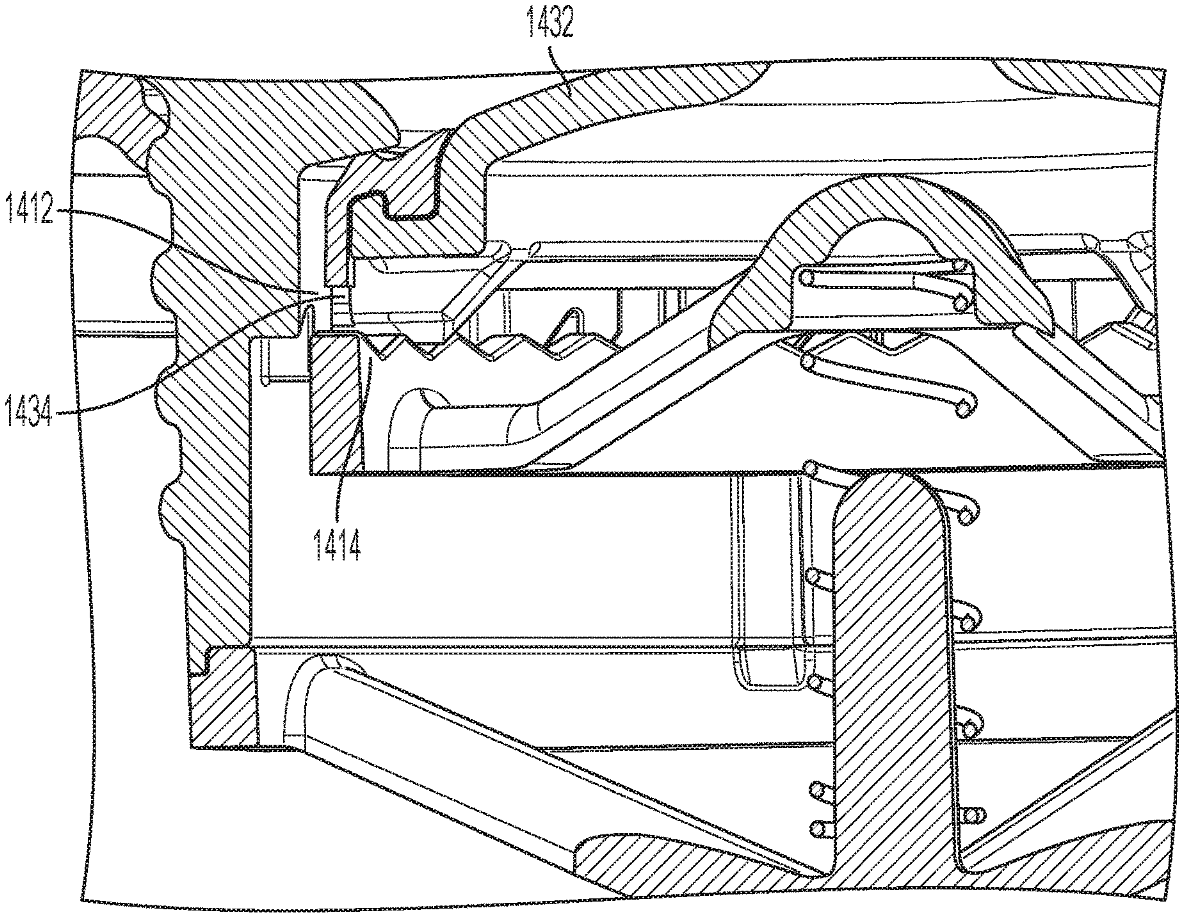
FIG. 34 is a partial cross-sectional view of a latching mechanism when a valve assembly of a smart container is in a closed configuration according to at least one aspect of the disclosure.
Figure 35:
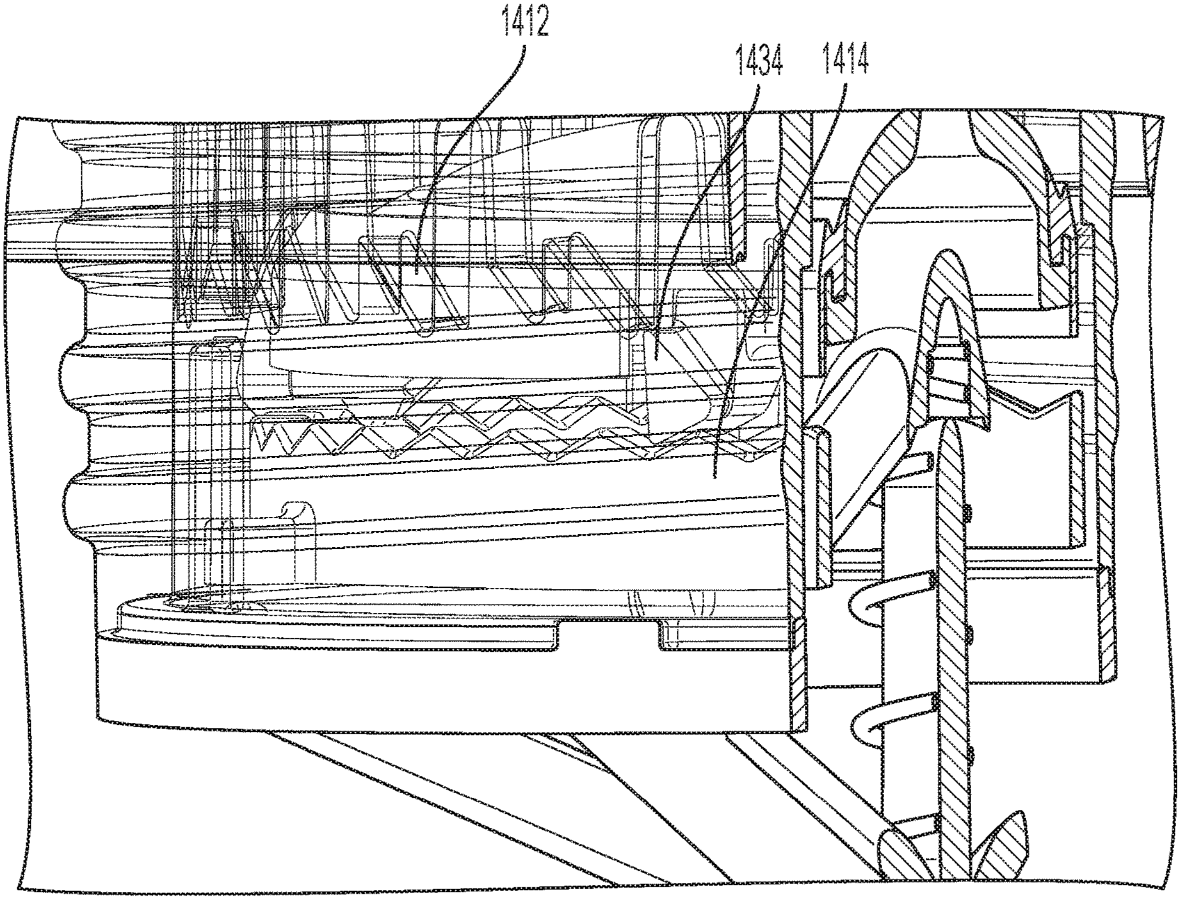
FIG. 35 is a partial cross-sectional view of the latching mechanism of FIG. 34 when the valve assembly is translated downward out of the closed configuration according to at least one aspect of the disclosure.
Figure 36:
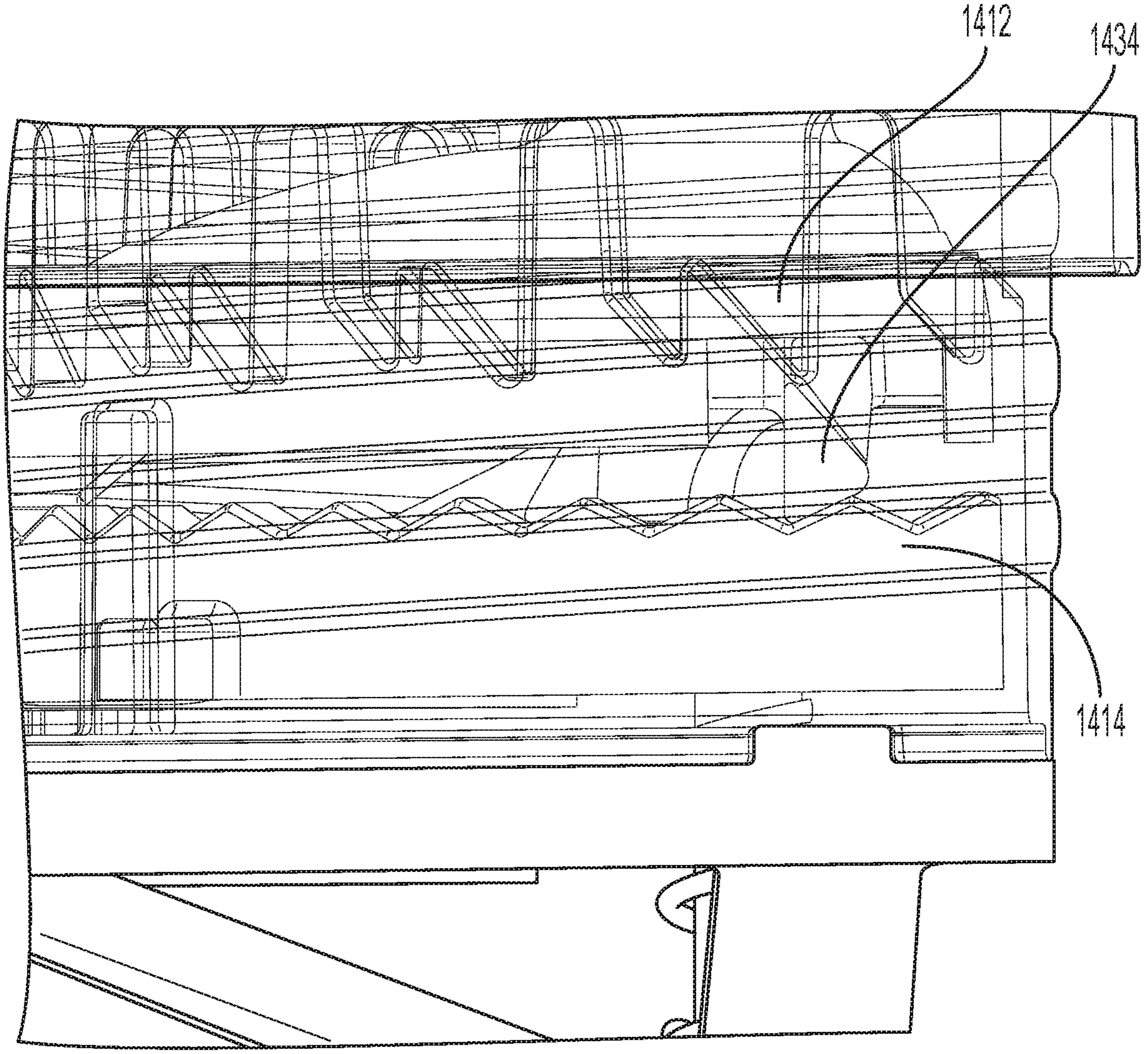
FIG. 36 is a partial cross-sectional view of the latching mechanism of FIG. 35 when the valve assembly is rotated toward an open configuration according to at least one aspect of the disclosure.
Figure 37:
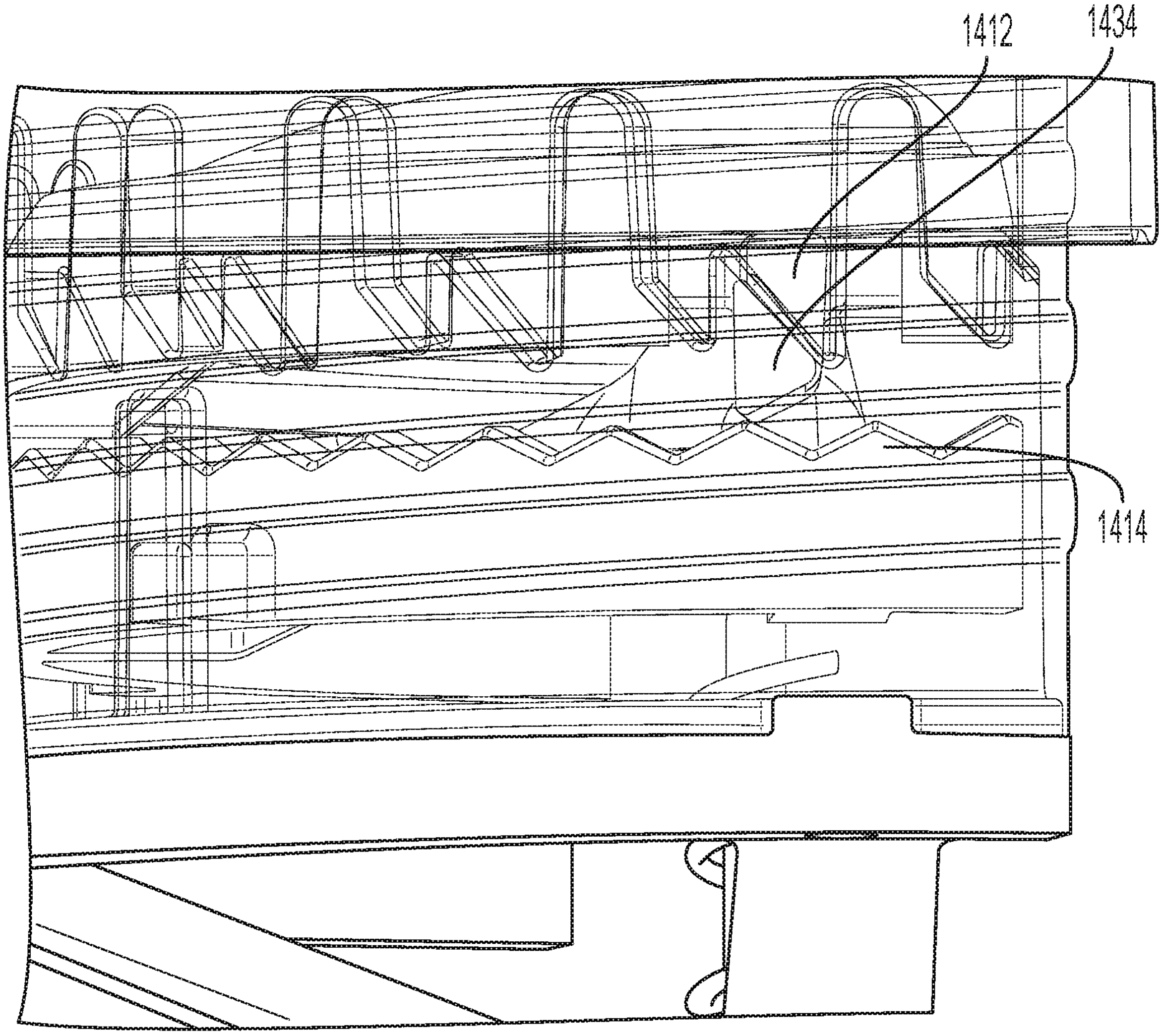
FIG. 37 is a partial cross-sectional view of the latching mechanism of FIG. 36 when the valve assembly is translated upward toward an open configuration according to at least one aspect of the disclosure.
Figure 38:
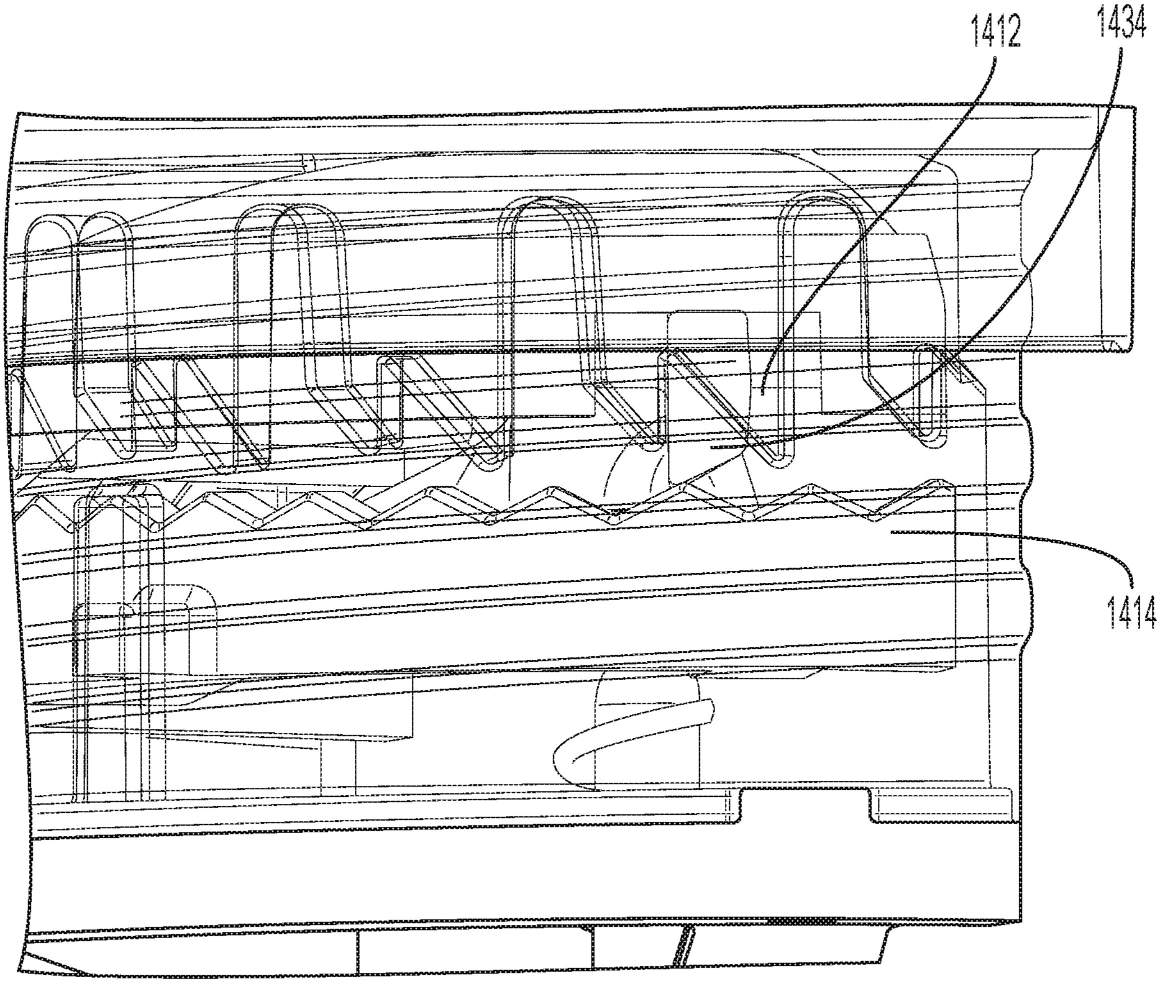
FIG. 38 is a partial cross-sectional view of the latching mechanism of FIG. 37 when the valve assembly is rotated into an open configuration according to at least one aspect of the disclosure.

FIGS. 34-38 illustrate an alternative latching mechanism of a smart container. FIG. 34 is a partial cross-sectional view of a latching mechanism of the valve assembly 1432 in a closed, or locked, configuration. The locking member 1434 is in engagement with the teeth defined by the upper track 1412. Notably, the locking member 1434 does not interface with the lower track 1414. In order for the valve assembly 1432 to move into an open, or unlocked, configuration, the locking member 1434, and thus the valve assembly 1432, is initially moved downward as shown in FIG. 35. The locking member 1434 is moved out of contact with the teeth defined by the upper track 1412 and is moved into engagement with the teeth defined by the lower track 1414. Similar to the retractable pen example described herein, the locking member 1434 is capable of wiggling between the position depicted in FIG. 34 and the position depicted in FIG. 35. Depicted in FIG. 36, the locking member 1434 continues toward an open, or unlocked, configuration by rotating along the path defined by the teeth of the lower track 1414. Notably, the locking member 1434 is still in contact with the lower track 1414. To reach the open, or unlocked, configuration as shown in FIGS. 37 and 38, the locking member 1434 is then rotated into locking engagement between the teeth of the upper track 1412 and the teeth of the lower track 1414. While the upper track 1412 and the lower track 1414 are depicted as being on an internal surface of the lid portion and/or the body portion of the container, the tracks 1412, 1414 can be positioned on any suitable surface. For example, the tracks 1412, 1414 can be located above and/or below the stopper and/or plunger of the valve assembly. A biasing member is biased against a portion of the valve assembly. The valve assembly comprises a continuous spring force biasing the valve assembly into the closed position. As described in greater detail herein, a motor can be used in many ways to open the valve, for example to actuate the opening of the valve by rotating a slot with a slope that pushes the valve open.

Figure 39:
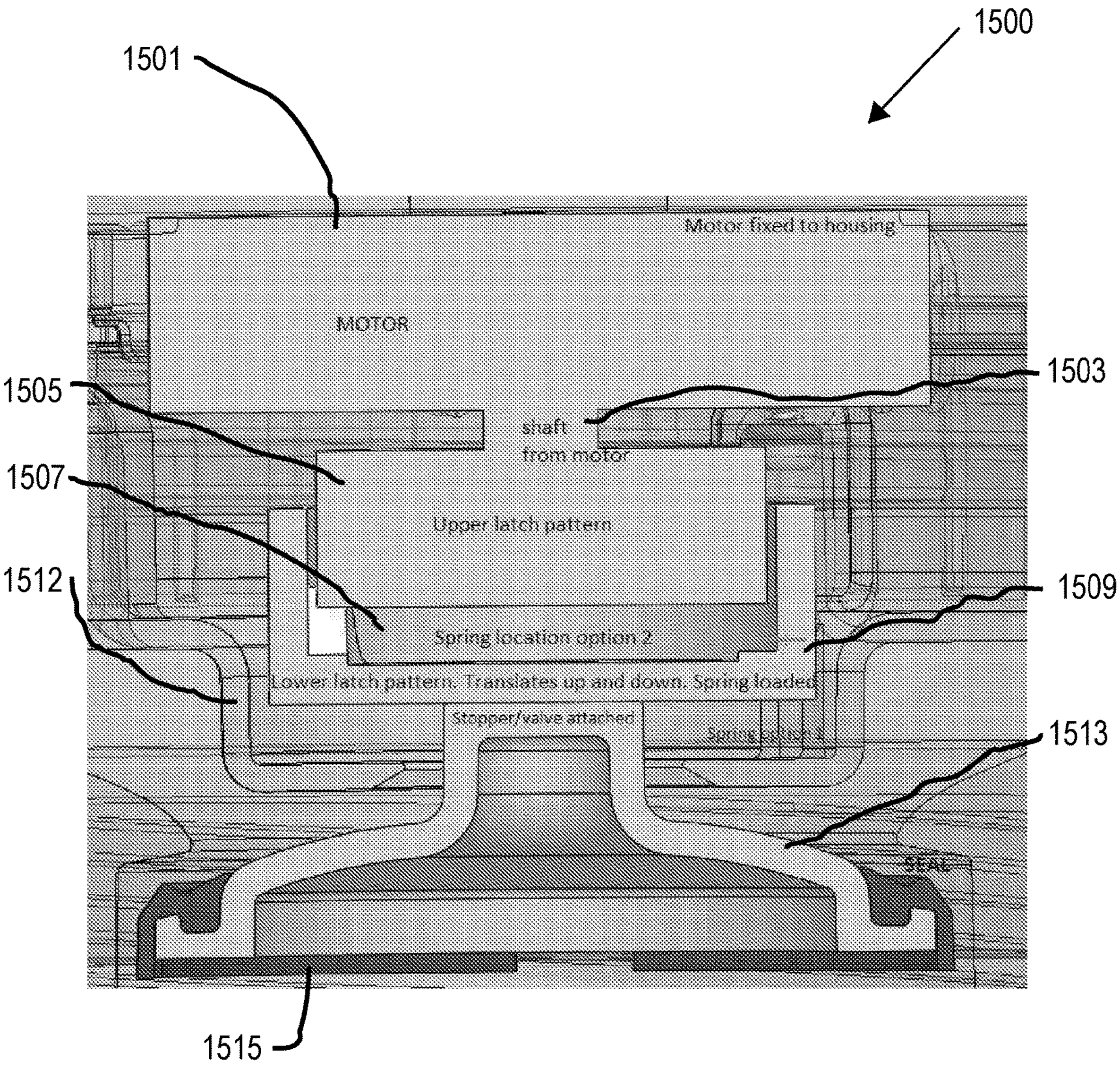
FIG. 39 is a partial cross-sectional view of a latching mechanism of a smart container according to at least one aspect of the disclosure.
Figure 40:
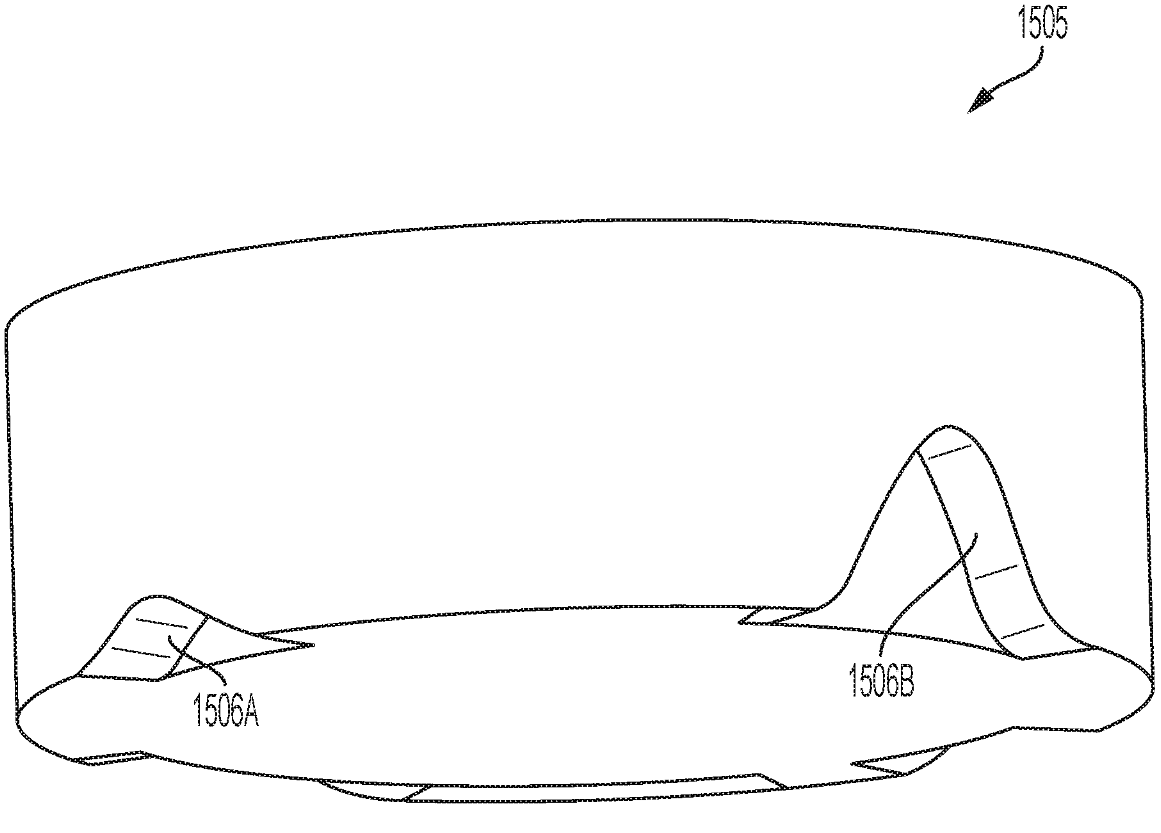
FIG. 40 is a perspective view of an upper latch of the latching mechanism of FIG. 39 according to at least one aspect of the disclosure.
Figure 41:
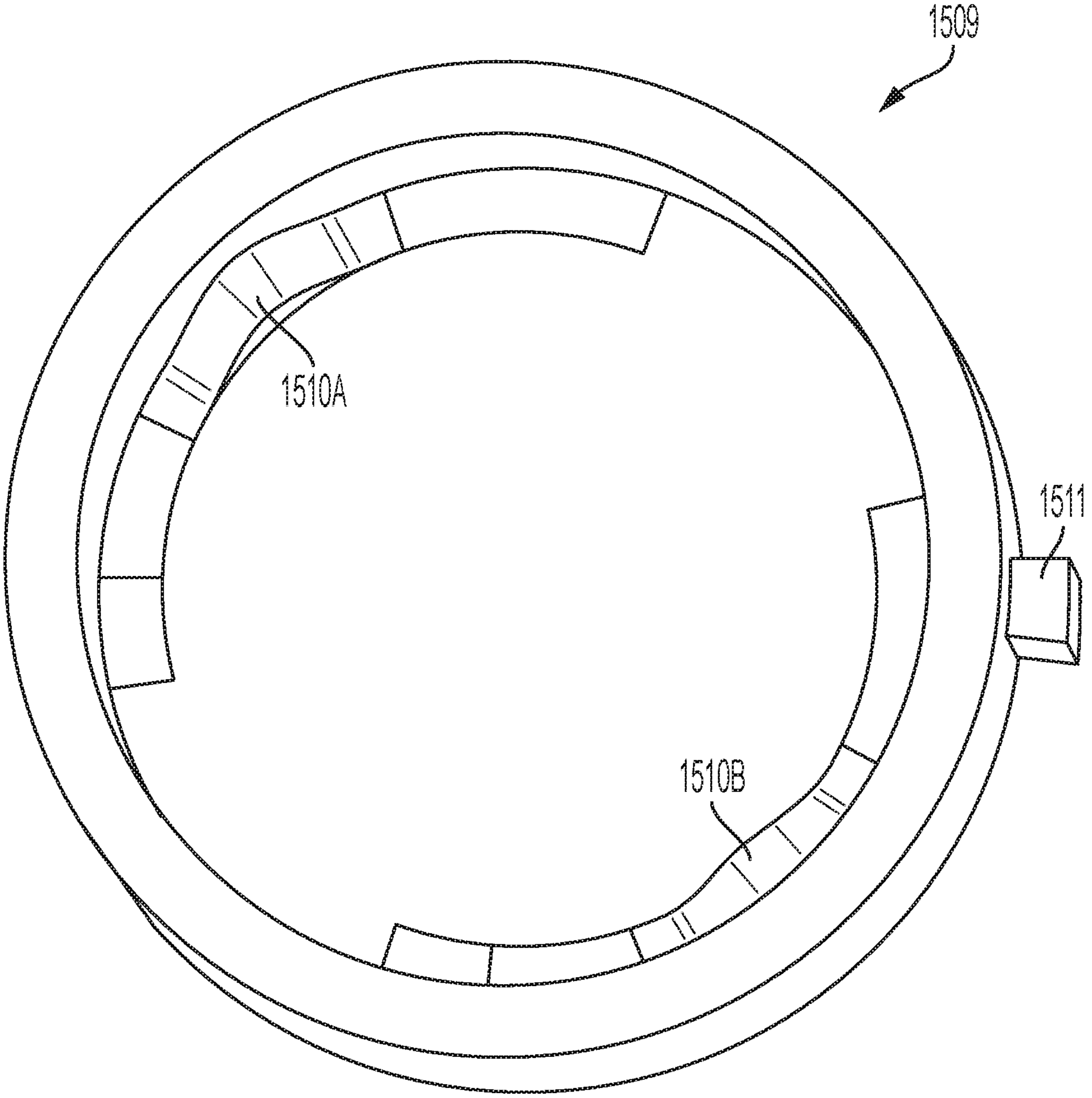
FIG. 41 is a perspective view of a lower latch of the latching mechanism of FIG. 39 according to at least one aspect of the disclosure.

FIGS. 39-45 illustrate an alternative latching mechanism 1500 of a smart container. FIG. 39 is a partial cross-sectional view of the components of the latching mechanism 1500. The latching mechanism 1500 is integrated with a lid portion 1512 of the container. The latching mechanism 1500 comprises a motor 1501 fixed to a housing of the lid portion 1512, wherein a shaft 1503 of the motor 1501 extends into an upper latch portion 1505. An example of the upper latch portion 1505 is shown in FIG. 40. The latching mechanism 1500 further comprises a lower latch portion 1509, an example of which is shown in FIG. 41. A plunger 1513 and/or stopper is operably coupled to the lower latch portion 1509, wherein the plunger 1513 prevents the contents of the container from dispensing when the valve assembly is in the closed configuration. A biasing means 1507, such as a spring, for example, biases the lower latch portion 1509, and thus the plunger 1513, toward and away from the upper latching portion 1505.

Figure 42:
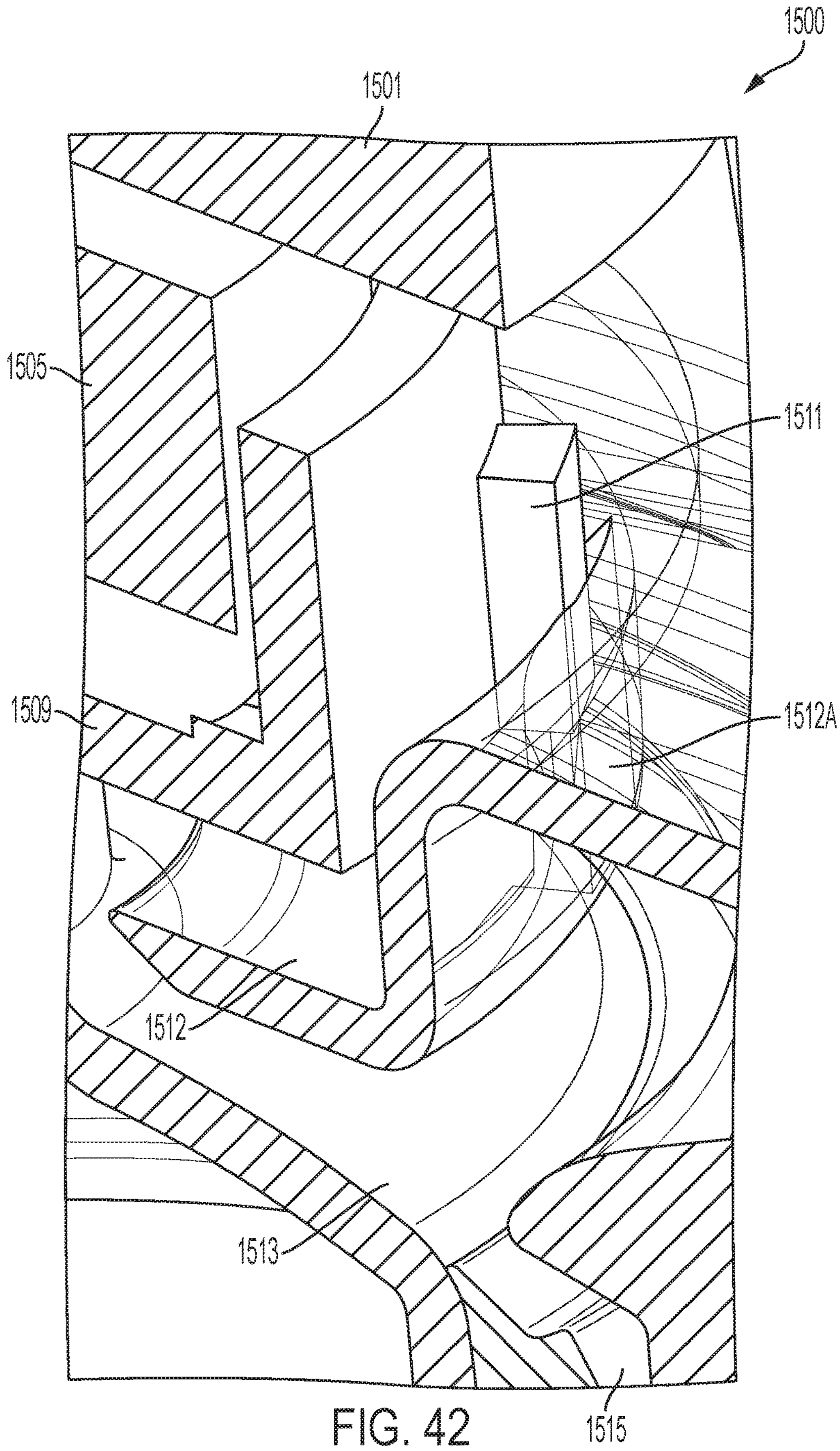
FIG. 42 is a partial cross-sectional view of the latching mechanism of FIG. 39 comprising an alignment pin configured to prevent rotation of the lower latch according to at least one aspect of the disclosure.

As described above, FIG. 40 is a perspective view of the upper latch portion 1505 of the latching assembly 1500. The upper latch portion 1505 comprises various grooves 1506A, 1506B and/or detents defined around the circumference of a base. FIG. 41 is a perspective view of the lower latch portion 1509 of the latching assembly 1500. The lower latch portion 1509 comprises various ramps 1510A, 1510B protruding from an internal circumference of the lower latch portion 1509. The various ramps 1510A, 1510B are configured to be received within the various grooves 1506A, 1506B and/or detents of the upper latch portion 1505 as the lower latch portion 1509 and the upper latch portion 1505 rotate with respect to one another. The lower latch portion 1509 further comprises a locking pin 1511 configured to engage a portion 1512A of the lid portion 1512 of the smart container as shown in FIG. 42. When the locking pin 1511 engages the lid portion 1512, the lower latch portion 1509 is prevented from further rotation.

Figure 43:
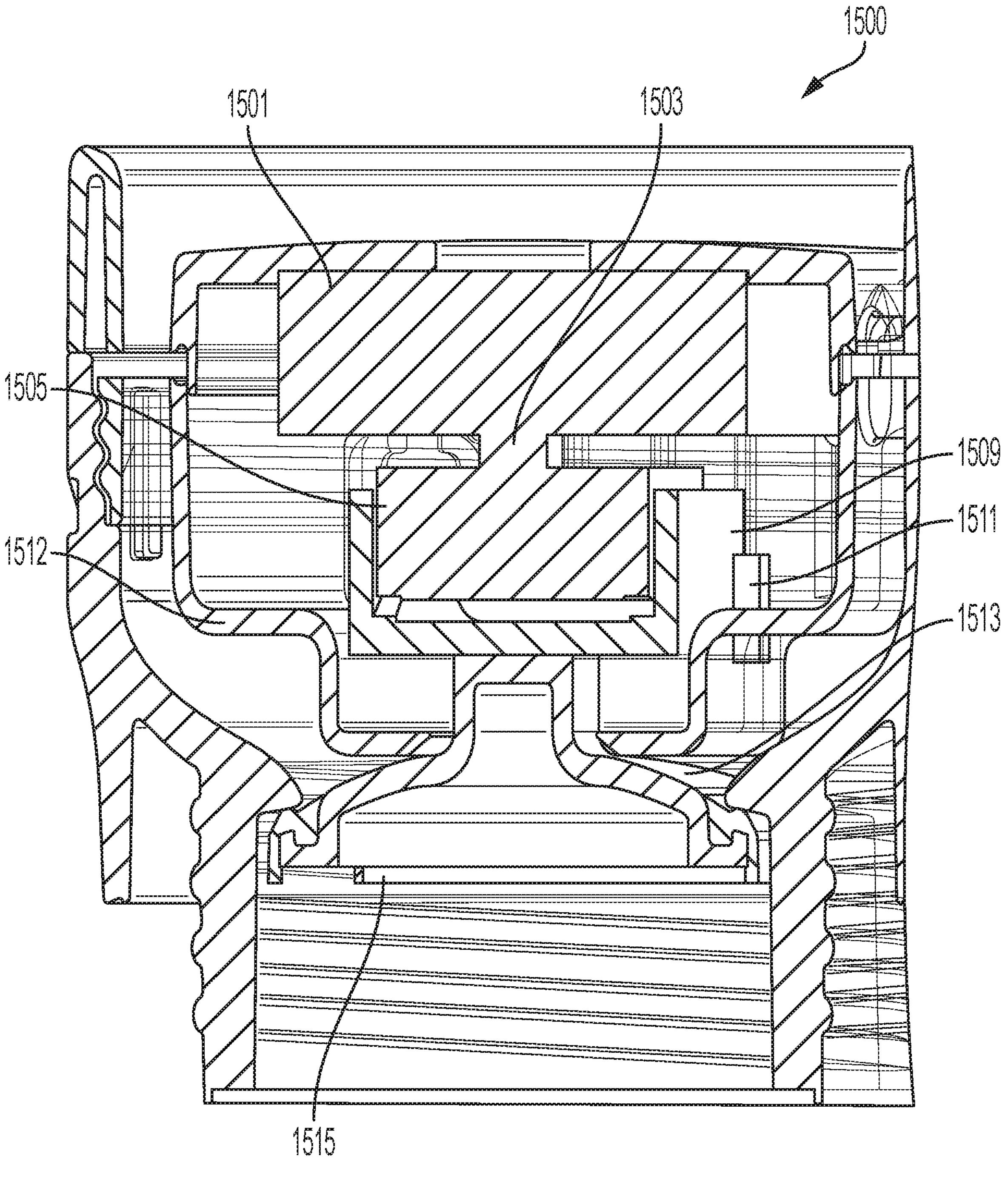
FIG. 43 is a partial cross-sectional view of the latching mechanism of FIG. 39 in a closed configuration according to at least one aspect of the disclosure.
Figure 44:
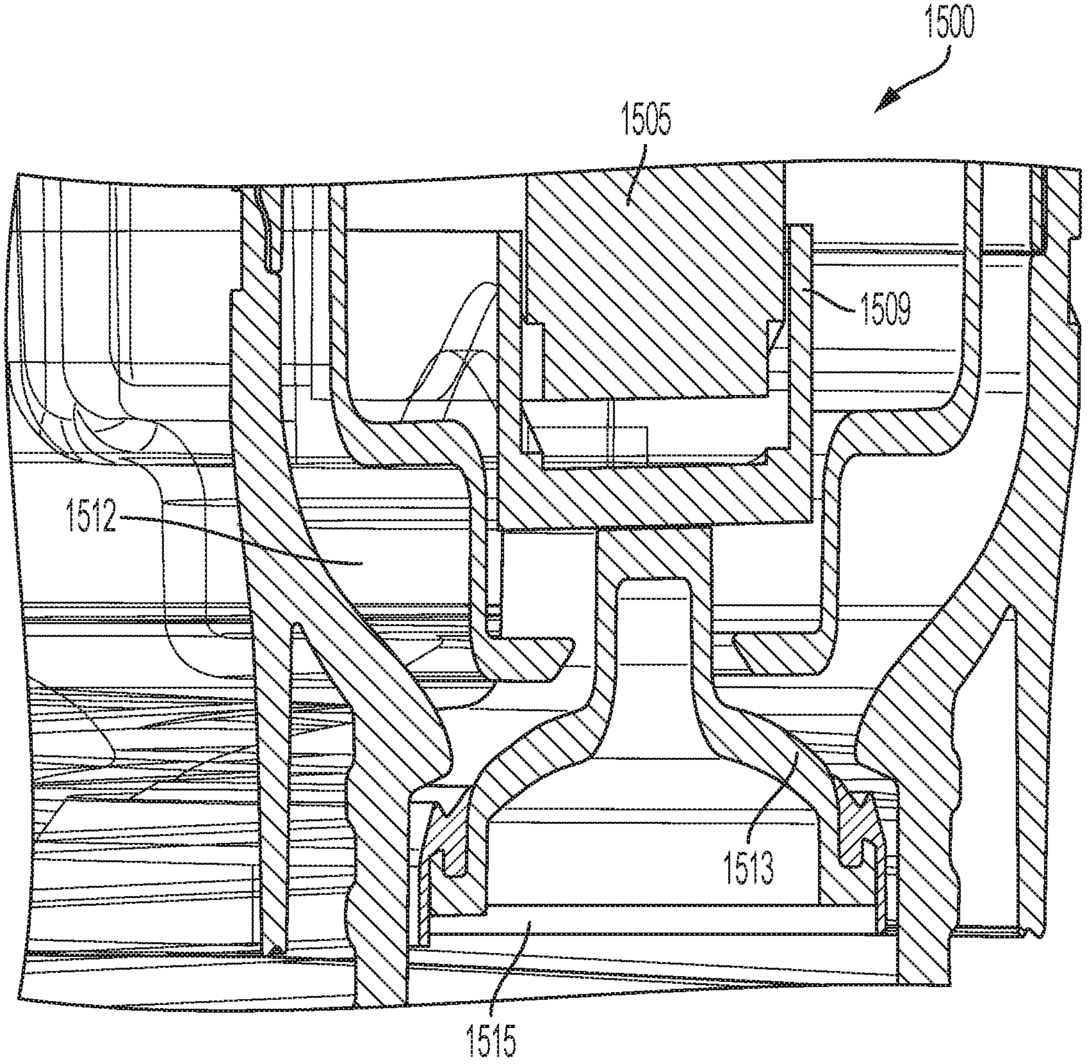
FIG. 44 is a partial cross-sectional view of the latching mechanism of FIG. 39 in a partially open configuration according to at least one aspect of the disclosure.
Figure 45:
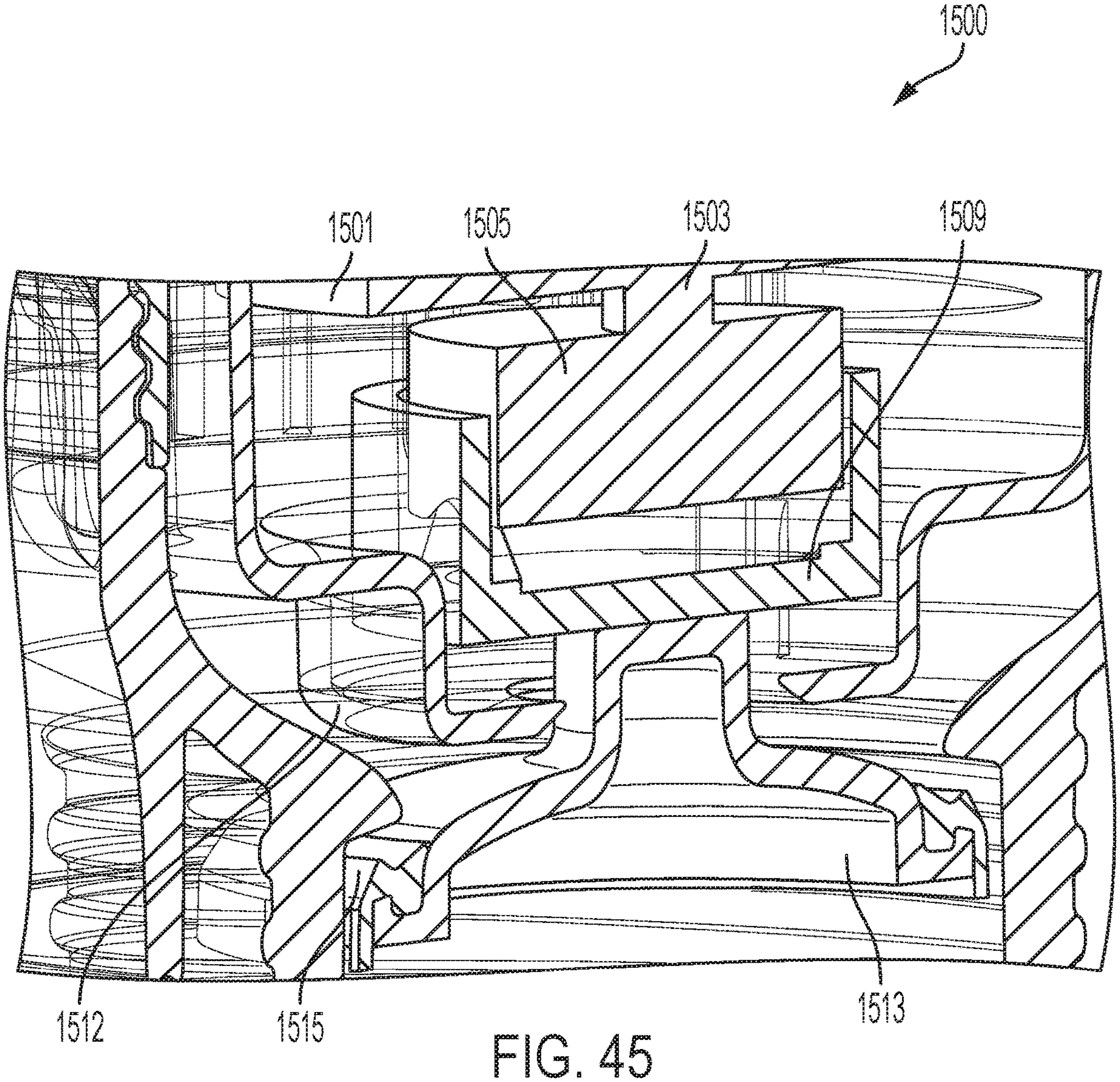
FIG. 45 is a partial cross-sectional view of the latching mechanism of FIG. 39 in an open configuration according to at least one aspect of the disclosure.

FIGS. 43-45 illustrate the latching mechanism 1500 as the valve assembly is translated from a closed configuration to an open configuration. FIG. 43 represents the latching mechanism 1500 in the closed, or locked, configuration. When the latching mechanism 1500 is in the closed configuration, the ramps 1510A, 1510B of the lower latch portion 1509 are out of alignment with and/or not received within the grooves 1506A, 1506B of the upper latch portion 1505. FIG. 44 represents the latching mechanism 1500 in a partially open, or unlocked, configuration. The latching mechanism 1500 begins transitioning into the open configuration as the motor 1501 causes rotation of at least one of the lower latch portion 1509 and the upper latch portion 1505 with respect to one another. As seen in FIG. 44, the valve assembly begins to open as the ramps 1510A, 1510B of the lower latch portion 1509 begin to align with the grooves 1506A, 1506B of the upper latch portion 1505. FIG. 45 represents the latching mechanism 1500 in the open configuration. Notably, the ramps 1510A, 1510B of the lower latch portion 1509 are fully aligned and/or received within the grooves 1506A, 1506B of the upper latch portion 1505. In various instances, a user can manually open and/or close the valve assembly if, for example, the power source has no more power to run the motor 1501.

Figure 46:
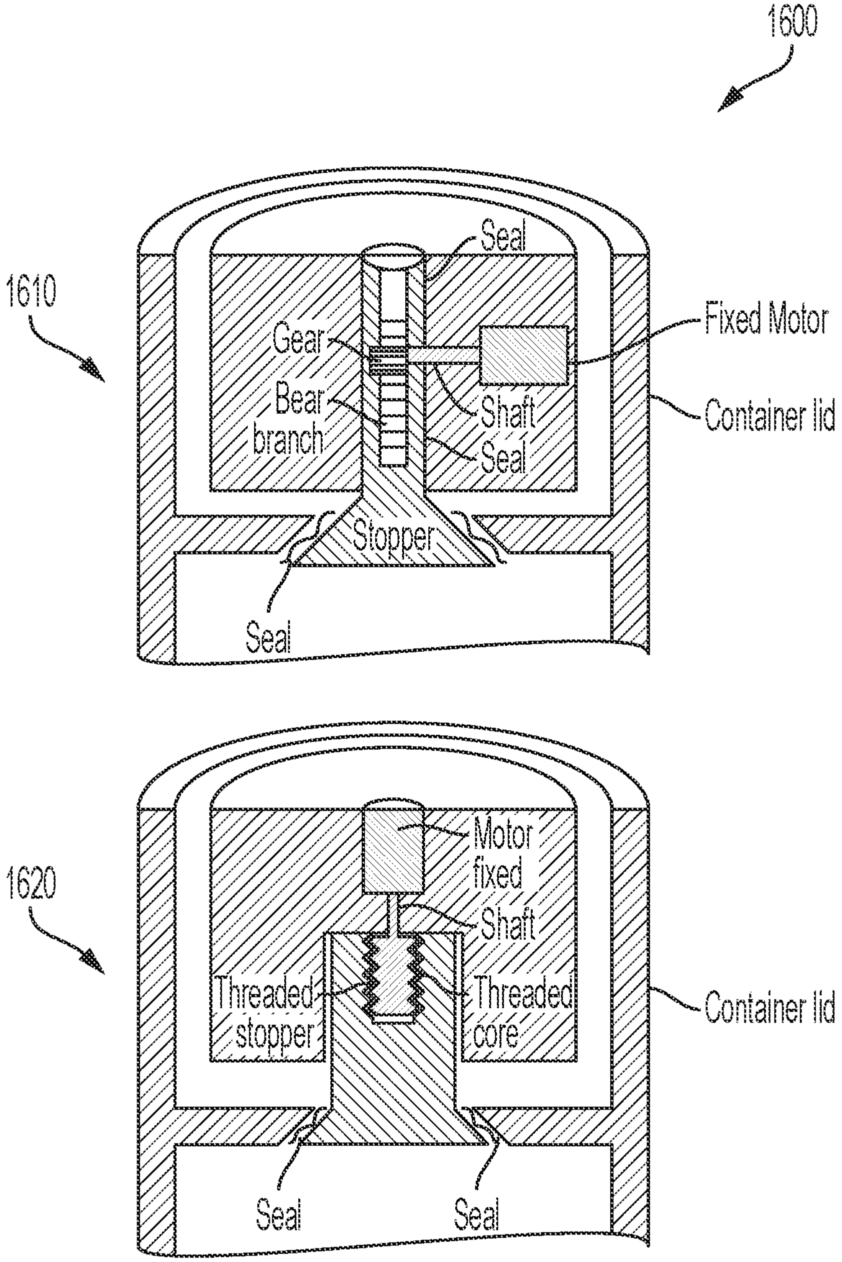
FIG. 46 is a partial cross-sectional view of a latching mechanism for use with a smart container according to at least one aspect of the disclosure.

FIG. 46 is a partial cross-sectional view of latching mechanisms 1600 for use with a smart container. A first latching mechanism 1610 comprises a motor fixed in the lid portion of the smart container. The motor comprises a shaft, and the shaft ends in a gear. The latching mechanism further comprises a gear track in operable connection with the gear of the motor shaft. As the motor rotates in a first direction the gear moves the plunger and/or stopper of the valve assembly from a closed configuration toward an open configuration. As the motor rotates in a second direction, opposite of the first direction, the gear moves the plunger and/or stopper of the valve assembly from an open configuration toward a closed configuration. In various instances, a second latching mechanism 1620 comprises a motor shaft terminating in a threaded core, wherein the threaded core is operably coupled to a threaded plunger and/or stopper. As the motor energizes the threaded core, the plunger and/or stopper is moved between the open configuration and the closed configuration.

In various instances, a smart container comprises a touch sensor, as described in greater detail herein. A user is able to swipe the user's finger in a particular pattern to cause the control system to prevent the valve assembly from being opened. Such a mechanism is valuable when the user places the container in a bag, such as a backpack. The user is able to lock the valve assembly and avoid accidental spillage of the contents of the container.

In various instances, the containers described herein comprise one or more indicators configured to communicate a sensed condition to the user. For example, the container can comprise a display screen on the lid portion. The control system is configured to cause the display screen to indicate how much liquid remains in the body portion. In various instances, the container comprises a plurality of indicators along the height of the body portion. For example, an LED can illuminate based on the current level of the contained contents. The container can comprise an indicator configured to communicate to the user that the container is full. Such an indicator is useful to avoid overfilling the container. In addition to displaying the amount of contents remaining within the container, the visual indicator can additionally communicate the type of content within the container. The container can comprise a light indicator that indicates with a light or another suitable symbolic method when the valve assembly is open and/or closed. In various instances, the container can emit a sound indicative of the opening and/or the closing of the valve assembly. Such a sound can be artificially induced.

In various instances, the container comprises a sensor configured to confirm the lid portion is properly and/or completely attached to the body portion of the container. For example, an induction sensor can be used to check if the lid portion is fully screwed only the body portion and/or otherwise connected to the body portion. Other sensors, such as a capacitive sensor, can be used to detect the location of the valve assembly and/or a pin. A pressure sensor can be used on a surface of the seal.

In various instances, the container comprises a sensor configured to confirm that the valve assembly closed correctly and/or completely. If the sensor detects that the valve assembly improperly closes, the control system can direct the valve assembly to close once again. The control system is able to vary the power settings based on the feedback received from the sensor.

In various instances, a smart phone and/or a remote device is configured to display the current and/or previous state(s) of the container. For example, the current state of the container can be populated in a notification window on a smart phone.

In various instances, the distance between the container and a device, such as the user's smartphone, for example, can be indicated on the container. A Bluetooth connection, for example, can be between the user's smartphone and the container. The control system can then cause the distance between the bottle and the last known location of the user's smartphone can be displayed on any suitable portion of the container. The control system is configured to warn the user when the distance between the container and the device increases. For example, the control system is configured to send a notification to the user when the user walks a predetermined distance away from the container. For example, a notification will be sent to the user to inform the user that the user has forgotten the container when the user (and the device) is greater than 10 meters away from the container. Additional parameters can be set and/or customized by the user, such that the control system only notifies the user when the user is at a location except for a predetermined location, such as at home and/or at the office. In various instances, a "Find my Container" application, similar to "Find my iPhone" can be used on a smartphone to locate a lost container.

In various instances, a cup holder with a charging capability is used with the containers described herein. The cup holder can charge the electronics of the container from below, the side, and/or any other suitable location. When the container is charging, the control system can maintain the valve assembly in the closed configuration and/or prevent the valve assembly from transitioning into the open configuration. For example, if the container is being wirelessly charged in the lid portion, the control system can automatically maintain the valve assembly in the closed configuration while the lid portion is associated with the charger such that the valve assembly will not open when the lid portion is charging.

In various instances, the container comprises an electronic mixer configured to mix, stir, and/or shake the contents of the container.

In various instances, the control assembly of the container can control how much substance is allows to be dispensed from the container, and thus ingested by the user. In various instances, the container is configured to track the total amount of substance dispensed from the container and track the target and/or prescribed amount of substance that the user should ingest. The control system is configured to alert the user when the user is not on track to ingest the pre-determined amount of substance within a pre-determined time period. The container can be configured to dispense a predetermined amount of contents based on the detected content of the container.

Smart containers are useful in various environments and scenarios. In various instances, a smart container, such as the smart containers disclosed herein, comprises a lid portion that permits the contents of the container to flow there through only when the container detects that a user is attempting to pour the contents of the container. Use of such a smart container is advantageous in situations where the container is storing a dangerous and/or hazardous liquid, for example. In a laboratory setting, various chemicals are stored within containers. The smart container can prevent threats to the health and/or safety of people in the laboratory by requiring the container to sense a predetermined condition in order for the contents of the container to be able to be dispensed. In various instances, the flow of the contents out of the smart container can be prevented until a sensor system of the smart container detects a finger print, or touch, of an authorized user, for example.

The smart containers described herein can help reduce accidents that result in spillage of the contents of the container. In various instances, the smart containers described herein comprise an automatic lid that is biased into a locked configuration through magnetic attraction when the lid is brought into contact with and/or within a particular distance from the body portion of the container. For example, the lid portion comprises a first magnet and the body portion comprises a second magnet. The second magnet produces an attractive magnetic field that attracts the first magnet, resulting in the lid portion being drawn into a locking engagement with the body portion. Use of such a smart container is advantageous in situations such as storage of isopropanol within containers in a laboratory. In an effort to, for example, save time the previous user of the isopropanol may only place the lid back on the isopropanol container without screwing it into its locking engagement. Using the automated lid portion discussed herein, the user does not have to worry about stopping an experiment to take time and tighten the lid on the container.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term “logic” may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms “component,” “system,” “module” and the like can refer to a computer-related entity, either hardware, a combination of hardware and software, software, or software in execution.

As used in any aspect herein, an “algorithm” refers to a self-consistent sequence of steps leading to a desired result, where a “step” refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled “IEEE 802.3 Standard”, published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled “ATM-MPLS Network Interworking 2.0” published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as “processing,” “computing,” “calculating,” “determining,” “displaying,” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

One or more components may be referred to herein as “configured to,” “configurable to,” “operable/operative to,” “adapted/adaptable,” “able to,” “conformable/conformed to,” etc. Those skilled in the art will recognize that “configured to” can generally encompass active-state components and/or inactive-state components and/or standby-state components, unless context requires otherwise.

For convenience and clarity, spatial terms such as “vertical”, “horizontal”, “up”, and “down” may be used herein with respect to the drawings. However, containers are used in many orientations and positions, and these terms are not intended to be limiting and/or absolute.

Those skilled in the art will recognize that, in general, terms used herein, and especially in the appended claims (e.g., bodies of the appended claims) are generally intended as “open” terms (e.g., the term “including” should be interpreted as “including but not limited to,” the term “having” should be interpreted as “having at least,” the term “includes” should be interpreted as “includes but is not limited to,” etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to claims containing only one such recitation, even when the same claim includes the introductory phrases “one or more” or “at least one” and indefinite articles such as “a” or “an” (e.g., “a” and/or “an” should typically be interpreted to mean “at least one” or “one or more”); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of “two recitations,” without other modifiers, typically means at least two recitations, or two or more recitations). Furthermore, in those instances where a convention analogous to “at least one of A, B, and C, etc.” is used, in general such a construction is intended in the sense one having skill in the art would understand the convention (e.g., “a system having at least one of A, B, and C” would include but not be limited to systems that have A alone, B alone, C alone, A and B together, A and C together, B and C together, and/or A, B, and C together, etc.). In those instances where a convention analogous to “at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A smart container, comprising:
- a body;
- a lid attached to the body, wherein the lid comprises a valve movable between an open position and a closed position;
- an actuator configured to move the valve between the open position and the closed position;
- a plurality of sensors comprising an arrangement of overlapping capacitive sensors forming concentric sensor rings on the lid configured to detect a user contact; and
- a control circuit communicatively coupled to the sensor and the actuator, wherein the control circuit is configured to:
  - receive signals from the plurality of sensors indicative of sensed conditions, wherein the sensed conditions comprise the user contact with the sensor rings on the lid; and
  - send a signal to the actuator when the sensed conditions correspond to an opening state, wherein the sensed conditions correspond to the opening state when the user contact with the sensor rings on the lid corresponds to an intentional contact.

2. The smart container of claim 1, wherein the plurality of sensors further comprises a touch-sensitive interface configured to receive a user input, wherein the sensed conditions correspond to the opening state when the user input from the touch-sensitive interface comprises a unique code indicating the identification of a specific individual.

3. The smart container of claim 1, wherein the plurality of sensors further comprises a touch-sensitive interface configured to receive a user input, wherein the sensed conditions correspond to the opening state when the user input from the touch-sensitive interface comprises a unique code comprising a touch pattern entered by a user.

4. The smart container of claim 1, further comprising a mechanical lock configured to selectively restrain movement of the valve.

5. The smart container of claim 1, further comprising a mechanical lock configured to selectively secure the lid to the body.

6. The smart container of claim 1, wherein the control circuit comprises a processor and a memory communicatively coupled to the processor.

7. The smart container of claim 1, wherein the control circuit is further configured to prevent the valve from moving from the open position to the closed position for a pre-determined period of time.

8. The smart container of claim 1, wherein the body of the smart container comprises contents, and wherein the control circuit is further configured to prevent the valve from moving from the open position to the closed position until a pre-determined amount of contents is dispensed from the smart container.

9. A smart container, comprising:
- a body portion;
- a lid portion removably attached to the body portion, wherein the lid portion comprises a valve assembly configurable in an open configuration and a closed configuration, wherein contents of the smart container are able to flow out of the smart container when the valve assembly is in the open configuration, and wherein the contents of the smart container are unable to flow out of the smart container when the valve assembly is in the closed configuration;
- an actuator configured to move the valve assembly between the open configuration and the closed configuration;

a sensor configured to detect a condition, wherein the sensor comprises a touch-sensitive interface configured to receive a user input, and wherein the detected condition comprises the user input;

an arrangement of overlapping capacitive sensors forming at least two rings on the lid; and a control system in communication with the sensor and the actuator, wherein the control system is configured to:

receive a first signal from the sensor indicative of the detected condition;

receive a second signal from the capacitive sensors indicative of a user contact; and send a third signal to the actuator to motivate the valve assembly into the open configuration when the detected condition corresponds to a unique code and the user contact corresponds to an intentional contact.

10. The smart container of claim 9, wherein the detected condition comprises the identification of a specific individual.

11. The smart container of claim 9, wherein the detected condition comprises a touch pattern entered by a user.

12. A smart container, comprising:

a body configured to store liquid contents therein;

a lid selectively lockable to the body, wherein the lid comprises a valve assembly configurable in an open configuration and a closed configuration, wherein the contents of the smart container are prevented from dispensing out of the smart container when the lid is in the closed configuration;

an actuator configured to move the valve assembly between the open configuration and the closed configuration;

a plurality of sensors configured to detect a characteristic of a user, wherein the plurality of sensors comprises discrete lip print sensors forming an annular ring and configured to detect contact in a 360 degree range of positions around the lid; and a controller in communication with the actuator and the plurality of sensors, wherein the controller is configured to:

receive a signal representative of the detected characteristic; and send a signal to the actuator to motivate the valve assembly into the open configuration when the detected characteristic corresponds to an opening state.

13. The smart container of claim 12, further comprising a straw extending through the lid and toward the body, wherein the straw comprises a sensor and an automatic pump, and wherein the straw is configured to pump the contents of the smart container to the user when a characteristic of the user is authenticated.

14. The smart container of claim 12, wherein the actuator comprises a solenoid.

15. The smart container of claim 12, wherein the controller is further configured to prevent the valve assembly from translating from the open configuration to the closed configuration for a pre-determined period of time.

16. The smart container of claim 1, wherein the plurality of sensors further comprises a touch-sensitive interface configured to receive a user input, wherein the sensed conditions correspond to the opening state when the user input from the touch-sensitive interface comprises a unique code, wherein the unique code is associated with an authorized user of the smart container.

17. The smart container of claim 16, wherein the control circuit is configured to adapt a control program associated with the authorized user, wherein the control program commands the actuator to move the valve between the open position and the closed position.

18. The smart container of claim 1, wherein the smart container further comprises an imaging sensor configured to detect a feature of a user.

19. The smart container of claim 18, wherein the imaging sensor comprises a camera, and wherein the detected feature is a face of the user.

20. The smart container of claim 1, wherein the arrangement of capacitive sensors form an inner ring configured to detect a user's upper lip and an outer ring configured to detect a user's lower lip.

21. The smart container of claim 1, wherein the capacitive sensors comprise overlapping half-moon shaped sensors.

* * * * *